US008726454B2

(12) United States Patent
Gilbert, Jr. et al.

(10) Patent No.: US 8,726,454 B2
(45) Date of Patent: May 20, 2014

(54) AUTONOMOUS COVERAGE ROBOT

(75) Inventors: Duane L. Gilbert, Jr., Goffstown, NH (US); Marcus R. Williams, Medford, MA (US); Andrea M. Okerholm, Arlington, MA (US); Elaine H. Kristant, Dunstable, MA (US); Sheila A. Longo, Somerville, MA (US); Daniel E. Kee, Somerville, MA (US); Marc D. Strauss, Stanford, CA (US)

(73) Assignee: iRobot Corporation, Bedford, MA (US)

( * ) Notice: Subject to any disclaimer, the term of this patent is extended or adjusted under 35 U.S.C. 154(b) by 1082 days.

(21) Appl. No.: 12/118,219

(22) Filed: May 9, 2008

(65) Prior Publication Data

US 2008/0276408 A1 Nov. 13, 2008

Related U.S. Application Data

(60) Provisional application No. 60/938,699, filed on May 17, 2007, provisional application No. 60/917,065, filed on May 9, 2007.

(51) Int. Cl.
*A47L 5/00* (2006.01)
(52) U.S. Cl.
USPC .................. 15/319; 15/320; 15/339; 15/401; 15/403
(58) Field of Classification Search
CPC ......... A47L 9/28; A47L 11/201; A47L 11/30; A47L 22/01
USPC ............................ 15/319, 320, 339, 401, 403
IPC .......................... A47L 5/00, 9/28, 11/20, 11/29
See application file for complete search history.

(56) References Cited

U.S. PATENT DOCUMENTS 1,780,221 A 11/1930 Buchmann
1,970,302 A 8/1934 Gerhardt
(Continued)

FOREIGN PATENT DOCUMENTS

DE 2128842 C3 12/1980
DE 3317376 C2 12/1987
(Continued)

OTHER PUBLICATIONS

Search Report for corresponding application PCT/US2008/063252, dated Feb. 3, 2009.

(Continued)

*Primary Examiner* — David Redding
(74) *Attorney, Agent, or Firm* — Fish & Richardson P.C.

(57) ABSTRACT

A surface treatment robot includes a chassis having forward and rear ends and a drive system carried by the chassis. The drive system includes right and left driven wheels and is configured to maneuver the robot over a cleaning surface. The robot includes a vacuum assembly, a collection volume, a supply volume, an applicator, and a wetting element, each carried by the chassis. The wetting element engages the cleaning surface to distribute a cleaning liquid applied to the surface by the applicator. The wetting element distributes the cleaning liquid along at least a portion of the cleaning surface when the robot is driven in a forward direction. The wetting element is arranged substantially forward of a transverse axis defined by the right and left driven wheels, and the wetting element slidably supports at least about ten percent of the mass of the robot above the cleaning surface.

12 Claims, 33 Drawing Sheets

(56) References Cited

U.S. PATENT DOCUMENTS

| | | | |
|---|---|---|---|
| 2,136,324 A | 11/1938 | John | |
| 2,302,111 A | 11/1942 | Dow et al. | |
| 2,353,621 A | 7/1944 | Sav et at | |
| 2,770,825 A | 11/1956 | Pullen | |
| 2,930,055 A | 3/1960 | Fallen et al. | |
| 1,755,054 A | 4/1960 | Darst | |
| 3,119,369 A | 1/1964 | Harland et al. | |
| 3,166,138 A | 1/1965 | Dunn | |
| 3,333,564 A | 8/1967 | Waters | |
| 3,375,375 A | 3/1968 | Robert et al. | |
| 3,381,652 A | 5/1968 | Schaefer et al. | |
| 3,457,575 A | 7/1969 | Bienek | |
| 3,550,714 A | 12/1970 | Bellinger | |
| 3,569,727 A | 3/1971 | Aggarwal et al. | |
| 3,649,981 A | 3/1972 | Woodworth | |
| 3,674,316 A | 7/1972 | De | |
| 3,678,882 A | 7/1972 | Kinsella | |
| 3,690,559 A | 9/1972 | Rudloff | |
| 3,744,586 A | 7/1973 | Leinauer | |
| 3,756,667 A | 9/1973 | Bombardier et al. | |
| 3,809,004 A | 5/1974 | Leonheart | |
| 3,816,004 A | 6/1974 | Bignardi | |
| 3,845,831 A | 11/1974 | James | |
| 3,851,349 A | 12/1974 | Lowder | |
| 3,853,086 A | 12/1974 | Asplund | |
| 3,863,285 A | 2/1975 | Hukuba | |
| 3,888,181 A | 6/1975 | Kups | |
| 3,937,174 A | 2/1976 | Haaga | |
| 3,952,361 A | 4/1976 | Wilkins | |
| 3,989,311 A | 11/1976 | Debrey | |
| 3,989,931 A | 11/1976 | Phillips | |
| 4,004,313 A | 1/1977 | Capra | |
| 4,012,681 A | 3/1977 | Finger et al. | |
| 4,070,170 A | 1/1978 | Leinfelt | |
| 4,099,284 A | 7/1978 | Shinozaki et al. | |
| 4,119,900 A | 10/1978 | Kremnitz | |
| 4,175,589 A | 11/1979 | Nakamura et al. | |
| 4,175,892 A | 11/1979 | De | |
| 4,196,727 A | 4/1980 | Verkaart et al. | |
| 4,198,727 A | 4/1980 | Farmer | |
| 4,199,838 A | 4/1980 | Simonsson | |
| 4,209,254 A | 6/1980 | Reymond et al. | |
| D258,901 S | 4/1981 | Keyworth | |
| 4,297,578 A | 10/1981 | Carter | |
| 4,305,234 A | 12/1981 | Pichelman | |
| 4,306,329 A | 12/1981 | Yokoi | |
| 4,309,758 A | 1/1982 | Halsall et al. | |
| 4,328,545 A | 5/1982 | Halsall et al. | |
| 4,367,403 A | 1/1983 | Miller | |
| 4,369,543 A | 1/1983 | Chen et al. | |
| 4,401,909 A | 8/1983 | Gorsek | |
| 4,416,033 A | 11/1983 | Specht | |
| 4,445,245 A | 5/1984 | Lu | |
| 4,465,370 A | 8/1984 | Yuasa et al. | |
| 4,477,998 A | 10/1984 | You | |
| 4,481,692 A | 11/1984 | Kurz | |
| 4,482,960 A | 11/1984 | Pryor | |
| 4,492,058 A | 1/1985 | Goldfarb et al. | |
| 4,513,469 A | 4/1985 | Godfrey et al. | |
| D278,732 S | 5/1985 | Ohkado | |
| 4,518,437 A | 5/1985 | Sommer | |
| 4,534,637 A | 8/1985 | Suzuki et al. | |
| 4,556,313 A | 12/1985 | Miller et al. | |
| 4,575,211 A | 3/1986 | Matsumura et al. | |
| 4,580,311 A | 4/1986 | Kurz | |
| 4,601,082 A | 7/1986 | Kurz | |
| 4,618,213 A | 10/1986 | Chen | |
| 4,620,285 A | 10/1986 | Perdue | |
| 4,624,026 A | 11/1986 | Olson et al. | |
| 4,626,995 A | 12/1986 | Lofgren et al. | |
| 4,628,454 A | 12/1986 | Ito | |
| 4,638,445 A | 1/1987 | Mattaboni | |
| 4,644,156 A | 2/1987 | Takahashi et al. | |
| 4,649,504 A | 3/1987 | Krouglicof et al. | |
| 4,652,917 A | 3/1987 | Miller | |
| 4,654,492 A | 3/1987 | Koerner et al. | |
| 4,654,924 A | 4/1987 | Getz et al. | |
| 4,660,969 A | 4/1987 | Sorimachi et al. | |
| 4,662,854 A | 5/1987 | Fang | |
| 4,674,048 A | 6/1987 | Okumura | |
| 4,679,152 A | 7/1987 | Perdue | |
| 4,680,827 A | 7/1987 | Hummel | |
| 4,696,074 A | 9/1987 | Cavalli | |
| D292,223 S | 10/1987 | Trumbull | |
| 4,700,301 A | 10/1987 | Dyke | |
| 4,700,427 A | 10/1987 | Knepper | |
| 4,703,820 A | 11/1987 | Reinaud | |
| 4,709,773 A | 12/1987 | Clement et al. | |
| 4,710,020 A | 12/1987 | Maddox et al. | |
| 4,712,740 A | 12/1987 | Duncan et al. | |
| 4,716,621 A | 1/1988 | Zoni | |
| 4,728,801 A | 3/1988 | O'Connor | |
| 4,733,343 A | 3/1988 | Yoneda et al. | |
| 4,733,430 A | 3/1988 | Westergren | |
| 4,733,431 A | 3/1988 | Martin | |
| 4,735,136 A | 4/1988 | Lee et al. | |
| 4,735,138 A | 4/1988 | Gawler et al. | |
| 4,748,336 A | 5/1988 | Fujie et al. | |
| 4,748,833 A | 6/1988 | Nagasawa | |
| 4,756,049 A | 7/1988 | Uehara | |
| 4,767,213 A | 8/1988 | Hummel | |
| 4,769,700 A | 9/1988 | Pryor | |
| 4,777,416 A | 10/1988 | George et al. | |
| D298,766 S | 11/1988 | Tanno et al. | |
| 4,782,550 A | 11/1988 | Jacobs | |
| 4,796,198 A | 1/1989 | Boultinghouse et al. | |
| 4,806,751 A | 2/1989 | Abe et al. | |
| 4,811,228 A | 3/1989 | Hyyppa | |
| 4,813,906 A | 3/1989 | Matsuyama et al. | |
| 4,815,157 A | 3/1989 | Tsuchiya | |
| 4,817,000 A | 3/1989 | Eberhardt | |
| 4,818,875 A | 4/1989 | Weiner | |
| 4,829,442 A | 5/1989 | Kadonoff et al. | |
| 4,829,626 A | 5/1989 | Harkonen et al. | |
| 4,832,098 A | 5/1989 | Palinkas et al. | |
| 4,851,661 A | 7/1989 | Everett | |
| 4,854,000 A | 8/1989 | Takimoto | |
| 4,854,006 A | 8/1989 | Nishimura et al. | |
| 4,855,915 A | 8/1989 | Dallaire | |
| 4,857,912 A | 8/1989 | Everett et al. | |
| 4,858,132 A | 8/1989 | Holmquist | |
| 4,867,570 A | 9/1989 | Sorimachi et al. | |
| 4,880,474 A | 11/1989 | Koharagi et al. | |
| 4,887,415 A | 12/1989 | Martin | |
| 4,891,762 A | 1/1990 | Chotiros | |
| 4,893,025 A | 1/1990 | Lee | |
| 4,901,394 A | 2/1990 | Nakamura et al. | |
| 4,905,151 A | 2/1990 | Weiman et al. | |
| 4,909,972 A | 3/1990 | Britz | |
| 4,912,643 A | 3/1990 | Beirne | |
| 4,918,441 A | 4/1990 | Bohman | |
| 4,919,224 A | 4/1990 | Shyu et al. | |
| 4,919,489 A | 4/1990 | Kopsco | |
| 4,920,060 A | 4/1990 | Parrent et al. | |
| 4,920,605 A | 5/1990 | Takashima | |
| 4,933,864 A | 6/1990 | Evans et al. | |
| 4,937,912 A | 7/1990 | Kurz | |
| 4,953,253 A | 9/1990 | Fukuda et al. | |
| 4,954,962 A | 9/1990 | Evans et al. | |
| 4,955,714 A | 9/1990 | Stotler et al. | |
| 4,956,891 A | 9/1990 | Wulff | |
| 4,961,303 A | 10/1990 | McCarty et al. | |
| 4,961,304 A | 10/1990 | Ovsborn et al. | |
| 4,962,453 A | 10/1990 | Pong et al. | |
| 4,967,862 A | 11/1990 | Pong et al. | |
| 4,971,591 A | 11/1990 | Raviv et al. | |
| 4,973,912 A | 11/1990 | Kaminski et al. | |
| 4,974,283 A | 12/1990 | Holsten et al. | |
| 4,977,618 A | 12/1990 | Allen | |
| 4,977,639 A | 12/1990 | Takahashi et al. | |
| 4,986,663 A | 1/1991 | Cecchi et al. | |
| 5,001,635 A | 3/1991 | Yasutomi et al. | |
| 5,002,145 A | 3/1991 | Wakaumi et al. | |
| 5,012,886 A | 5/1991 | Jonas et al. | |

(56) References Cited

U.S. PATENT DOCUMENTS

| | | |
|---|---|---|
| 5,018,240 A | 5/1991 | Holman |
| 5,020,186 A | 6/1991 | Lessig et al. |
| 5,022,812 A | 6/1991 | Coughlan et al. |
| 5,023,788 A | 6/1991 | Kitazume et al. |
| 5,024,529 A | 6/1991 | Svetkoff et al. |
| D318,500 S | 7/1991 | Malewicki et al. |
| 5,032,775 A | 7/1991 | Mizuno et al. |
| 5,033,151 A | 7/1991 | Kraft et al. |
| 5,033,291 A | 7/1991 | Podoloff et al. |
| 5,040,116 A | 8/1991 | Evans et al. |
| 5,045,769 A | 9/1991 | Everett |
| 5,049,802 A | 9/1991 | Mintus et al. |
| 5,051,906 A | 9/1991 | Evans et al. |
| 5,062,819 A | 11/1991 | Mallory |
| 5,070,567 A | 12/1991 | Holland |
| 5,084,934 A | 2/1992 | Lessig et al. |
| 5,086,535 A | 2/1992 | Grossmeyer et al. |
| 5,090,321 A | 2/1992 | Abouav |
| 5,093,955 A | 3/1992 | Blehert et al. |
| 5,094,311 A | 3/1992 | Akeel |
| 5,098,262 A | 3/1992 | Wecker et al. |
| 5,105,502 A | 4/1992 | Takashima |
| 5,105,550 A | 4/1992 | Shenoha |
| 5,109,566 A | 5/1992 | Kobayashi et al. |
| 5,115,538 A | 5/1992 | Cochran et al. |
| 5,127,128 A | 7/1992 | Lee |
| 5,136,675 A | 8/1992 | Hodson |
| 5,136,750 A | 8/1992 | Takashima et al. |
| 5,142,985 A | 9/1992 | Stearns et al. |
| 5,144,471 A | 9/1992 | Takanashi et al. |
| 5,144,714 A | 9/1992 | Mori et al. |
| 5,144,715 A | 9/1992 | Matsuyo et al. |
| 5,152,028 A | 10/1992 | Hirano |
| 5,152,202 A | 10/1992 | Strauss |
| 5,155,684 A | 10/1992 | Burke et al. |
| 5,163,202 A | 11/1992 | Kawakami et al. |
| 5,163,320 A | 11/1992 | Goshima et al. |
| 5,164,579 A | 11/1992 | Pryor et al. |
| 5,165,064 A | 11/1992 | Mattaboni |
| 5,170,352 A | 12/1992 | McTamaney et al. |
| 5,173,881 A | 12/1992 | Sindle |
| 5,182,833 A | 2/1993 | Yamaguchi et al. |
| 5,202,742 A | 4/1993 | Frank et al. |
| 5,204,814 A | 4/1993 | Noonan et al. |
| 5,206,500 A | 4/1993 | Decker et al. |
| 5,208,521 A | 5/1993 | Aoyama |
| 5,216,777 A | 6/1993 | Moro et al. |
| 5,222,786 A | 6/1993 | Sovis et al. |
| 5,227,985 A | 7/1993 | DeMenthon |
| 5,233,682 A | 8/1993 | Abe et al. |
| 5,239,720 A | 8/1993 | Wood et al. |
| 5,251,358 A | 10/1993 | Moro et al. |
| 5,261,139 A | 11/1993 | Lewis |
| 5,276,618 A | 1/1994 | Everett |
| 5,276,939 A | 1/1994 | Uenishi |
| 5,277,064 A | 1/1994 | Knigga et al. |
| 5,279,672 A | 1/1994 | Betker et al. |
| 5,284,452 A | 2/1994 | Corona |
| 5,284,522 A | 2/1994 | Kobayashi et al. |
| 5,293,955 A | 3/1994 | Lee |
| D345,707 S | 4/1994 | Alister |
| 5,303,448 A | 4/1994 | Hennessey et al. |
| 5,307,273 A | 4/1994 | Oh et al. |
| 5,309,592 A | 5/1994 | Hiratsuka |
| 5,310,379 A | 5/1994 | Hippely et al. |
| 5,315,227 A | 5/1994 | Pierson et al. |
| 5,319,827 A | 6/1994 | Yang |
| 5,319,828 A | 6/1994 | Waldhauser et al. |
| 5,321,614 A | 6/1994 | Ashworth |
| 5,323,483 A | 6/1994 | Baeg |
| 5,324,948 A | 6/1994 | Dudar et al. |
| 5,331,713 A | 7/1994 | Tipton |
| 5,341,186 A | 8/1994 | Kato |
| 5,341,540 A | 8/1994 | Soupert et al. |
| 5,341,549 A | 8/1994 | Wirtz et al. |
| 5,345,649 A | 9/1994 | Whitlow |
| 5,353,224 A | 10/1994 | Lee et al. |
| 5,363,305 A | 11/1994 | Cox et al. |
| 5,363,935 A | 11/1994 | Schempf et al. |
| 5,369,347 A | 11/1994 | Yoo |
| 5,369,838 A | 12/1994 | Wood et al. |
| 5,386,862 A | 2/1995 | Glover et al. |
| 5,399,951 A | 3/1995 | Lavallee et al. |
| 5,400,244 A | 3/1995 | Watanabe et al. |
| 5,404,612 A | 4/1995 | Ishikawa |
| 5,410,479 A | 4/1995 | Coker |
| 5,435,405 A | 7/1995 | Schempf et al. |
| 5,440,216 A | 8/1995 | Kim |
| 5,442,358 A | 8/1995 | Keeler et al. |
| 5,444,965 A | 8/1995 | Colens |
| 5,446,356 A | 8/1995 | Kim |
| 5,446,445 A | 8/1995 | Bloomfield et al. |
| 5,451,135 A | 9/1995 | Schempf et al. |
| 5,454,129 A | 10/1995 | Kell |
| 5,455,982 A | 10/1995 | Armstrong et al. |
| 5,465,525 A | 11/1995 | Mifune et al. |
| 5,465,619 A | 11/1995 | Sotack et al. |
| 5,467,273 A | 11/1995 | Faibish et al. |
| 5,471,560 A | 11/1995 | Allard et al. |
| 5,491,670 A | 2/1996 | Weber |
| 5,497,529 A | 3/1996 | Boesi |
| 5,498,948 A | 3/1996 | Bruni et al. |
| 5,502,638 A | 3/1996 | Takenaka |
| 5,505,072 A | 4/1996 | Oreper |
| 5,507,067 A | 4/1996 | Hoekstra et al. |
| 5,510,893 A | 4/1996 | Suzuki |
| 5,511,147 A | 4/1996 | Abdel |
| 5,515,572 A | 5/1996 | Hoekstra et al. |
| 5,534,762 A | 7/1996 | Kim |
| 5,535,476 A | 7/1996 | Kresse et al. |
| 5,537,017 A | 7/1996 | Feiten et al. |
| 5,537,711 A | 7/1996 | Tseng |
| 5,539,953 A | 7/1996 | Kurz |
| 5,542,146 A | 8/1996 | Hoekstra et al. |
| 5,542,148 A | 8/1996 | Young |
| 5,546,631 A | 8/1996 | Chambon |
| 5,548,511 A | 8/1996 | Bancroft |
| 5,551,525 A | 9/1996 | Pack et al. |
| 5,553,349 A | 9/1996 | Kilstrom et al. |
| 5,555,587 A | 9/1996 | Guha |
| 5,560,077 A | 10/1996 | Crotchett |
| 5,568,589 A | 10/1996 | Hwang |
| D375,592 S | 11/1996 | Ljunggren |
| 5,608,306 A | 3/1997 | Rybeck et al. |
| 5,608,894 A | 3/1997 | Kawakami et al. |
| 5,608,944 A | 3/1997 | Gordon |
| 5,610,488 A | 3/1997 | Miyazawa |
| 5,611,106 A | 3/1997 | Wulff |
| 5,611,108 A | 3/1997 | Knowlton et al. |
| 5,613,261 A | 3/1997 | Kawakami et al. |
| 5,613,269 A | 3/1997 | Miwa |
| 5,621,291 A | 4/1997 | Lee |
| 5,622,236 A | 4/1997 | Azumi et al. |
| 5,634,237 A | 6/1997 | Paranjpe |
| 5,634,239 A | 6/1997 | Tuvin et al. |
| 5,636,402 A | 6/1997 | Kubo et al. |
| 5,642,299 A | 6/1997 | Hardin et al. |
| 5,646,494 A | 7/1997 | Han |
| 5,647,554 A | 7/1997 | Ikegami et al. |
| 5,650,702 A | 7/1997 | Azumi |
| 5,652,489 A | 7/1997 | Kawakami |
| 5,682,313 A | 10/1997 | Edlund et al. |
| 5,682,839 A | 11/1997 | Grimsley et al. |
| 5,696,675 A | 12/1997 | Nakamura et al. |
| 5,698,861 A | 12/1997 | Oh |
| 5,709,007 A | 1/1998 | Chiang |
| 5,710,506 A | 1/1998 | Broell et al. |
| 5,714,119 A | 2/1998 | Kawagoe et al. |
| 5,717,169 A | 2/1998 | Liang et al. |
| 5,717,484 A | 2/1998 | Hamaguchi et al. |
| 5,720,077 A | 2/1998 | Nakamura et al. |
| 5,732,401 A | 3/1998 | Conway |
| 5,735,017 A | 4/1998 | Barnes et al. |
| 5,735,959 A | 4/1998 | Kubo et al. |

(56) References Cited

U.S. PATENT DOCUMENTS

| | | |
|---|---|---|
| 5,742,975 A | 4/1998 | Knowlton et al. |
| 5,745,235 A | 4/1998 | Vercammen et al. |
| 5,752,871 A | 5/1998 | Tsuzuki |
| 5,756,904 A | 5/1998 | Oreper et al. |
| 5,761,762 A | 6/1998 | Kubo |
| 5,764,888 A | 6/1998 | Bolan et al. |
| 5,767,437 A | 6/1998 | Rogers |
| 5,767,960 A | 6/1998 | Orman |
| 5,777,596 A | 7/1998 | Herbert |
| 5,778,486 A | 7/1998 | Kim |
| 5,781,697 A | 7/1998 | Jeong |
| 5,781,960 A | 7/1998 | Kilstrom et al. |
| 5,784,755 A | 7/1998 | Karr et al. |
| 5,786,602 A | 7/1998 | Pryor et al. |
| 5,787,545 A | 8/1998 | Colens |
| 5,793,900 A | 8/1998 | Nourbakhsh et al. |
| 5,794,297 A | 8/1998 | Muta |
| 5,802,665 A | 9/1998 | Knowlton et al. |
| 5,812,267 A | 9/1998 | Everett et al. |
| 5,814,808 A | 9/1998 | Takada et al. |
| 5,815,880 A | 10/1998 | Nakanishi |
| 5,815,884 A | 10/1998 | Imamura et al. |
| 5,819,008 A | 10/1998 | Asama et al. |
| 5,819,360 A | 10/1998 | Fujii |
| 5,819,936 A | 10/1998 | Saveliev et al. |
| 5,820,821 A | 10/1998 | Kawagoe et al. |
| 5,821,730 A | 10/1998 | Drapkin |
| 5,825,981 A | 10/1998 | Matsuda |
| 5,828,770 A | 10/1998 | Leis et al. |
| 5,831,597 A | 11/1998 | West et al. |
| 5,836,045 A | 11/1998 | Anthony et al. |
| 5,839,156 A | 11/1998 | Park et al. |
| 5,839,532 A | 11/1998 | Yoshiji et al. |
| 5,841,259 A | 11/1998 | Kim et al. |
| 5,867,800 A | 2/1999 | Leif |
| 5,869,910 A | 2/1999 | Colens |
| 5,894,621 A * | 4/1999 | Kubo ............................ 15/50.1 |
| 5,896,611 A | 4/1999 | Haaga |
| 5,903,124 A | 5/1999 | Kawakami |
| 5,905,209 A | 5/1999 | Oreper |
| 5,907,886 A | 6/1999 | Buscher |
| 5,910,700 A | 6/1999 | Crotzer |
| 5,911,260 A | 6/1999 | Suzuki |
| 5,916,008 A | 6/1999 | Wong |
| 5,924,167 A | 7/1999 | Wright et al. |
| 5,926,909 A | 7/1999 | McGee |
| 5,933,102 A | 8/1999 | Miller et al. |
| 5,933,913 A | 8/1999 | Wright et al. |
| 5,935,179 A | 8/1999 | Kleiner et al. |
| 5,935,333 A | 8/1999 | Davis |
| 5,940,346 A | 8/1999 | Sadowsky et al. |
| 5,940,927 A | 8/1999 | Haegermarck et al. |
| 5,940,930 A | 8/1999 | Oh et al. |
| 5,942,869 A | 8/1999 | Katou et al. |
| 5,943,730 A | 8/1999 | Boomgaarden |
| 5,943,733 A | 8/1999 | Tagliaferri |
| 5,943,933 A | 8/1999 | Evans et al. |
| 5,947,225 A | 9/1999 | Kawakami et al. |
| 5,950,408 A | 9/1999 | Schaedler |
| 5,959,423 A | 9/1999 | Nakanishi et al. |
| 5,968,281 A | 10/1999 | Wright et al. |
| 5,974,348 A | 10/1999 | Rocks |
| 5,974,365 A | 10/1999 | Mitchell |
| 5,983,448 A | 11/1999 | Wright et al. |
| 5,984,880 A | 11/1999 | Lander et al. |
| 5,987,383 A | 11/1999 | Keller et al. |
| 5,989,700 A | 11/1999 | Krivopal |
| 5,991,951 A | 11/1999 | Kubo et al. |
| 5,995,883 A | 11/1999 | Nishikado |
| 5,995,884 A | 11/1999 | Allen et al. |
| 5,996,167 A | 12/1999 | Close |
| 5,998,953 A | 12/1999 | Nakamura et al. |
| 5,998,971 A | 12/1999 | Corbridge |
| 6,000,088 A | 12/1999 | Wright et al. |
| 6,009,358 A | 12/1999 | Angott et al. |
| 6,012,618 A | 1/2000 | Matsuo |
| 6,021,545 A | 2/2000 | Delgado et al. |
| 6,023,813 A | 2/2000 | Thatcher et al. |
| 6,023,814 A | 2/2000 | Imamura |
| 6,025,687 A | 2/2000 | Himeda et al. |
| 6,026,539 A | 2/2000 | Mouw et al. |
| 6,030,464 A | 2/2000 | Azevedo |
| 6,030,465 A | 2/2000 | Marcussen et al. |
| 6,032,327 A | 3/2000 | Oka et al. |
| 6,032,542 A | 3/2000 | Warnick et al. |
| 6,036,572 A | 3/2000 | Sze |
| 6,038,501 A | 3/2000 | Kawakami |
| 6,040,669 A | 3/2000 | Hog |
| 6,041,471 A | 3/2000 | Charky et al. |
| 6,041,472 A | 3/2000 | Kasen et al. |
| 6,046,800 A | 4/2000 | Ohtomo et al. |
| 6,049,620 A | 4/2000 | Dickinson et al. |
| 6,050,648 A | 4/2000 | Keleny |
| 6,052,821 A | 4/2000 | Chouly et al. |
| 6,055,042 A | 4/2000 | Sarangapani |
| 6,055,702 A | 5/2000 | Imamura et al. |
| 6,061,868 A | 5/2000 | Moritsch et al. |
| 6,065,182 A | 5/2000 | Wright et al. |
| 6,070,290 A | 6/2000 | Schwarze et al. |
| 6,073,432 A | 6/2000 | Schaedler |
| 6,076,025 A | 6/2000 | Ueno et al. |
| 6,076,026 A | 6/2000 | Jambhekar et al. |
| 6,076,226 A | 6/2000 | Reed |
| 6,076,227 A | 6/2000 | Schallig et al. |
| 6,081,257 A | 6/2000 | Zeller |
| 6,088,020 A | 7/2000 | Mor |
| 6,094,775 A | 8/2000 | Behmer |
| 6,099,091 A | 8/2000 | Campbell |
| 6,101,671 A | 8/2000 | Wright et al. |
| 6,108,031 A | 8/2000 | King et al. |
| 6,108,067 A | 8/2000 | Okamoto |
| 6,108,076 A | 8/2000 | Hanseder |
| 6,108,269 A | 8/2000 | Kabel |
| 6,108,597 A | 8/2000 | Kirchner et al. |
| 6,108,859 A | 8/2000 | Burgoon |
| 6,112,143 A | 8/2000 | Allen et al. |
| 6,112,996 A | 9/2000 | Matsuo |
| 6,119,457 A | 9/2000 | Kawamura |
| 6,122,798 A | 9/2000 | Kobayashi et al. |
| 6,124,694 A | 9/2000 | Bancroft et al. |
| 6,125,498 A | 10/2000 | Roberts et al. |
| 6,131,237 A | 10/2000 | Kasper et al. |
| 6,138,063 A | 10/2000 | Himeda |
| 6,142,252 A | 11/2000 | Kinto et al. |
| 6,146,041 A | 11/2000 | Chen et al. |
| 6,146,278 A | 11/2000 | Kobayashi |
| 6,154,279 A | 11/2000 | Thayer |
| 6,154,694 A | 11/2000 | Aoki et al. |
| 6,160,479 A | 12/2000 | Åhlén et al. |
| 6,167,587 B1 | 1/2001 | Kasper et al. |
| 6,192,548 B1 | 2/2001 | Huffman |
| 6,192,549 B1 | 2/2001 | Kasen et al. |
| 6,202,243 B1 | 3/2001 | Beaufoy et al. |
| 6,216,307 B1 | 4/2001 | Kaleta et al. |
| 6,220,865 B1 | 4/2001 | Macri et al. |
| 6,226,830 B1 | 5/2001 | Hendriks et al. |
| 6,230,362 B1 | 5/2001 | Kasper et al. |
| 6,237,741 B1 | 5/2001 | Guidetti |
| 6,240,342 B1 | 5/2001 | Fiegert et al. |
| 6,243,913 B1 | 6/2001 | Frank et al. |
| 6,255,793 B1 | 7/2001 | Peless et al. |
| 6,259,979 B1 | 7/2001 | Holmquist |
| 6,261,379 B1 | 7/2001 | Conrad et al. |
| 6,263,539 B1 | 7/2001 | Baig |
| 6,263,989 B1 | 7/2001 | Won |
| 6,272,936 B1 | 8/2001 | Oreper et al. |
| 6,276,478 B1 | 8/2001 | Hopkins et al. |
| 6,278,918 B1 | 8/2001 | Dickson et al. |
| 6,279,196 B2 | 8/2001 | Kasen et al. |
| 6,282,526 B1 | 8/2001 | Ganesh |
| 6,283,034 B1 | 9/2001 | Miles |
| 6,285,778 B1 | 9/2001 | Nakajima et al. |
| 6,285,930 B1 | 9/2001 | Dickson et al. |
| 6,286,181 B1 | 9/2001 | Kasper et al. |

(56) References Cited

U.S. PATENT DOCUMENTS

| | | |
|---|---|---|
| 6,300,737 B1 | 10/2001 | Bergvall et al. |
| 6,321,337 B1 | 11/2001 | Reshef et al. |
| 6,321,515 B1 | 11/2001 | Colens |
| 6,323,570 B1 | 11/2001 | Nishimura et al. |
| 6,324,714 B1 | 12/2001 | Walz et al. |
| 6,327,741 B1 | 12/2001 | Reed |
| 6,332,400 B1 | 12/2001 | Meyer |
| 6,339,735 B1 | 1/2002 | Peless et al. |
| 6,362,875 B1 | 3/2002 | Burkley |
| 6,370,453 B2 | 4/2002 | Sommer |
| 6,374,155 B1 | 4/2002 | Wallach et al. |
| 6,374,157 B1 | 4/2002 | Takamura |
| 6,381,802 B2 | 5/2002 | Park |
| 6,385,515 B1 | 5/2002 | Dickson et al. |
| 6,388,013 B1 | 5/2002 | Saraf et al. |
| 6,389,329 B1 | 5/2002 | Colens |
| 6,397,429 B1 | 6/2002 | Legatt et al. |
| 6,400,048 B1 | 6/2002 | Nishimura et al. |
| 6,401,294 B2 | 6/2002 | Kasper |
| 6,408,226 B1 | 6/2002 | Byrne et al. |
| 6,412,141 B2 | 7/2002 | Kasper et al. |
| 6,415,203 B1 | 7/2002 | Inoue et al. |
| 6,418,586 B2 | 7/2002 | Fulghum |
| 6,421,870 B1 | 7/2002 | Basham et al. |
| 6,427,285 B1 | 8/2002 | Legatt et al. |
| 6,430,471 B1 | 8/2002 | Kintou et al. |
| 6,431,296 B1 | 8/2002 | Won |
| 6,437,227 B1 | 8/2002 | Theimer |
| 6,437,465 B1 | 8/2002 | Nishimura et al. |
| 6,438,456 B1 | 8/2002 | Feddema et al. |
| 6,438,793 B1 | 8/2002 | Miner et al. |
| 6,442,476 B1 | 8/2002 | Poropat |
| 6,442,789 B1 | 9/2002 | Legatt et al. |
| 6,443,509 B1 | 9/2002 | Levin et al. |
| 6,444,003 B1 | 9/2002 | Sutcliffe |
| 6,446,302 B1 | 9/2002 | Kasper et al. |
| 6,454,036 B1 | 9/2002 | Airey et al. |
| D464,091 S | 10/2002 | Christianson |
| 6,457,206 B1 | 10/2002 | Judson |
| 6,459,955 B1 | 10/2002 | Bartsch et al. |
| 6,463,368 B1 | 10/2002 | Feiten et al. |
| 6,465,982 B1 | 10/2002 | Bergvall et al. |
| 6,473,167 B1 | 10/2002 | Odell |
| 6,480,762 B1 | 11/2002 | Uchikubo et al. |
| 6,481,515 B1 * | 11/2002 | Kirkpatrick et al. .......... 180/65.1 |
| 6,490,539 B1 | 12/2002 | Dickson et al. |
| 6,491,127 B1 | 12/2002 | Holmberg et al. |
| 6,493,612 B1 | 12/2002 | Bisset et al. |
| 6,493,613 B2 | 12/2002 | Peless et al. |
| 6,496,754 B2 | 12/2002 | Song et al. |
| 6,496,755 B2 | 12/2002 | Wallach et al. |
| 6,502,657 B2 | 1/2003 | Kerrebrock et al. |
| 6,504,610 B1 | 1/2003 | Bauer et al. |
| 6,507,773 B2 | 1/2003 | Parker et al. |
| 6,519,808 B2 | 2/2003 | Legatt et al. |
| 6,525,509 B1 | 2/2003 | Petersson et al. |
| D471,243 S | 3/2003 | Cioffi et al. |
| 6,530,102 B1 | 3/2003 | Pierce et al. |
| 6,530,117 B2 | 3/2003 | Peterson |
| 6,532,404 B2 | 3/2003 | Colens |
| 6,535,793 B2 | 3/2003 | Allard |
| 6,540,424 B1 | 4/2003 | Hall et al. |
| 6,540,607 B2 | 4/2003 | Mokris et al. |
| 6,548,982 B1 | 4/2003 | Papanikolopoulos et al. |
| 6,553,612 B1 | 4/2003 | Dyson et al. |
| 6,556,722 B1 | 4/2003 | Russell et al. |
| 6,556,892 B2 | 4/2003 | Kuroki et al. |
| 6,557,104 B2 | 4/2003 | Vu et al. |
| D474,312 S | 5/2003 | Stephens et al. |
| 6,563,130 B2 | 5/2003 | Dworkowski et al. |
| 6,571,415 B2 | 6/2003 | Gerber et al. |
| 6,571,422 B1 | 6/2003 | Gordon et al. |
| 6,572,711 B2 | 6/2003 | Sclafani et al. |
| 6,574,536 B1 | 6/2003 | Kawagoe et al. |
| 6,580,246 B2 | 6/2003 | Jacobs |
| 6,584,376 B1 | 6/2003 | Van |
| 6,586,908 B2 | 7/2003 | Petersson et al. |
| 6,587,573 B1 | 7/2003 | Stam et al. |
| 6,590,222 B1 | 7/2003 | Bisset et al. |
| 6,594,551 B2 | 7/2003 | McKinney et al. |
| 6,594,844 B2 | 7/2003 | Jones |
| D478,884 S | 8/2003 | Slipy et al. |
| 6,601,265 B1 | 8/2003 | Burlington |
| 6,604,021 B2 | 8/2003 | Imai et al. |
| 6,604,022 B2 | 8/2003 | Parker et al. |
| 6,605,156 B1 | 8/2003 | Clark et al. |
| 6,609,269 B2 | 8/2003 | Kasper |
| 6,611,120 B2 | 8/2003 | Song et al. |
| 6,611,734 B2 | 8/2003 | Parker et al. |
| 6,611,738 B2 | 8/2003 | Ruffner |
| 6,615,108 B1 | 9/2003 | Peless et al. |
| 6,615,434 B1 | 9/2003 | Davis et al. |
| 6,615,885 B1 | 9/2003 | Ohm |
| 6,622,465 B2 | 9/2003 | Jerome et al. |
| 6,624,744 B1 | 9/2003 | Wilson et al. |
| 6,625,843 B2 | 9/2003 | Kim et al. |
| 6,629,028 B2 | 9/2003 | Paromtchik et al. |
| 6,633,150 B1 | 10/2003 | Wallach et al. |
| 6,637,546 B1 | 10/2003 | Wang |
| 6,639,659 B2 | 10/2003 | Granger |
| 6,658,325 B2 | 12/2003 | Zweig |
| 6,658,354 B2 | 12/2003 | Lin |
| 6,658,692 B2 | 12/2003 | Lenkiewicz et al. |
| 6,658,693 B1 | 12/2003 | Reed |
| 6,661,239 B1 | 12/2003 | Ozick |
| 6,662,889 B2 | 12/2003 | De et al. |
| 6,668,951 B2 | 12/2003 | Won |
| 6,670,817 B2 | 12/2003 | Fournier et al. |
| 6,671,592 B1 | 12/2003 | Bisset et al. |
| 6,671,925 B2 | 1/2004 | Field et al. |
| 6,687,571 B1 | 2/2004 | Byrne et al. |
| 6,690,134 B1 | 2/2004 | Jones et al. |
| 6,690,993 B2 | 2/2004 | Foulke et al. |
| 6,697,147 B2 | 2/2004 | Ko et al. |
| 6,705,332 B2 | 3/2004 | Field et al. |
| 6,711,280 B2 | 3/2004 | Stafsudd et al. |
| 6,732,826 B2 | 5/2004 | Song et al. |
| 6,735,811 B2 | 5/2004 | Field et al. |
| 6,735,812 B2 | 5/2004 | Hekman et al. |
| 6,737,591 B1 | 5/2004 | Lapstun et al. |
| 6,741,054 B2 | 5/2004 | Koselka et al. |
| 6,741,364 B2 | 5/2004 | Lange et al. |
| 6,748,297 B2 | 6/2004 | Song et al. |
| 6,756,703 B2 | 6/2004 | Chang |
| 6,760,647 B2 | 7/2004 | Nourbakhsh et al. |
| 6,764,373 B1 | 7/2004 | Osawa et al. |
| 6,769,004 B2 | 7/2004 | Barrett |
| 6,774,596 B1 | 8/2004 | Bisset |
| 6,779,380 B1 | 8/2004 | Nieuwkamp |
| 6,781,338 B2 | 8/2004 | Jones et al. |
| 6,809,490 B2 | 10/2004 | Jones et al. |
| 6,810,305 B2 | 10/2004 | Kirkpatrick |
| 6,810,350 B2 | 10/2004 | Blakley |
| 6,830,120 B1 | 12/2004 | Yashima et al. |
| 6,832,407 B2 | 12/2004 | Salem et al. |
| 6,836,701 B2 | 12/2004 | McKee |
| 6,841,963 B2 | 1/2005 | Song et al. |
| 6,845,297 B2 | 1/2005 | Allard |
| 6,848,146 B2 | 2/2005 | Wright et al. |
| 6,854,148 B1 | 2/2005 | Rief et al. |
| 6,856,811 B2 | 2/2005 | Burdue et al. |
| 6,859,010 B2 | 2/2005 | Jeon et al. |
| 6,859,682 B2 | 2/2005 | Naka et al. |
| 6,860,206 B1 | 3/2005 | Rudakevych et al. |
| 6,865,447 B2 | 3/2005 | Lau et al. |
| 6,870,792 B2 | 3/2005 | Chiappetta |
| 6,871,115 B2 | 3/2005 | Huang et al. |
| 6,883,201 B2 | 4/2005 | Jones et al. |
| 6,886,651 B1 | 5/2005 | Slocum et al. |
| 6,888,333 B2 | 5/2005 | Laby |
| 6,901,624 B2 | 6/2005 | Mori et al. |
| 6,906,702 B1 | 6/2005 | Tanaka et al. |
| 6,914,403 B2 | 7/2005 | Tsurumi |
| 6,917,854 B2 | 7/2005 | Bayer |

(56) References Cited

U.S. PATENT DOCUMENTS

| | | |
|---|---|---|
| 6,925,679 B2 | 8/2005 | Wallach et al. |
| 6,929,548 B2 | 8/2005 | Wang |
| D510,066 S | 9/2005 | Hickey et al. |
| 6,938,298 B2 | 9/2005 | Aasen |
| 6,940,291 B1 | 9/2005 | Ozick |
| 6,941,199 B1 | 9/2005 | Bottomley et al. |
| 6,956,348 B2 | 10/2005 | Landry et al. |
| 6,957,712 B2 | 10/2005 | Song et al. |
| 6,960,986 B2 | 11/2005 | Asama et al. |
| 6,965,209 B2 | 11/2005 | Jones et al. |
| 6,965,211 B2 | 11/2005 | Tsurumi |
| 6,968,592 B2 | 11/2005 | Takeuchi et al. |
| 6,971,140 B2 | 12/2005 | Kim |
| 6,975,246 B1 | 12/2005 | Trudeau |
| 6,980,229 B1 | 12/2005 | Ebersole |
| 6,985,556 B2 | 1/2006 | Shanmugavel et al. |
| 6,993,954 B1 | 2/2006 | George et al. |
| 6,999,850 B2 | 2/2006 | McDonald |
| 7,013,527 B2 * | 3/2006 | Thomas et al. ............. 15/319 |
| 7,024,278 B2 | 4/2006 | Chiappetta et al. |
| 7,024,280 B2 | 4/2006 | Parker et al. |
| 7,027,893 B2 | 4/2006 | Perry et al. |
| 7,030,768 B2 | 4/2006 | Wanie |
| 7,031,805 B2 | 4/2006 | Lee et al. |
| 7,032,469 B2 | 4/2006 | Bailey |
| 7,040,869 B2 | 5/2006 | Beenker |
| 7,051,399 B2 | 5/2006 | Field et al. |
| 7,053,578 B2 | 5/2006 | Diehl et al. |
| 7,054,716 B2 | 5/2006 | McKee et al. |
| 7,055,210 B2 | 6/2006 | Keppler et al. |
| 7,057,120 B2 | 6/2006 | Ma et al. |
| 7,057,643 B2 | 6/2006 | Iida et al. |
| 7,059,012 B2 | 6/2006 | Song et al. |
| 7,065,430 B2 | 6/2006 | Naka et al. |
| 7,066,291 B2 | 6/2006 | Martins et al. |
| 7,069,124 B1 | 6/2006 | Whittaker et al. |
| 7,079,923 B2 | 7/2006 | Abramson et al. |
| 7,085,623 B2 | 8/2006 | Siegers |
| 7,085,624 B2 | 8/2006 | Aldred et al. |
| 7,113,847 B2 | 9/2006 | Chmura et al. |
| 7,133,746 B2 | 11/2006 | Abramson et al. |
| 7,142,198 B2 | 11/2006 | Lee |
| 7,148,458 B2 | 12/2006 | Schell et al. |
| 7,155,308 B2 | 12/2006 | Jones |
| 7,167,775 B2 | 1/2007 | Abramson et al. |
| 7,171,285 B2 | 1/2007 | Kim et al. |
| 7,173,391 B2 | 2/2007 | Jones et al. |
| 7,174,238 B1 | 2/2007 | Zweig |
| 7,188,000 B2 | 3/2007 | Chiappetta et al. |
| 7,193,384 B1 | 3/2007 | Norman et al. |
| 7,196,487 B2 | 3/2007 | Jones et al. |
| 7,201,786 B2 | 4/2007 | Wegelin et al. |
| 7,206,677 B2 | 4/2007 | Hulden |
| 7,211,980 B1 | 5/2007 | Bruemmer et al. |
| 7,225,500 B2 | 6/2007 | Diehl et al. |
| 7,246,405 B2 | 7/2007 | Yan |
| 7,248,951 B2 | 7/2007 | Hulden |
| 7,275,280 B2 | 10/2007 | Haegermarck et al. |
| 7,283,892 B1 | 10/2007 | Boillot et al. |
| 7,288,912 B2 | 10/2007 | Landry et al. |
| 7,318,248 B1 | 1/2008 | Yan |
| 7,320,149 B1 * | 1/2008 | Huffman et al. ............. 15/320 |
| 7,321,807 B2 | 1/2008 | Laski |
| 7,324,870 B2 | 1/2008 | Lee |
| 7,328,196 B2 | 2/2008 | Peters |
| 7,332,890 B2 | 2/2008 | Cohen et al. |
| 7,346,428 B1 | 3/2008 | Huffman et al. |
| 7,352,153 B2 | 4/2008 | Yan |
| 7,359,766 B2 | 4/2008 | Jeon et al. |
| 7,360,277 B2 | 4/2008 | Moshenrose et al. |
| 7,363,108 B2 | 4/2008 | Noda et al. |
| 7,388,879 B2 | 6/2008 | Sabe et al. |
| 7,389,156 B2 | 6/2008 | Ziegler et al. |
| 7,389,166 B2 | 6/2008 | Harwig et al. |
| 7,408,157 B2 | 8/2008 | Yan |
| 7,418,762 B2 | 9/2008 | Arai et al. |
| 7,430,455 B2 | 9/2008 | Casey et al. |
| 7,430,462 B2 | 9/2008 | Chiu et al. |
| 7,441,298 B2 | 10/2008 | Svendsen et al. |
| 7,444,206 B2 | 10/2008 | Abramson et al. |
| 7,448,113 B2 | 11/2008 | Jones et al. |
| 7,459,871 B2 | 12/2008 | Landry et al. |
| 7,467,026 B2 | 12/2008 | Sakagami et al. |
| 7,474,941 B2 | 1/2009 | Kim et al. |
| 7,503,096 B2 | 3/2009 | Lin |
| 7,515,991 B2 | 4/2009 | Egawa et al. |
| 7,539,557 B2 | 5/2009 | Yamauchi |
| 7,555,363 B2 | 6/2009 | Augenbraun et al. |
| 7,557,703 B2 | 7/2009 | Yamada et al. |
| 7,568,259 B2 | 8/2009 | Yan |
| 7,571,511 B2 | 8/2009 | Jones et al. |
| 7,578,020 B2 | 8/2009 | Jaworski et al. |
| 7,600,521 B2 | 10/2009 | Woo |
| 7,603,744 B2 | 10/2009 | Reindle |
| 7,611,583 B2 | 11/2009 | Buckley et al. |
| 7,617,557 B2 | 11/2009 | Reindle |
| 7,620,476 B2 | 11/2009 | Morse et al. |
| 7,636,982 B2 | 12/2009 | Jones et al. |
| 7,647,144 B2 | 1/2010 | Haegermarck |
| 7,650,666 B2 | 1/2010 | Jang |
| 7,660,650 B2 | 2/2010 | Kawagoe et al. |
| 7,663,333 B2 | 2/2010 | Jones et al. |
| 7,693,605 B2 | 4/2010 | Park |
| 7,706,917 B1 | 4/2010 | Chiappetta et al. |
| 7,761,954 B2 * | 7/2010 | Ziegler et al. ............. 15/320 |
| 7,765,635 B2 | 8/2010 | Park |
| 7,784,147 B2 | 8/2010 | Burkholder et al. |
| 7,801,645 B2 | 9/2010 | Taylor et al. |
| 7,805,220 B2 | 9/2010 | Taylor et al. |
| 7,809,944 B2 | 10/2010 | Kawamoto |
| 7,832,048 B2 * | 11/2010 | Harwig et al. ............. 15/320 |
| 7,849,555 B2 | 12/2010 | Hahm et al. |
| 7,853,645 B2 | 12/2010 | Brown et al. |
| 7,920,941 B2 | 4/2011 | Park et al. |
| 7,937,800 B2 | 5/2011 | Yan |
| 7,957,836 B2 | 6/2011 | Myeong et al. |
| 2001/0004719 A1 | 6/2001 | Sommer |
| 2001/0013929 A1 | 8/2001 | Torsten |
| 2001/0020200 A1 | 9/2001 | Das et al. |
| 2001/0025183 A1 | 9/2001 | Shahidi |
| 2001/0037163 A1 | 11/2001 | Allard |
| 2001/0043509 A1 | 11/2001 | Green et al. |
| 2001/0045883 A1 | 11/2001 | Holdaway et al. |
| 2001/0047231 A1 | 11/2001 | Peless et al. |
| 2001/0047895 A1 | 12/2001 | De et al. |
| 2002/0011367 A1 | 1/2002 | Kolesnik |
| 2002/0011813 A1 | 1/2002 | Koselka et al. |
| 2002/0016649 A1 | 2/2002 | Jones |
| 2002/0021219 A1 | 2/2002 | Edwards |
| 2002/0027652 A1 | 3/2002 | Paromtchik et al. |
| 2002/0036779 A1 | 3/2002 | Kiyoi et al. |
| 2002/0081937 A1 | 6/2002 | Yamada et al. |
| 2002/0095239 A1 | 7/2002 | Wallach et al. |
| 2002/0097400 A1 | 7/2002 | Jung et al. |
| 2002/0104963 A1 | 8/2002 | Mancevski |
| 2002/0108209 A1 | 8/2002 | Peterson |
| 2002/0112742 A1 | 8/2002 | Bredo et al. |
| 2002/0113973 A1 | 8/2002 | Ge |
| 2002/0116089 A1 | 8/2002 | Kirkpatrick |
| 2002/0120364 A1 | 8/2002 | Colens |
| 2002/0124343 A1 | 9/2002 | Reed |
| 2002/0153185 A1 | 10/2002 | Song et al. |
| 2002/0156556 A1 | 10/2002 | Ruffner |
| 2002/0159051 A1 | 10/2002 | Guo |
| 2002/0166193 A1 | 11/2002 | Kasper |
| 2002/0169521 A1 | 11/2002 | Goodman et al. |
| 2002/0173877 A1 | 11/2002 | Zweig |
| 2002/0189871 A1 | 12/2002 | Won |
| 2003/0009259 A1 | 1/2003 | Hattori et al. |
| 2003/0015232 A1 | 1/2003 | Nguyen |
| 2003/0019071 A1 | 1/2003 | Field et al. |
| 2003/0023356 A1 | 1/2003 | Keable |
| 2003/0024986 A1 | 2/2003 | Mazz et al. |
| 2003/0025472 A1 | 2/2003 | Jones et al. |

(56) References Cited

U.S. PATENT DOCUMENTS

| | | |
|---|---|---|
| 2003/0028286 A1 | 2/2003 | Glenn et al. |
| 2003/0030399 A1 | 2/2003 | Jacobs |
| 2003/0058262 A1 | 3/2003 | Sato et al. |
| 2003/0060928 A1 | 3/2003 | Abramson et al. |
| 2003/0067451 A1 | 4/2003 | Tagg et al. |
| 2003/0097875 A1 | 5/2003 | Lentz et al. |
| 2003/0120389 A1 | 6/2003 | Abramson et al. |
| 2003/0124312 A1 | 7/2003 | Autumn |
| 2003/0126352 A1 | 7/2003 | Barrett |
| 2003/0137268 A1 | 7/2003 | Papanikolopoulos et al. |
| 2003/0146384 A1 | 8/2003 | Logsdon et al. |
| 2003/0159232 A1 | 8/2003 | Hekman et al. |
| 2003/0168081 A1 | 9/2003 | Lee et al. |
| 2003/0175138 A1 | 9/2003 | Beenker |
| 2003/0192144 A1 | 10/2003 | Song et al. |
| 2003/0193657 A1 | 10/2003 | Uomori et al. |
| 2003/0216834 A1 | 11/2003 | Allard |
| 2003/0221114 A1 | 11/2003 | Hino et al. |
| 2003/0229421 A1 | 12/2003 | Chmura et al. |
| 2003/0229474 A1 | 12/2003 | Suzuki et al. |
| 2003/0233171 A1 | 12/2003 | Heiligensetzer |
| 2003/0233177 A1 | 12/2003 | Johnson et al. |
| 2003/0233870 A1 | 12/2003 | Mancevski |
| 2003/0233930 A1 | 12/2003 | Ozick |
| 2004/0016077 A1 | 1/2004 | Song et al. |
| 2004/0020000 A1 | 2/2004 | Jones |
| 2004/0030448 A1 | 2/2004 | Solomon |
| 2004/0030449 A1 | 2/2004 | Solomon |
| 2004/0030450 A1 | 2/2004 | Solomon |
| 2004/0030451 A1 | 2/2004 | Solomon |
| 2004/0030570 A1 | 2/2004 | Solomon |
| 2004/0030571 A1 | 2/2004 | Solomon |
| 2004/0031113 A1 | 2/2004 | Wosewick et al. |
| 2004/0049877 A1 | 3/2004 | Jones et al. |
| 2004/0055163 A1 | 3/2004 | McCambridge et al. |
| 2004/0068351 A1 | 4/2004 | Solomon |
| 2004/0068415 A1 | 4/2004 | Solomon |
| 2004/0068416 A1 | 4/2004 | Solomon |
| 2004/0074038 A1 | 4/2004 | Im et al. |
| 2004/0074044 A1 | 4/2004 | Diehl et al. |
| 2004/0076324 A1 | 4/2004 | Burl et al. |
| 2004/0083570 A1 | 5/2004 | Song et al. |
| 2004/0085037 A1 | 5/2004 | Jones et al. |
| 2004/0088079 A1 | 5/2004 | Lavarec et al. |
| 2004/0093122 A1 | 5/2004 | Galibraith |
| 2004/0098167 A1 | 5/2004 | Yi et al. |
| 2004/0111184 A1 | 6/2004 | Chiappetta et al. |
| 2004/0111821 A1 | 6/2004 | Lenkiewicz et al. |
| 2004/0113777 A1 | 6/2004 | Matsuhira et al. |
| 2004/0117064 A1 | 6/2004 | McDonald |
| 2004/0117846 A1 | 6/2004 | Karaoguz et al. |
| 2004/0118998 A1 | 6/2004 | Wingett et al. |
| 2004/0128028 A1 | 7/2004 | Miyamoto et al. |
| 2004/0133316 A1 | 7/2004 | Dean |
| 2004/0134336 A1 | 7/2004 | Solomon |
| 2004/0134337 A1 | 7/2004 | Solomon |
| 2004/0143919 A1 | 7/2004 | Wilder |
| 2004/0148419 A1 | 7/2004 | Chen et al. |
| 2004/0148731 A1 | 8/2004 | Damman et al. |
| 2004/0153212 A1 | 8/2004 | Profio et al. |
| 2004/0156541 A1 | 8/2004 | Jeon et al. |
| 2004/0158357 A1 | 8/2004 | Lee et al. |
| 2004/0181706 A1 | 9/2004 | Chen et al. |
| 2004/0187249 A1 | 9/2004 | Jones et al. |
| 2004/0187457 A1 | 9/2004 | Colens |
| 2004/0196451 A1 | 10/2004 | Aoyama |
| 2004/0200505 A1 | 10/2004 | Taylor et al. |
| 2004/0204792 A1 | 10/2004 | Taylor et al. |
| 2004/0210345 A1 | 10/2004 | Noda et al. |
| 2004/0210347 A1 | 10/2004 | Sawada et al. |
| 2004/0211444 A1 | 10/2004 | Taylor et al. |
| 2004/0221790 A1 | 11/2004 | Sinclair et al. |
| 2004/0236468 A1 | 11/2004 | Taylor et al. |
| 2004/0244138 A1 | 12/2004 | Taylor et al. |
| 2004/0255425 A1 | 12/2004 | Arai et al. |
| 2005/0000543 A1 | 1/2005 | Taylor et al. |
| 2005/0010330 A1 | 1/2005 | Abramson et al. |
| 2005/0010331 A1 | 1/2005 | Taylor et al. |
| 2005/0021181 A1 | 1/2005 | Kim et al. |
| 2005/0028316 A1 | 2/2005 | Thomas et al. |
| 2005/0053912 A1 | 3/2005 | Roth et al. |
| 2005/0055796 A1 | 3/2005 | Wright et al. |
| 2005/0067994 A1 | 3/2005 | Jones et al. |
| 2005/0081782 A1 | 4/2005 | Buckley et al. |
| 2005/0085947 A1 | 4/2005 | Aldred et al. |
| 2005/0091782 A1 | 5/2005 | Gordon et al. |
| 2005/0091786 A1 | 5/2005 | Wright et al. |
| 2005/0137749 A1 | 6/2005 | Jeon et al. |
| 2005/0144751 A1 | 7/2005 | Kegg et al. |
| 2005/0150074 A1 | 7/2005 | Diehl et al. |
| 2005/0150519 A1 | 7/2005 | Keppler et al. |
| 2005/0154795 A1 | 7/2005 | Kuz et al. |
| 2005/0156562 A1 | 7/2005 | Cohen et al. |
| 2005/0165508 A1 | 7/2005 | Kanda et al. |
| 2005/0166354 A1 | 8/2005 | Uehigashi |
| 2005/0166355 A1 | 8/2005 | Tani |
| 2005/0172445 A1 | 8/2005 | Diehl et al. |
| 2005/0183229 A1 | 8/2005 | Uehigashi |
| 2005/0183230 A1 | 8/2005 | Uehigashi |
| 2005/0187678 A1 | 8/2005 | Myeong et al. |
| 2005/0192707 A1 | 9/2005 | Park et al. |
| 2005/0204717 A1 | 9/2005 | Colens |
| 2005/0209736 A1 | 9/2005 | Kawagoe |
| 2005/0211880 A1 | 9/2005 | Schell et al. |
| 2005/0212929 A1 | 9/2005 | Schell et al. |
| 2005/0213082 A1 | 9/2005 | DiBernardo et al. |
| 2005/0213109 A1 | 9/2005 | Schell et al. |
| 2005/0217042 A1 | 10/2005 | Reindle |
| 2005/0218852 A1 | 10/2005 | Landry et al. |
| 2005/0222933 A1 | 10/2005 | Wesby |
| 2005/0229340 A1 | 10/2005 | Sawalski et al. |
| 2005/0229355 A1 | 10/2005 | Crouch et al. |
| 2005/0235451 A1 | 10/2005 | Yan |
| 2005/0251292 A1 | 11/2005 | Casey et al. |
| 2005/0255425 A1 | 11/2005 | Pierson |
| 2005/0258154 A1 | 11/2005 | Blankenship et al. |
| 2005/0273967 A1 | 12/2005 | Taylor et al. |
| 2005/0288819 A1 | 12/2005 | de |
| 2006/0000050 A1 | 1/2006 | Cipolla et al. |
| 2006/0009879 A1 | 1/2006 | Lynch et al. |
| 2006/0010638 A1 | 1/2006 | Shimizu et al. |
| 2006/0020369 A1 | 1/2006 | Taylor et al. |
| 2006/0020370 A1 | 1/2006 | Abramson |
| 2006/0021168 A1 | 2/2006 | Nishikawa |
| 2006/0025134 A1 | 2/2006 | Cho et al. |
| 2006/0037170 A1 | 2/2006 | Shimizu |
| 2006/0042042 A1 | 3/2006 | Mertes et al. |
| 2006/0044546 A1 | 3/2006 | Lewin et al. |
| 2006/0060216 A1 | 3/2006 | Woo |
| 2006/0061657 A1 | 3/2006 | Rew et al. |
| 2006/0064828 A1 | 3/2006 | Stein et al. |
| 2006/0087273 A1 | 4/2006 | Ko et al. |
| 2006/0089765 A1 | 4/2006 | Pack et al. |
| 2006/0100741 A1 | 5/2006 | Jung |
| 2006/0107894 A1 | 5/2006 | Buckley et al. |
| 2006/0119839 A1 | 6/2006 | Bertin et al. |
| 2006/0143295 A1 | 6/2006 | Costa et al. |
| 2006/0146776 A1 | 7/2006 | Kim |
| 2006/0150361 A1 | 7/2006 | Aldred et al. |
| 2006/0184293 A1 | 8/2006 | Konandreas et al. |
| 2006/0185690 A1* | 8/2006 | Song et al. ............... 134/21 |
| 2006/0190133 A1 | 8/2006 | Konandreas et al. |
| 2006/0190146 A1 | 8/2006 | Morse et al. |
| 2006/0196003 A1 | 9/2006 | Song et al. |
| 2006/0200281 A1 | 9/2006 | Ziegler et al. |
| 2006/0220900 A1 | 10/2006 | Ceskutti et al. |
| 2006/0259194 A1 | 11/2006 | Chiu |
| 2006/0259494 A1 | 11/2006 | Watson et al. |
| 2006/0278161 A1 | 12/2006 | Burkholder et al. |
| 2006/0288519 A1 | 12/2006 | Jaworski et al. |
| 2006/0293787 A1 | 12/2006 | Kanda et al. |
| 2007/0006404 A1 | 1/2007 | Cheng et al. |
| 2007/0016328 A1 | 1/2007 | Ziegler et al. |
| 2007/0017061 A1 | 1/2007 | Yan |

(56) References Cited

U.S. PATENT DOCUMENTS

| | | |
|---|---|---|
| 2007/0028574 A1 | 2/2007 | Yan |
| 2007/0032904 A1 | 2/2007 | Kawagoe et al. |
| 2007/0042716 A1 | 2/2007 | Goodall et al. |
| 2007/0043459 A1 | 2/2007 | Abbott et al. |
| 2007/0061041 A1 | 3/2007 | Zweig |
| 2007/0114975 A1 | 5/2007 | Cohen et al. |
| 2007/0142964 A1 | 6/2007 | Abramson |
| 2007/0150096 A1 | 6/2007 | Yeh et al. |
| 2007/0156286 A1 | 7/2007 | Yamauchi |
| 2007/0157415 A1 | 7/2007 | Lee et al. |
| 2007/0157420 A1 | 7/2007 | Lee et al. |
| 2007/0179670 A1 | 8/2007 | Chiappetta et al. |
| 2007/0226949 A1 | 10/2007 | Hahm et al. |
| 2007/0234492 A1 | 10/2007 | Svendsen et al. |
| 2007/0244610 A1 | 10/2007 | Ozick et al. |
| 2007/0250212 A1 | 10/2007 | Halloran et al. |
| 2007/0261193 A1 | 11/2007 | Gordon et al. |
| 2007/0266508 A1 | 11/2007 | Jones et al. |
| 2008/0007203 A1 | 1/2008 | Cohen et al. |
| 2008/0039974 A1 | 2/2008 | Sandin et al. |
| 2008/0052846 A1 | 3/2008 | Kapoor et al. |
| 2008/0091304 A1 | 4/2008 | Ozick et al. |
| 2008/0109126 A1 | 5/2008 | Sandin et al. |
| 2008/0134458 A1 | 6/2008 | Ziegler et al. |
| 2008/0140255 A1 | 6/2008 | Ziegler et al. |
| 2008/0155768 A1 | 7/2008 | Ziegler et al. |
| 2008/0184518 A1 | 8/2008 | Taylor |
| 2008/0276407 A1 | 11/2008 | Schnittman et al. |
| 2008/0281470 A1 | 11/2008 | Gilbert et al. |
| 2008/0282494 A1 | 11/2008 | Won et al. |
| 2008/0294288 A1 | 11/2008 | Yamauchi |
| 2008/0302586 A1 | 12/2008 | Yan |
| 2008/0307590 A1 | 12/2008 | Jones et al. |
| 2009/0007366 A1 | 1/2009 | Svendsen et al. |
| 2009/0038089 A1 | 2/2009 | Landry et al. |
| 2009/0049640 A1 | 2/2009 | Lee et al. |
| 2009/0055022 A1 | 2/2009 | Casey et al. |
| 2009/0102296 A1 | 4/2009 | Greene et al. |
| 2009/0292393 A1 | 11/2009 | Casey et al. |
| 2010/0006028 A1 | 1/2010 | Buckley et al. |
| 2010/0011529 A1 | 1/2010 | Won et al. |
| 2010/0049365 A1 | 2/2010 | Jones et al. |
| 2010/0063628 A1 | 3/2010 | Landry et al. |
| 2010/0107355 A1 | 5/2010 | Won et al. |
| 2010/0257690 A1 | 10/2010 | Jones et al. |
| 2010/0257691 A1 | 10/2010 | Jones et al. |
| 2010/0263158 A1 | 10/2010 | Jones et al. |
| 2010/0268384 A1 | 10/2010 | Jones et al. |
| 2010/0312429 A1 | 12/2010 | Jones et al. |

FOREIGN PATENT DOCUMENTS

| | | |
|---|---|---|
| DE | 3536907 C2 | 2/1989 |
| DE | 3404202 C2 | 12/1992 |
| DE | 199311014 U1 | 10/1993 |
| DE | 4338841 A1 | 5/1995 |
| DE | 4414683 A1 | 10/1995 |
| DE | 19849978 | 2/2001 |
| DE | 10242257 | 9/2002 |
| DE | 102004038074.0 | 6/2005 |
| DE | 10357636 | 7/2005 |
| DE | 102004041021 | 8/2005 |
| DE | 102005046813 A1 | 4/2007 |
| DK | 338988 | 12/1988 |
| EP | 0281085 A2 | 9/1988 |
| EP | 307381 | 3/1989 |
| EP | 358628 | 3/1990 |
| EP | 0437024 A1 | 7/1991 |
| EP | 479273 | 4/1992 |
| EP | 0554978 A2 | 8/1993 |
| EP | 0615719 A1 | 9/1994 |
| EP | 0792726 A1 | 9/1997 |
| EP | 0930040 A2 | 7/1999 |
| EP | 0845237 B1 | 4/2000 |
| EP | 1 018 315 | 7/2000 |
| EP | 0861629 B1 | 9/2001 |
| EP | 1228734 A2 | 8/2002 |
| EP | 1380245 | 1/2004 |
| EP | 1380246 A2 | 1/2004 |
| EP | 1172719 | 2/2004 |
| EP | 1018315 B1 | 11/2004 |
| EP | 1553472 A1 | 7/2005 |
| EP | 1557730 | 7/2005 |
| EP | 1642522 A2 | 4/2006 |
| ES | 2238196 A1 | 8/2005 |
| FR | 2601443 A1 | 1/1988 |
| FR | 2828589 A1 | 2/2003 |
| GB | 702426 | 1/1954 |
| GB | 2128842 A | 5/1984 |
| GB | 2213047 A | 8/1989 |
| GB | 2225221 A | 5/1990 |
| GB | 2283838 A | 5/1995 |
| JP | 53 021869 | 2/1978 |
| JP | 53021869 | 2/1978 |
| JP | 53110257 A2 | 9/1978 |
| JP | 51110957 A2 | 1/1982 |
| JP | 57064217 | 4/1982 |
| JP | 59005315 | 2/1984 |
| JP | 59033511 U | 3/1984 |
| JP | 59094005 | 5/1984 |
| JP | 59099308 | 6/1984 |
| JP | 59112311 | 6/1984 |
| JP | 59120124 | 7/1984 |
| JP | 59131668 | 9/1984 |
| JP | 59184917 A | 10/1984 |
| JP | 2283343 A2 | 11/1984 |
| JP | 59212924 | 12/1984 |
| JP | 59226909 | 12/1984 |
| JP | 60089213 A | 5/1985 |
| JP | 60211510 A | 10/1985 |
| JP | 60259895 | 12/1985 |
| JP | 61097712 A | 5/1986 |
| JP | 62070709 | 4/1987 |
| JP | 62074018 | 4/1987 |
| JP | 62120510 A | 6/1987 |
| JP | 62 164431 | 7/1987 |
| JP | 62154008 | 7/1987 |
| JP | 62164431 | 7/1987 |
| JP | 62263508 A | 11/1987 |
| JP | 62189057 U | 12/1987 |
| JP | 63079623 A | 4/1988 |
| JP | 63158032 | 7/1988 |
| JP | 63241610 A | 10/1988 |
| JP | 3051023 | 3/1991 |
| JP | 4019586 | 1/1992 |
| JP | 4084921 A | 3/1992 |
| JP | 5023269 A | 2/1993 |
| JP | 5042076 A | 2/1993 |
| JP | 5046246 | 2/1993 |
| JP | 5150827 A | 6/1993 |
| JP | 5150829 A | 6/1993 |
| JP | 5054620 U | 7/1993 |
| JP | 5040519 Y2 | 10/1993 |
| JP | 5257533 | 10/1993 |
| JP | 6003251 | 1/1994 |
| JP | 6137828 A | 5/1994 |
| JP | 6154143 | 6/1994 |
| JP | 6293095 A | 10/1994 |
| JP | 06327598 A | 11/1994 |
| JP | 6105781 B | 12/1994 |
| JP | 7059702 A2 | 3/1995 |
| JP | 07129239 A | 5/1995 |
| JP | 7222705 A2 | 8/1995 |
| JP | 7270518 A | 10/1995 |
| JP | 7281742 A2 | 10/1995 |
| JP | 7281752 A | 10/1995 |
| JP | 7110269 | 11/1995 |
| JP | 7295636 A | 11/1995 |
| JP | 7311041 | 11/1995 |
| JP | 7313417 A | 12/1995 |
| JP | 7319542 | 12/1995 |
| JP | 8000393 | 1/1996 |
| JP | 8000393 Y2 | 1/1996 |

(56) References Cited

FOREIGN PATENT DOCUMENTS

| | | |
|---|---|---|
| JP | 8016241 | 1/1996 |
| JP | 8063229 | 3/1996 |
| JP | 8089449 A | 4/1996 |
| JP | 08089451 A | 4/1996 |
| JP | 2520732 B2 | 5/1996 |
| JP | 8123548 A | 5/1996 |
| JP | 8152916 A2 | 6/1996 |
| JP | 8256960 | 10/1996 |
| JP | 8263137 A | 10/1996 |
| JP | 8286741 | 11/1996 |
| JP | 8286744 | 11/1996 |
| JP | 8322774 A | 12/1996 |
| JP | 8322774 A2 | 12/1996 |
| JP | 8335112 A | 12/1996 |
| JP | 9044240 A | 2/1997 |
| JP | 9066855 A | 3/1997 |
| JP | 9145309 A | 6/1997 |
| JP | 9160644 A2 | 6/1997 |
| JP | 9179625 A2 | 7/1997 |
| JP | 9179685 A2 | 7/1997 |
| JP | 09185410 | 7/1997 |
| JP | 9192069 | 7/1997 |
| JP | 9204223 | 8/1997 |
| JP | 09206258 A | 8/1997 |
| JP | 9265319 A | 10/1997 |
| JP | 9269810 A | 10/1997 |
| JP | 9319432 A | 12/1997 |
| JP | 9319434 A | 12/1997 |
| JP | 9325812 A | 12/1997 |
| JP | 10055215 A | 2/1998 |
| JP | 10117973 | 5/1998 |
| JP | 10117973 A | 5/1998 |
| JP | 10118963 A | 5/1998 |
| JP | 10177414 A | 6/1998 |
| JP | 6318032 A | 7/1998 |
| JP | 1024114 | 8/1998 |
| JP | 10214114 A | 8/1998 |
| JP | 10228316 | 8/1998 |
| JP | 10240342 | 9/1998 |
| JP | 10260727 | 9/1998 |
| JP | 10295595 A | 11/1998 |
| JP | 10314088 | 12/1998 |
| JP | 11015941 A | 1/1999 |
| JP | 11065655 | 3/1999 |
| JP | 11085269 A2 | 3/1999 |
| JP | 11102219 A2 | 4/1999 |
| JP | 11102220 A | 4/1999 |
| JP | 11162454 A | 6/1999 |
| JP | 11174145 A | 7/1999 |
| JP | 11175149 A | 7/1999 |
| JP | 11212642 A2 | 8/1999 |
| JP | 11213157 A | 8/1999 |
| JP | 11508810 A | 8/1999 |
| JP | 11510935 A | 9/1999 |
| JP | 11295412 A | 10/1999 |
| JP | 11346964 | 12/1999 |
| JP | 2000047728 | 2/2000 |
| JP | 2000056006 A | 2/2000 |
| JP | 2000056831 A | 2/2000 |
| JP | 2000060782 | 2/2000 |
| JP | 2000066722 A | 3/2000 |
| JP | 2000075925 A | 3/2000 |
| JP | 10240343 A2 | 5/2000 |
| JP | 2000510750 | 8/2000 |
| JP | 2000275321 | 10/2000 |
| JP | 2000353014 A | 12/2000 |
| JP | 2000353014 A2 | 12/2000 |
| JP | 2001022443 A | 1/2001 |
| JP | 2001067588 | 3/2001 |
| JP | 2001087182 | 4/2001 |
| JP | 3197758 B2 | 8/2001 |
| JP | 3201903 B2 | 8/2001 |
| JP | 2001216482 A | 8/2001 |
| JP | 2001258807 | 9/2001 |
| JP | 2001265437 A | 9/2001 |
| JP | 2001275908 A | 10/2001 |
| JP | 2002078650 A | 3/2002 |
| JP | 2002204768 A | 7/2002 |
| JP | 2002204769 A | 7/2002 |
| JP | 2002532178 | 10/2002 |
| JP | 2002323925 | 11/2002 |
| JP | 2002333920 A | 11/2002 |
| JP | 03356170 B1 | 12/2002 |
| JP | 2002355206 | 12/2002 |
| JP | 2002360471 A | 12/2002 |
| JP | 2002360482 A | 12/2002 |
| JP | 2002366227 | 12/2002 |
| JP | 2002369778 | 12/2002 |
| JP | 20022360479 | 12/2002 |
| JP | 2003005296 A | 1/2003 |
| JP | 2003010076 A | 1/2003 |
| JP | 2003010088 A | 1/2003 |
| JP | 2003015740 A | 1/2003 |
| JP | 03375843 | 2/2003 |
| JP | 2003036116 A | 2/2003 |
| JP | 2003038401 A | 2/2003 |
| JP | 2003038402 A | 2/2003 |
| JP | 2003505127 A | 2/2003 |
| JP | 2003 190064 | 7/2003 |
| JP | 2005224265 A | 8/2005 |
| JP | 2005230032 A | 9/2005 |
| JP | 2005245916 A | 9/2005 |
| JP | 2005296511 | 10/2005 |
| JP | 2005346700 | 12/2005 |
| JP | 2005352707 A | 12/2005 |
| JP | 2006043071 A | 2/2006 |
| JP | 2006164223 | 6/2006 |
| JP | 2006260161 A | 9/2006 |
| JP | 2006293662 A | 10/2006 |
| JP | 2006296697 A | 11/2006 |
| JP | 2007213180 A | 8/2007 |
| JP | 2009015611 A | 1/2009 |
| JP | 2010198552 A | 9/2010 |
| KR | 10-2006-0011527 | 2/2006 |
| WO | 9530887 A1 | 11/1995 |
| WO | 9617258 A3 | 2/1997 |
| WO | 9905580 A2 | 2/1999 |
| WO | 0036962 A1 | 6/2000 |
| WO | 0038026 A1 | 6/2000 |
| WO | 0038028 A1 | 6/2000 |
| WO | 0038029 A1 | 6/2000 |
| WO | 0004430 A1 | 10/2000 |
| WO | 0078410 A1 | 12/2000 |
| WO | 0106904 A1 | 2/2001 |
| WO | 0106905 A9 | 6/2001 |
| WO | 0180703 A1 | 11/2001 |
| WO | WO 01/80703 | 11/2001 |
| WO | 0191623 A2 | 12/2001 |
| WO | 0258527 A1 | 8/2002 |
| WO | 2067744 A1 | 9/2002 |
| WO | 02069774 A1 | 9/2002 |
| WO | 02069775 A2 | 9/2002 |
| WO | WO 02/067752 | 9/2002 |
| WO | WO 02/071175 | 9/2002 |
| WO | 02081074 A1 | 10/2002 |
| WO | 03015220 A1 | 2/2003 |
| WO | 03024292 A2 | 3/2003 |
| WO | WO 03/024292 | 3/2003 |
| WO | 03040546 A1 | 5/2003 |
| WO | 03062850 A2 | 7/2003 |
| WO | 03062852 A1 | 7/2003 |
| WO | 2004004534 A1 | 1/2004 |
| WO | 2004005956 A1 | 1/2004 |
| WO | 2004043215 | 5/2004 |
| WO | WO2004/058028 | 7/2004 |
| WO | WO2004/059409 | 7/2004 |
| WO | WO2004058028 | 7/2004 |
| WO | 2005006935 A1 | 1/2005 |
| WO | 2005036292 | 4/2005 |
| WO | 2005055796 A2 | 6/2005 |
| WO | WO 2005/055795 | 6/2005 |
| WO | 2005076545 A1 | 8/2005 |
| WO | 2005077243 A1 | 8/2005 |
| WO | 2005081074 A1 | 9/2005 |

(56) References Cited

FOREIGN PATENT DOCUMENTS

| WO | 2005082223 A1 | 9/2005 |
|---|---|---|
| WO | WO2005082223 A1 | 9/2005 |
| WO | 2005098475 A1 | 10/2005 |
| WO | 2005098476 A1 | 10/2005 |
| WO | 2006046400 A1 | 5/2006 |
| WO | WO2006/061133 | 6/2006 |
| WO | 2006073248 A1 | 7/2006 |
| WO | WO2006089307 | 8/2006 |
| WO | 2007036490 A2 | 4/2007 |
| WO | 2007065033 A2 | 6/2007 |
| WO | 2007137234 A2 | 11/2007 |
| WO | 0275350 A1 | 1/2012 |

OTHER PUBLICATIONS

Feature definition; Hitachi Appliances, Inc., retrieved from the World Wide Web at http://kadenfan.hitachi.co.jp/robot/feature/feature.html, accessed Nov. 19, 2008.
Product; Microrobot.com, retrieved from the World Wide Web at http://www.microrobot.com/main/pages/product1.asp, accessed Nov. 19, 2008.
Intelligent Machines; InMach Intelligente Maschinen Gmbh, retrieved from the World Wide Web at http://www.inmach.de/inside.html, accessed Nov. 19, 2008.
Andersen et al., "Landmark based navigation strategies", SPIE Conference on Mobile Robots XIII, SPIE vol. 3525, pp. 170-181, Jan. 8, 1999.
U.S. Appl. No. 60/605,066 as provided to WIPO in PCT/US2005/030422, corresponding to U.S. National Stage Entry Application No. 11/574,290, U.S. publication 2008/0184518, filing date Aug. 27, 2004.
U.S. Appl. No. 60/605,181 as provided to WIPO in PCT/US2005/030422, corresponding to U.S. National Stage Entry Application No. 11/574,290, U.S. publication 2008/0184518, filing date Aug. 27, 2004.
Derek Kurth, "Range-Only Robot Localization and SLAM with Radio", http://www.ri.cmu.edu/pub_files/pub4/kurth_derek_2004_1/kurth_derek_2004_1.pdf. 60 pages, May, 2004, accessed Jul. 27, 2012.
Electrolux Trilobite, Jan. 12, 2001, http://www.electrolux-ui.com:8080/2002%5C822%5C833102EN.pdf, accessed Jul. 2, 2012, 10 pages.
Home Robot—UBOT; Microbotusa.com, retrieved from the WWW at www.microrobotusa.com, accessed Dec. 2, 2008.
King and Weiman, "Helpmate™ Autonomous Mobile Robots Navigation Systems," SPIE vol. 1388 Mobile Robots, pp. 190-198 (1990).
Li et al. "Robust Statistical Methods for Securing Wireless Localization in Sensor Networks," Information Procesing in Sensor Networks, 2005, Fourth International Symposium on, pp. 91-98, Apr. 2005.
Paromtchik "Toward Optical Guidance of Mobile Robots," Proceedings of the Fourth World Multiconference on Systemics, Cybermetics and Informatics, Orlando, FL, USA, Jul. 23, 2000, vol. IX, pp. 44-49, available at http://emotion.inrialpes.fr/~paromt/infos/papers/paromtchik:asama:sci:2000.ps.gz, accessed Jul. 3, 2012.
Sebastian Thrun, "Learning Occupancy Grid Maps With Forward Sensor Models," Autonomous Robots 15, 111-127, Sep. 1, 2003.
Written Opinion of the International Searching Authority, PCT/US2004/001504, Aug. 20, 2012, 9 pages.
Borges et al., "Optimal Mobile Robot Pose Estimation Using Geometrical Maps," IEEE Transactions on Robotics and Automation, 18(1): 87-94, Feb. 2002.
Braunstingl et al., "Fuzzy Logic Wall Following of a Mobile Robot Based on the Concept of General Perception," ICAR '95, 7th International Conference on Advanced Robotics, Sant Feliu De Guixols, Spain, pp. 367-376, Sep. 1995.
Bulusu et al., "Self Configuring Localization systems: Design and Experimental Evaluation," *ACM Transactions on Embedded Computing Systems*, 3(1):24-60, 2003.

Caccia et al., "Bottom-Following for Remotely Operated Vehicles," 5th IFAC Conference, Alaborg, Denmark, pp. 245-250, Aug. 2000.
Chae et al., "StarLITE: A new artificial landmark for the navigation of mobile robots," http://www.irc.atr.jp/jk-nrs2005/pdf/Starlite.pdf, 4 pages, 2005.
Chamberlin et al., "Team 1: Robot Locator Beacon System," NASA Goddard SFC, Design Proposal, 15 pages, Feb. 2006.
Champy, "Physical management of IT assets in Data Centers using RFID technologies," RFID 2005 University, Oct. 12-14, 2005, 19 pages.
Chiri, "Joystick Control for Tiny OS Robot," http://www.eecs.berkeley.edu/Programs/ugrad/superb/papers2002/chiri.pdf. 12 pages, Aug. 2002.
Christensen et al. "Theoretical Methods for Planning and Control in Mobile Robotics," 1997 First International Conference on Knowledge-Based Intelligent Electronic Systems, Adelaide, Australia, pp. 81-86, May 1997.
Andersen et al., "Landmark based navigation strategies," SPIE Conference on Mobile Robots XIII, SPIE vol. 3525, pp. 170-181, Jan. 8, 1999.
Clerentin et al., "A localization method based on two omnidirectional perception systems cooperation," *Proc of IEEE International Conference on Robotics & Automation,* San Francisco, CA vol. 2, pp. 1219-1224, Apr. 2000.
Corke, "High Performance Visual serving for robots end-point control," SPIE vol. 2056, Intelligent Robots and Computer Vision, 1993, 10 pages.
Cozman et al., "Robot Localization using a Computer Vision Sextant," IEEE International Midwest Conference on Robotics and Automation, pp. 106-111, 1995.
D'Orazio et al., "Model based Vision System for mobile robot position estimation", *SPIE,* vol. 2058 Mobile Robots VIII, pp. 38-49, 1992.
De Bakker et al., "Smart PSD—array for sheet of light range imaging", Proc. Of SPIE, vol. 3965, pp. 1-12, May 2000.
Desaulniers et al., "An Efficient Algorithm to find a shortest path for a car-like Robot," *IEEE Transactions on robotics and Automation,* 11(6):819-828, Dec. 1995.
Dorfmiiller-Ulhaas, "Optical Tracking From User Motion to 3D Interaction," http://www.cg.tuwien.ac.at/research/publications/2002/Dorfmueller-Ulhaas-thesis, 182 pages, 2002.
Dorsch et al., "Laser Triangulation: Fundamental uncertainty in distance measurement," *Applied Optics,* 33(7):1306-1314, Mar. 1994.
Dudek et al., "Localizing A Robot with Minimum Travel" *Proceedings of the sixth annual ACM-SIAM symposium on Discrete Algorithms,* 27(2):583-604, Apr. 1998.
Dulimarta et al., "Mobile Robot Localization in Indoor Environment", *Pattern Recognition,* 30(1):99-111, 1997.
EBay, "Roomba Timer -> Timed Cleaning—Floorvac Robotic Vacuum," Retrieved from the Internet: URL Cgi.ebay.com/ws/eBaylSAPl.dll?viewitem&category=43526&item=4375198387&rd=1, 5 pages, Apr. 2005.
Electrolux, "Welcome to the Electrolux trilobite," Retrieved from the Internet: URL<www.electroluxusa.com/node57.asp?currentURL=node142.asp%3F>. 2 pages, Mar. 2005.
Eren et al., "Accuracy in position estimation of mobile robots based on coded infrared signal transmission," Proceedings: Integrating Intelligent Instrumentation and Control, Instrumentation and Measurement Technology Conference, 1995, IMTC/95. pp. 548-551, 1995.
Eren et al., "Operation of Mobile Robots in a Structured Infrared Environment," Proceedings 'Sensing, Processing, Networking', IEEE Instrumentation and Measurement Technology Conference, 1997 (IMTC/97), Ottawa, Canada vol. 1, pp. 20-25, May 1997.
Becker, et al. "Reliable Navigation Using Landmarks " IEEE International Conference on Robotics and Automation, 0-7803-1965-6, pp. 401-406, 1995.
Facchinetti Claudio et al., "Self-Positioning Robot Navigation Using Ceiling Images Sequences," ACCV '95, 5 pages, Dec. 1995.
Facchinetti Claudio et al., "Using and Learning Vision-Based Self-Positioning for Autonomous Robot Navigation," ICARCV '94, vol. 3, pp. 1694-1698, 1994.

(56) References Cited

OTHER PUBLICATIONS

Betke, et al., "Mobile Robot localization using Landmarks" Proceedings of the IEEE/RSJ/GI International Conference on Intelligent Robots and Systems '94 "Advanced Robotic Systems and the Real World" (IROS '94), vol.
Benayad-Cherif et al., "Mobile Robot Navigation Sensors," SPIE vol. 1831 Mobile Robots, VII, pp. 378-387, 1992.
Fairfield et al., "Mobile Robot Localization with Sparse Landmarks," SPIE vol. 4573, pp. 148-155, 2002.
Favre-Bulle, "Efficient tracking of 3D—Robot Position by Dynamic Triangulation," IEEE Instrumentation and Measurement Technology Conference IMTC 98 Session on Instrumentation and Measurement in Robotics, vol. 1, pp. 446-449, May 1998.
Fayman, "Exploiting Process Integration and Composition in the context of Active Vision," IEEE Transactions on Systems, Man, and Cybernetics—Part C: Application and reviews, vol. 29, No. 1, pp. 73-86, Feb. 1999.
Florbot GE Plastics, 1989-1990, 2 pages, available at http://www.fuseid.com/, accessed Sep. 27, 2012.
Franz et al., "Biomimetric robot navigation", Robotics and Autonomous Systems, vol. 30 pp. 133- 153, 2000.
Friendly Robotics, "Friendly Robotics—Friendly Vac, Robotic Vacuum Cleaner," Retrieved from the Internet: URL< www.friendlyrobotics.com/vac.htm > 5 pages, Apr. 2005.
Fuentes et al., "Mobile Robotics 1994," University of Rochester. Computer Science Department, TR 588, 44 pages, Dec. 1994.
Fukuda et al., "Navigation System based on Ceiling Landmark Recognition for Autonomous mobile robot," 1995 IEEE/RSJ International Conference on Intelligent Robots and Systems 95. 'Human Robot Interaction and Cooperative Robots', Pittsburgh, PA, pp. 1466-1471, Aug. 1995.
Bison et al., "Using a structured beacon for cooperative position estimation," *Robotics and Autonomous Systems,* 29(1):33-40, Oct. 1999.
Gionis, "A hand-held optical surface scanner for environmental Modeling and Virtual Reality," Virtual Reality World, 16 pages, 1996.
Goncalves et al., "A Visual Front-End for Simultaneous Localization and Mapping", Proceedings of the 2005 IEEE International Conference on Robotics and Automation, Barcelona, Spain, pp. 44-49, Apr. 2005.
Gregg et al., "Autonomous Lawn Care Applications," 2006 Florida Conference on Recent Advances in Robotics, Miami, Florida, May 25-26, 2006, Florida International University, 5 pages.
Hamamatsu "SI PIN Diode S5980, S5981 S5870—Multi-element photodiodes for surface mounting," Hamatsu Photonics, 2 pages, Apr. 2004.
Hammacher Schlemmer, "Electrolux Trilobite Robotic Vacuum," Retrieved from the Internet: URL< www.hammacher.com/publish/71579.asp?promo=xsells>. 3 pages, Mar. 2005.
Haralick et al. " Pose Estimation from Corresponding Point Data", *IEEE Transactions on Systems, Man, and Cybernetics,* 19(6):1426-1446, Nov. 1989.
Hausler, "About the Scaling Behaviour of Optical Range Sensors," Fringe '97, Proceedings of the 3rd International Workshop on Automatic Processing of Fringe Patterns, Bremen, Germany, pp. 147-155, Sep. 1997.
Hoag et al., "Navigation and Guidance in interstellar space," ACTA Astronautica, vol. 2, pp. 513-533, Feb. 1975.
Huntsberger et al., "Campout: A Control Architecture for Tightly Coupled Coordination of Multirobot Systems for Planetary Surface Exploration," *IEEE Transactions on Systems, Man, and Cybernetics—Part A: Systems and Humans,* 33(5):550-559, Sep. 2003.
Blaasvaer et al., "AMOR—An Autonomous Mobile Robot Navigation System," Proceedings of the IEEE International Conference on Systems, Man, and Cybernetics, pp. 2266-2271, 1994.
Iirobotics.com, "Samsung Unveils Its Multifunction Robot Vacuum," Retrieved from the Internet: URL<.www.iirobotics.com/webpages/hotstuff.php?ubre=111>. 3 pages, Mar. 2005.

OnRobo "Samsung Unveils Its Multifunction Robot Vacuum," Retrieved from the Internet: URL<www.onrobo.com/enews/0210/samsung_vacuum.shtml>. 3 pages, Mar. 2005.
Pages et al., "A camera-projector system for robot positioning by visual serving," Proceedings of the 2006 Conference on Computer Vision and Pattern Recognition Workshop (CVPRW06), 8 pages, Jun. 2006.
Pages et al., "Optimizing Plane-to-Plane Positioning Tasks by Image-Based Visual Servoing and Structured Light," *IEEE Transactions on Robotics,* 22(5):1000-1010, Oct. 2006.
Pages et al., "Robust decoupled visual servoing based on structured light," 2005 IEEE/RSJ, Int. Conf. On Intelligent Robots and Systems, pp. 2676-2681, 2005.
Park et al., "A Neural Network Based Real-Time Robot Tracking Controller Using Position Sensitive Detectors," IEEE World Congress on Computational Intelligence., 1994 IEEE International Conference on Neutral Networks, Orlando, Florida pp. 2754-2758, Jun.-Jul. 1994.
Park et al., "Dynamic Visual Servo Control of Robot Manipulators using Neutral Networks," *The Korean Institute Telematics and Electronics,* 29-B(10):771-779, Oct. 1992.
Paromtchik "Toward Optical Guidance of Mobile Robots," Proceedings of the Fourth World Multiconference on Systemics, Cybermetics and Informatics, Orlando, FL, USA, Jul. 23, 2000, vol. IX, pp. 44-49, available at http://emotion.inrialpes.fr/~paromt/infos/papers/paromtchik:asama:sci:2000.ps.gz, accessed Jul. 3, 2012, 6 pages.
Paromtchik et al., "Optical Guidance System for Multiple mobile Robots," Proceedings 2001 ICRA. IEEE International Conference on Robotics and Automation, vol. 3, pp. 2935-2940, May 2001.
Penna et al., "Models for Map Building and Navigation", IEEE Transactions on Systems. Man. And Cybernetics. 23(5):1276-1301, Sep.-Oct. 1993.
Taipei Times, "Robotic vacuum by Matsuhita about to undergo testing," Retrieved from the Internet: URL<http://www.taipeitimes.com/News/worldbiz/archives/2002/03/26/0000129338>. accessed Mar. 2002, 2 pages.
Robot Buying Guide, "LG announces the first robotic vacuum cleaner for Korea," Retrieved from the Internet: URL<http://robotbg.corn/news/2003/04/22/1g_announces_the_firstrobotic_vacu>. 1 page, Apr. 2003.
Roboking—not just a vacuum cleaner, a robot!, Jan. 21, 2004, infocom.uz/2004/01/21/robokingne-prosto-pyilesos-a-robot/, accessed Oct. 10, 2011, 7 pages.
McLurkin "Stupid Robot Tricks: A Behavior-based Distributed Algorithm Library for Programming Swarms of Robots," Paper submitted for requirements of BSEE at MIT, May 2004, 127 pages.
McLurkin, "The Ants: A community of Microrobots," Paper submitted for requirements of BSEE at MIT, May 1995, 60 pages.
Grumet, "Robots Clean House," Popular Mechanics, Nov. 2003, 3 pages.
Pirjanian, "Reliable Reaction," Proceedings of the 1996 IEEE/SiCE/RSJ International Conference on Multisensor Fusion and Integration for Intelligent Systems, pp. 158-165, 1996.
Pirjanian, "Challenges for Standards for consumer Robotics," IEEE Workshop on Advanced Robotics and its Social impacts, pp. 260-264, Jun. 2005.
Pirjanian et al., "Distributed Control for a Modular, Reconfigurable Cliff Robot," Proceedings of the 2002 IEEE International Conference on Robotics & Automation, Washington, D.C. pp. 4083-4088, May 2002.
Pirjanian et al. "Representation and Execution of Plan Sequences for Multi-Agent Systems," Proceedings of the 2001 IEEE/RSJ International Conference on Intelligent Robots and Systems, Maui, Hawaii, pp. 2117-2123, Oct. 2001.
Pirjanian et al., "Multi-Robot Target Acquisition using Multiple Objective Behavior Coordination," Proceedings of the 2000 IEEE International Conference on Robotics & Automation, San Francisco, CA, pp. 2696-2702, Apr. 2000.
Pirjanian et al., "A decision-theoretic approach to fuzzy behavior coordination", 1999 IEEE International Symposium on Computational Intelligence in Robotics and Automation, 1999. CIRA '99., Monterey, CA, pp. 101-106, Nov. 1999.

(56) References Cited

OTHER PUBLICATIONS

Pirjanian et al., "Improving Task Reliability by Fusion of Redundant Homogeneous Modules Using Voting Schemes," Proceedings of the 1997 IEEE International Conference on Robotics and Automation, Albuquerque, NM, pp. 425-430, Apr. 1997.
Prassler et al., "A Short History of Cleaning Robots," Autonomous Robots 9, 211-226, 2000, 16 pages.
Remazeilles et al., "Image based robot navigation in 3D environments," Proc. of SPIE, vol. 6052, pp. 1-14, Dec. 2005.
Rives et al., "Visual servoing based on ellipse features," SPIE, vol. 2056 Intelligent Robots and Computer Vision pp. 356-367, 1993.
Robotics World, "A Clean Sweep," 5 pages, Jan. 2001.
Ronnback, "On Methods for Assistive Mobile Robots," Retrieved from the Internet: URL<http://www.openthesis.org/documents/methods-assistive-mobile-robots-595019.html>. 218 pages, Jan. 2006.
Roth-Tabak et al., "Environment Model for mobile Robots Indoor Navigation," SPIE, vol. 1388 Mobile Robots, pp. 453-463, 1990.
Malik et al., "Virtual Prototyping for Conceptual Design of a Tracked Mobile Robot," Electrical and Computer Engineering, Canadian Conference on, IEEE, PI. pp. 2349-2352, May 2006.
Sahin et al., "Development of a Visual Object Localization Module for Mobile Robots," 1999 Third European Workshop on Advanced Mobile Robots, (Eurobot '99), pp. 65-72, 1999.
Salomon et al., "Low-Cost Optical Indoor Localization system for Mobile Objects without Image Processing," IEEE Conference on Emerging Technologies and Factory Automation, 2006. (ETFA '06), pp. 629-632, Sep. 2006.
Sato, "Range Imaging Based on Moving Pattern Light and Spatio-Temporal Matched Filter," Proceedings International Conference on Image Processing, vol. 1., Lausanne, Switzerland, pp. 3336, Sep. 1996.
Schenker et al., "Lightweight rovers for Mars science exploration and sample return," Intelligent Robots and Computer Vision XVI, *SPIE* Proc. 3208, pp. 24-36, 1997.
Thrun, Sebastian, "Learning Occupancy Grid Maps With Forward Sensor Models," Autonomous Robots 15, 28 pages, Sep. 1, 2003.
Shimoga et al., "Touch and Force Reflection for Telepresence Surgery," Engineering in Medicine and Biology Society, 1994. Engineering Advances: New Opportunities for Biomedical Engineers. Proceedings of the 16th Annual International Conference of the IEEE, Baltimore, MD, pp. 1049-1050, 1994.
Sim et al, "Learning Visual Landmarks for Pose Estimation," IEEE International Conference on Robotics and Automation, vol. 3, Detroit, MI, pp. 1972-1978, May 1999.
Sobh et al., "Case Studies in Web-Controlled Devices and Remote Manipulation," Automation Congress, 2002 Proceedings of the 5th Biannual World, pp. 435-440, Dec. 2002.
Stella et al., "Self-Location for Indoor Navigation of Autonomous Vehicles," Part of the SPIE conference on Enhanced and Synthetic Vision SPIE vol. 3364, pp. 298-302, 1998.
Summet, "Tracking Locations of Moving Hand-held Displays Using Projected Light," Pervasive 2005, LNCS 3468, pp. 37-46, 2005.
Svedman et al., "Structure from Stereo Vision using Unsynchronized Cameras for Simultaneous Localization and Mapping," 2005 IEEE/RSJ International Conference on Intelligent Robots and Systems, pp. 2993-2998, 2005.
Takio et al., "Real-Time Position and Pose Tracking Method of Moving Object Using Visual Servo System," 47th IEEE International Symposium on Circuits and Systems, pp. 167-170, 2004.
Teller, "Pervasive pose awareness for people, Objects and Robots," http://www.ai.mitedu/lab/dangerous-ideas/Spring2003/teller-pose.pdf, 6 pages, Apr. 2003.
Terada et al., "An Acquisition of the Relation between Vision and Action using Self-Organizing Map and Reinforcement Learning," 1998 Second International Conference on Knowledge-Based Intelligent Electronic Systems, Adelaide, Australia, pp. 429-434, Apr. 1998.

The Sharper Image, eVac Robotic Vacuum—Product Details, www.sharperiamge.com/us/en/templates/products/pipmorework1printable.jhtml, 1 page, Mar. 2005.
TheRobotStore.com, "Friendly Robotics Robotic Vacuum RV400—The Robot Store," www.therobotstore.com/s.nl/sc.9/category.-109/it.A/id.43/E, 1 page, Apr. 2005.
TotalVac.com, RC3000 RoboCleaner website, Mar. 2005, 3 pages.
eVac Robotic Vacuum S1727 Instruction Manual, Sharper Image Corp, Copyright 2004, 16 pages.
Trebi-Ollennu et al., "Mars Rover Pair Cooperatively Transporting a Long Payload," Proceedings of the 2002 IEEE International Conference on Robotics & Automation, Washington, D.C. pp. 3136-3141, May 2002.
Tribelhorn et al., "Evaluating the Roomba: A low-cost, ubiquitous platform for robotics research and education," *IEEE*, pp. 1393-1399, 2007.
Tse et al., "Design of a Navigation System for a Household Mobile Robot Using Neural Networks," Department of Manufacturing Engg. & Engg. Management, City University of Hong Kong, pp. 2151-2156, 1998.
UAMA (Asia) Industrial Co., Ltd., "RobotFamily," 2005, 1 page.
Watanabe et al., "Position Estimation of Mobile Robots With Internal and External Sensors Using Uncertainty Evolution Technique," 1990 IEEE International Conference on Robotics and Automation, Cincinnati, OH, pp. 2011-2016, May 1990.
Watts, "Robot, boldly goes where no man can," The Times—pp. 20, Jan. 1985.
Wijk et al., "Triangulation-Based Fusion of Sonar Data with Application in Robot Pose Tracking," *IEEE Transactions on Robotics and Automation*, 16(6):740-752, Dec. 2000.
Karcher "Karcher RoboCleaner RC 3000," Retrieved from the Internet: URL<www.robocleaner.de/english/screen3.html>. 4 pages, Dec. 2003.
Karcher Product Manual Download webpage: Retrieved from the Internet: URL<http://www.karcher.com/bta/download.en.shtml?Action=SelectteilenR&Id=rc3000&submitButtonName=Select+Product+Manual and associated .pdf file "5959-915en.pdf (4.7 MB) English/English," 16 pages, accessed Jan. 2004.
Karcher RC 3000 Cleaning Robot-user manual Manufacturer: Alfred-Karcher GmbH & Co, Cleaning Systems, Alfred Karcher-Str 28-40, PO Box 160, D-71349 Winnenden, Germany, Dec. 2002.
Karcher USA "RC 3000 Robotics cleaner," : Retrieved from the Internet: URL<www.karcher-usa.com, 3 pages, Mar. 2005.
Morland,"Autonomous Lawnmower Control", Downloaded from the internet at: http://cns.bu.edu/~cjmorlan/robotics/lawnmower/report.pdf, 10 pages, Jul. 2002.
Put Your Roomba . . . On, Automatic webpages: http://www.acomputeredge.com/roomba, 5 pages, accessed Apr. 2005.
RoboMaid Sweeps Your Floors So You Won't Have to, the Official Site, website: Retrieved from the Internet: URL<http://therobomaid.com/>. 2 pages, accessed Mar. 2005.
Electrolux, "Designed for the well-lived home," Retrieved from the Internet: URL<http://www.electroluxusa.com/node57.as?currentURL=node142.asp%3F >. Accessed Mar. 2005, 2 pages.
Everyday Robots, "Everyday Robots: Reviews, Discussion and News for Consumers," Retrieved from the Internet: URL< www.everydayrobots.com/index.php?option=content&task=view&id=9>. 7 pages, Apr. 2005.
Evolution Robotics, "NorthStar—Low-cost Indoor Localiztion—How it Works," E Evolution Robotics, 2 pages, 2005.
Facts on Trilobite, webpage, Retrieved from the Internet: URL< http://trilobiteelectroluxse/presskit_en/model11335asp?print=yes&pressID=>. 2 pages, accessed Dec. 2003.
Friendly Robotics, "Friendly Robotics- Friendly Vac, Robotic Vacuum Cleaner," Retrieved from the Internet: URL < www.friendlyrobotics.com/vac.htm > 5 pages, Apr. 2005.
Gat, "Robust Low-Computation Sensor-driven Control for Task-Directed Navigation," Proc of IEEE International Conference on Robotics and Automation, Sacramento, CA pp. 2484-2489, Apr. 1991.

(56) References Cited

OTHER PUBLICATIONS

2008Hitachi: News release: "The home cleaning robot of the autonomous movement type (experimental machine)," Retrieved from the Internet: URL< www.i4u.com./japanreleases/hitachirobot.htm>. 5 pages, Mar. 2005.

Home Robot—UBOT; Microbotusa.com, retrieved from the WWW at www.microrobotusa.com, accessed Dec. 2, 2008, 2 pages.

Jarosiewicz et al., "Final Report—Lucid," University of Florida, Departmetn of Electrical and Computer Engineering, EEL 5666 — Intelligent Machine Design Laboratory, 50 pages, Aug. 1999.

Jensfelt et al., "Active Global Localization for a mobile robot using multiple hypothesis tracking," *IEEE Transactions on Robots and Automation*, 17(5): 748-760, Oct. 2001.

Jeong et al., "An intelligent map-building system for indoor mobile robot using low cost photo sensors,"SPIE, vol. 6042, 6 pages, 2005.

Kahney, "Robot Vacs are in the House," Retrieved from the Internet: URL<www.wired.com/news/technology/o,1282,59237,00.html>. 6 pages, Jun. 2003.

Karlsson et al, "Core Technologies for service Robotics," IEEE/RSJ International Conference on Intelligent Robots and Systems (IROS 2004), vol. 3, pp. 2979-2984, Sep. 2004.

Karlsson et al., The vSLAM Algorithm for Robust Localization and Mapping, Proceedings of the 2005 IEEE International Conference on Robotics and Automation, Barcelona, Spain, pp. 24-29, Apr. 2005.

King and Weiman, "HelpmateTM Autonomous Mobile Robots Navigation Systems," SPIE vol. 1388 Mobile Robots, pp. 190-198, 1990.

Kleinberg, The Localization Problem for Mobile Robots, Laboratory for Computer Science, Massachusetts Institute of Technology, 1994 IEEE, pp. 521-531, 1994.

Knights, et al., "Localization and Identification of Visual Landmarks," Journal of Computing Sciences in Colleges, 16(4):312-313, May 2001.

Kolodko et al., "Experimental System for Real-Time Motion Estimation," Proceedings of the 2003 IEEE/ASME International Conference on Advanced Intelligent Mechatronics (AIM 2003), pp. 981-986, 2003.

Komoriya et al., "Planning of Landmark Measurement for the Navigation of a Mobile Robot," Proceedings of the 1992 IEEE/RSJ International Cofnerence on Intelligent Robots and Systems, Raleigh, NC pp. 1476-1481, Jul. 1992.

Krotov et al., "Digital Sextant," Downloaded from the internet at: http://www.cs.cmu.edu/~epk/, 1 page, 1995.

Krupa et al., "Autonomous 3-D Positioning of Surgical Instruments in Robotized Laparoscopic Surgery Using Visual Servoin," *IEEE Transactions on Robotics and Automation*, 19(5):842-853, Oct. 2003.

Kuhl et al., "Self Localization in Environments using Visual Angles," VRCAI '04 Proceedings of the 2004 ACM SIGGRAPH international conference on Virtual Reality continuum and its applications in industry, pp. 472-475, 2004.

Kurth, "Range-Only Robot Localization and Slam with Radio", http://www.ri.cmu.edu/pub_files/pub4/kurth_derek_2004_1/kurth_derek_2004_1.pdf. 60 pages, May, 2004, accessed Jul. 27, 2012.

Lambrinos et al., "A mobile robot employing insect strategies for navigation," Retrieved from the Internat: URL<http://www8.cs.umu.se/kurser/TDBD17/VT04/dl/Assignment%20Papers/lambrinos-RAS-2000.pdf>. 38 pages, Feb. 1999.

Lang et al., "Visual Measurement of Orientation Using Ceiling Features", 1994 IEEE, pp. 552-555, 1994.

Lapin, "Adaptive position estimation for an automated guided vehicle," SPIE, vol. 1831 Mobile Robots VII, pp. 82-94, 1992.

LaValle et al., "Robot Motion Planning in a Changing, Partially Predictable Environment," 1994 IEEE International Symposium on Intelligent Control, Columbus, OH, pp. 261-266, Aug. 1994.

Lee et al., "Development of Indoor Navigation system for Humanoid Robot Using Multi-sensors Integration", ION NTM, San Diego, CA pp. 798-805, Jan. 2007.

Lee et al., "Localization of a Mobile Robot Using the Image of a Moving Object," *IEEE Transaction on Industrial Electronics*, 50(3):612-619, Jun. 2003.

Leonard et al., "Mobile Robot Localization by tracking Geometric Beacons," *IEEE Transaction on Robotics and Automation*, 7(3):376-382, Jun. 1991.

Li et al. "Robust Statistical Methods for Securing Wireless Localization in Sensor Networks," Information Processing in Sensor Networks, 2005, Fourth International Symposium on, pp. 91-98, Apr. 2005.

Li et al., "Making a Local Map of Indoor Environments by Swiveling a Camera and a Sonar," Proceedings of the 1999 IEEE/RSJ International Conference on Intelligent Robots and Systems, pp. 954-959, 1999.

Lin et al., "Mobile Robot Navigation Using Artificial Landmarks," *Journal of robotics System*, 14(2): 93-106, 1997.

Linde, Dissertation—"On Aspects of Indoor Localization," Available at: https://eldorado.tudortmund.de/handle/2003/22854, University of Dortmund, 138 pages, Aug. 2006.

Lumelsky et al., "An Algorithm for Maze Searching with Azimuth Input", 1994 IEEE International Conference on Robotics and Automation, San Diego, CA vol. 1, pp. 111-116, 1994.

Luo et al., "Real-time Area-Covering Operations with Obstacle Avoidance for Cleaning Robots," IEEE, pp. 2359-2364, 2002.

Ma, Thesis—"Documentation on Northstar," California Institute of Technology, 14 pages, May 2006.

Madsen et al., "Optimal landmark selection for triangulation of robot position," Journal of Robotics and Autonomous Systems, vol. 13 pp. 277-292, 1998.

Martishevcky, "The Accuracy of point light target coordinate determination by dissectoral tracking system", SPIE vol. 2591, pp. 25-30, Oct. 23, 2005.

Matsutek Enterprises Co. Ltd, "Automatic Rechargeable Vacuum Cleaner," http://matsutek.manufacturer.globalsources.com/si/6008801427181/pdt1/Home-vacuum/10 . . . , Apr. 2007, 3 pages.

McGillem et al., "Infra-red Lacation System for Navigation and Autonomous Vehicles," 1988 IEEE International Conference on Robotics and Automation, vol. 2, pp. 1236-1238, Apr. 1988.

McGillem,et al. "A Beacon Navigation Method for Autonomous Vehicles," *IEEE Transactions on Vehicular Technology*, 38(3):132-139, Aug. 1989.

Miro et al., "Towards Vision Based Navigation in Large Indoor Environments," Proceedings of the IEEE/RSJ International Conference on Intelligent Robots and Systems, Beijing, China, pp. 2096- 2102, Oct. 2006.

Michelson, "Autonomous navigation", in AccessScience@McGraw-Hill, http://www.accessscience.com, DOI 10.1036/1097-8542.YB000130, Apr. 2009.

MobileMag, "Samsung Unveils High-tech Robot Vacuum Cleaner," Retrieved from the Internet: URL<http://www.mobilemag.com/content/100/102/C2261/>. 4 pages, Mar. 2005.

Monteiro et al., "Visual Servoing for Fast Mobile Robot: Adaptive Estimation of Kinematic Parameters," Proceedings of the IECON '93., International Conference on Industrial Electronics, Maui, HI, pp. 1588-1593, Nov. 1993.

Moore et al., "A simple Map-bases Localization strategy using range measurements," SPIE, vol. 5804 pp. 612-620, 2005.

Munich et al., "ERSP: A Software Platform and Architecture for the Service Robotics Industry," Intelligent Robots and Systems, 2005. (IROS 2005), pp. 460-467, Aug. 2005.

Munich et al., "SIFT-ing Through Features with ViPR", IEEE Robotics & Automation Magazine, pp. 72-77, Sep. 2006.

Nam et al., "Real-Time Dynamic Visual Tracking Using PSD Sensors and extended Trapezoidal Motion Planning", Applied Intelligence 10, pp. 53-70, 1999.

Nitu et al., "Optomechatronic System for Position Detection of a Mobile Mini-Robot," *IEEE Ttrransactions on Industrial Electronics*, 52(4):969-973, Aug. 2005.

On Robo, "Robot Reviews Samsung Robot Vacuum (VC-RP3OW)," Retrieved from the Internet: URL <www.onrobo.com/reviews/At_Home/vacuum_cleaners/on00vcrb30rosam/index.htm>. 2 pages, Mar. 2005.

(56) References Cited

OTHER PUBLICATIONS

InMach "Intelligent Machines," Retrieved from the Internet: URL<www.inmach.de/inside.html>. 1 page, Nov. 2008.

Innovation First, "2004 EDU Robot Controller Reference Guide," Retrieved from the Internet: URL<http://www.ifirobotics.com>. 13 pages, Mar. 2004.

Yamamoto et al., "Optical Sensing for Robot Perception and Localization," 2005 IEEE Workshop on Advanced Robotics and its Social Impacts, pp. 14-17, 2005.

Yata et al., "Wall Following Using Angle Information Measured by a Single Ultrasonic Transducer," Proceedings of the 1998 IEEE, International Conference on Robotics & Automation, Leuven, Belgium, pp. 1590-1596, May 1998.

Yun et al., "Image-Based Absolute Positioning System for Mobile Robot Navigation," IAPR International Workshops SSPR, Hong Kong, pp. 261-269, Aug. 2006.

Yun et al., "Robust Positioning a Mobile Robot with Active Beacon Sensors," *Lecture Notes in Computer Science,* 2006, vol. 4251, pp. 890-897, 2006.

Yuta et al., "Implementation of an Active Optical Range sensor Using Laser Slit for In-Door Intelligent Mobile Robot," IEE/RSJ International Workshop on Intelligent Robots and Systems (IROS 91) vol. 1, Osaka, Japan, pp. 415-420, Nov. 3-5, 1991.

Zha et al., "Mobile Robot Localization Using Incomplete Maps for Change Detection in a Dynamic Environment," Advanced Intelligent Mechatronics '97. Final Program and Abstracts., IEEE/ASME International Conference, pp. 110, Jun. 1997.

Zhang et al., "A Novel Mobile Robot Localization Based on Vision," SPIE vol. 6279, 6 pages, Jan. 2007.

Dyson's Robot Vacuum Cleaner—the DC06, May 2004, Retrieved from the Internet: URL<http://www.gizmag.com/go/1282/>. Accessed Nov. 2011, 3 pages.

Kurs et al, Wireless Power transfer via Strongly Coupled Magnetic Resonances, Downloaded from www.sciencemag.org, Aug. 2007, 5 pages.

* cited by examiner

AUTONOMOUS COVERAGE ROBOT

CLAIM OF PRIORITY

This U.S. patent application claims priority under 35 U.S.C. §119(e) to U.S. Provisional Application 60/938,699, filed on May 17, 2007 and U.S. Provisional Application 60/917,065, filed on May 9, 2007. The disclosures of the prior applications are considered part of the disclosure of this application and are hereby incorporated by reference in their entireties.

The contents of U.S. Pre-grant Publications 2008/00652565, 2007/0244610, and 2007/0016328, 2006/0200281, and 2003/0192144, and also U.S. Pat. Nos. 6,748,297 and 6,883,201 are hereby incorporated herein by reference in their entireties.

TECHNICAL FIELD

The disclosure relates to surface cleaning robots, such as robots configured to perform autonomous cleaning tasks.

BACKGROUND

Wet cleaning of household surfaces has long been done manually using a wet mop or sponge. The mop or sponge is dipped into a container filled with a cleaning fluid to allow the mop or sponge to absorb an amount of the cleaning fluid. The mop or sponge is then moved over the surface to apply a cleaning fluid onto the surface. The cleaning fluid interacts with contaminants on the surface and may dissolve or otherwise emulsify contaminants into the cleaning fluid. The cleaning fluid is therefore transformed into a waste liquid that includes the cleaning fluid and contaminants held in suspension within the cleaning fluid. Thereafter, the sponge or mop is used to absorb the waste liquid from the surface. While clean water is somewhat effective for use as a cleaning fluid applied to household surfaces, most cleaning is done with a cleaning fluid that is a mixture of clean water and soap or detergent that reacts with contaminants to emulsify the contaminants into the water. In addition, it is known to clean household surfaces with water and detergent mixed with other agents such as a solvent, a fragrance, a disinfectant, a drying agent, abrasive particulates and the like to increase the effectiveness of the cleaning process.

The sponge or mop may also be used as a scrubbing element for scrubbing the floor surface, and especially in areas where contaminants are particularly difficult to remove from the household surface. The scrubbing action serves to agitate the cleaning fluid for mixing with contaminants as well as to apply a friction force for loosening contaminants from the floor surface. Agitation enhances the dissolving and emulsifying action of the cleaning fluid and the friction force helps to break bonds between the surface and contaminants.

After cleaning an area of the floor surface, the waste liquid must be rinsed from the mop or sponge. This is typically done by dipping the mop or sponge back into the container filled with cleaning fluid. The rinsing step contaminates the cleaning fluid with waste liquid and the cleaning fluid becomes more contaminated each time the mop or sponge is rinsed. As a result, the effectiveness of the cleaning fluid deteriorates as more of the floor surface area is cleaned.

Some manual floor cleaning devices have a handle with a cleaning fluid supply container supported on the handle and a scrubbing sponge at one end of the handle. These devices include a cleaning fluid dispensing nozzle supported on the handle for spraying cleaning fluid onto the floor. These devices also include a mechanical device for wringing waste liquid out of the scrubbing sponge and into a waste container.

Manual methods of cleaning floors can be labor intensive and time consuming. Thus, in many large buildings, such as hospitals, large retail stores, cafeterias, and the like, floors are wet cleaned on a daily or nightly basis. Industrial floor cleaning "robots" capable of wet cleaning floors have been developed. To implement wet cleaning techniques required in large industrial areas, these robots are typically large, costly, and complex. These robots have a drive assembly that provides a motive force to autonomously move the wet cleaning device along a cleaning path. However, because these industrial-sized wet cleaning devices weigh hundreds of pounds, these devices are usually attended by an operator. For example, an operator can turn off the device and, thus, avoid significant damage that can arise in the event of a sensor failure or an unanticipated control variable. As another example, an operator can assist in moving the wet cleaning device to physically escape or navigate among confined areas or obstacles.

SUMMARY

Presently disclosed is an autonomous robot for treating surfaces, such as floors and countertops, which has a form factor that facilitates cleaning in tightly dimensioned spaces, such as those found in many households. In one example, the robot may include a weight distribution that remains substantially constant throughout the cleaning process, the weight distributed between a cleaning element, a squeegee, and drive wheels. The weight distribution can provide sufficient pressure to the wetting element and the squeegee while allowing sufficient thrust for to be applied at drive wheels. As an advantage, the robot can have a small volume required to navigate in tightly dimensioned spaces while having a weight distribution configured for wet-cleaning a surface.

In one aspect, a surface treatment robot includes a chassis having forward and rear ends and a drive system carried by the chassis. The drive system is configured to maneuver the robot over a cleaning surface and includes right and left driven wheels. The robot includes a vacuum assembly carried by the chassis. The vacuum assembly includes a collection region that engages the cleaning surface and a suction region in fluid communication with the collection region. The suction region is configured to suction waste from the cleaning surface through the collection region. The robot includes a collection volume carried by the chassis and in fluid communication with the vacuum assembly for collecting waste removed by the vacuum assembly. The robot includes a supply volume carried by the chassis and configured to hold a cleaning liquid. An applicator is carried by the chassis and is in fluid communication with the supply volume. The applicator is configured to dispense the cleaning liquid onto the cleaning surface substantially near the forward end of the chassis. The robot includes a wetting element carried by the chassis and engaging the cleaning surface to distribute the cleaning liquid along at least a portion of the cleaning surface when the robot is driven in a forward direction. The wetting element is arranged substantially forward of a transverse axis defined by the right and left driven wheels, and the wetting element slidably supports at least about ten percent of the mass of the robot above the cleaning surface.

Implementations of this aspect of the disclosure may include one or more of the following features. In some implementations, the collection region of the vacuum assembly is arranged substantially rearward of the transverse axis defined by the right and left drive wheels, and the vacuum assembly slidably supports at least about twenty percent of the mass of the robot above the cleaning surface. In certain implementations, a forward portion of the collection region of the vacuum assembly is configured to pass a point on the cleaning surface about 0.25 s to about 0.6 s after a forward portion of the applicator has passed the point on the cleaning surface when the robot is driven at a maximum speed in the forward direction.

In some implementations, the robot includes a navigation system in communication with the drive system and configured to navigate the robot. The vacuum assembly is configured to collect a portion of the cleaning liquid dispensed onto the cleaning surface and the navigation system is configured to navigate the robot to return to collect the cleaning liquid remaining on the surface. In certain implementations, the navigation system is configured to navigate the robot along a pseudo-random path to return to collect the cleaning liquid remaining on the surface.

In some implementations, the collection region of the vacuum assembly includes a squeegee and a vacuum chamber. The squeegee is attached to the chassis and formed with a longitudinal ridge disposed proximate to the cleaning surface and extending across a cleaning width for providing a liquid collection volume at a forward edge of the ridge. The vacuum chamber is partially formed by the squeegee, and the vacuum chamber is disposed proximate to the longitudinal ridge, extending across the cleaning width. The vacuum chamber is in fluid communication with the liquid collection volume by a plurality of suction ports defined by the squeegee, substantially above the longitudinal ridge.

In some implementations, the drive system is configured to maneuver the robot within a volume of less than about 3 L. In certain implementations, the supply volume is configured to hold about 600 mL or greater of cleaning liquid.

In some implementations, the drive system is configured to provide between about 100 grams-force and about 700 grams-force at each wheel to propel the robot at a maximum forward rate of about 200 mm/s to about 400 mm/s. In certain implementations, the center of gravity of the robot is substantially along a transverse axis defined by the right and left differentially driven wheels.

In some implementations, the robot includes an extension element carried by the chassis and extending transversely from the chassis. The extension element is configured to guide debris toward the chassis. In certain implementations, the extension element includes a spring detent configured to allow the extension element to flex upon contact with an obstacle and to return to a substantially original position upon disengagement from the obstacle. In some implementations, the extension element is in fluid communication with the vacuum assembly and configured to suction debris toward the vacuum assembly.

In another aspect a surface treatment robot includes a chassis having forward and rear ends and a drive system carried by the chassis and configured to maneuver the robot over a cleaning surface. The drive system includes right and left driven wheels. The robot includes a vacuum assembly carried by the chassis and including a collection region and a suction region. The collection region engages the cleaning surface and the suction region is in fluid communication with the collection region. The suction region is configured to suction waste from the cleaning surface through the collection region. The robot includes a collection volume carried by the chassis and in fluid communication with the vacuum assembly for collecting waste removed by the vacuum assembly. The robot includes a supply volume carried by the chassis and configured to hold a cleaning liquid. An applicator is carried by the chassis and in fluid communication with the supply volume. The applicator is configured to dispense the cleaning liquid onto the cleaning surface substantially near the forward end of the chassis. The supply volume and the collection volume are configured to maintain a substantially constant center of gravity along a transverse axis defined by the right and left differentially driven wheels while at least about 25 percent of the total volume of the robot shifts from cleaning liquid in the supply volume to waste in the collection volume as cleaning liquid is dispensed from the applicator and waste is collected by the vacuum assembly.

In some implementations, at least a portion of the supply volume includes a bladder disposed substantially within the collection volume. The bladder is expandable to hold a volume of cleaning fluid of at least about 25 percent of the total volume of the robot, and the bladder is collapsible to allow the collection volume to hold a volume of waste of at least about 25 percent of the total volume of the robot.

In some implementations, the wetting element has a substantially arcuate shape and includes bristles extending from the wetting element to engage the cleaning surface. The bristles are configured to deform substantially separately from one another to dissipate a force created when the wetting element contacts an obstacle as the robot is driven.

In some implementations, the collection region of the vacuum assembly has a transverse dimension substantially equal to a transverse dimension of the wetting element, and the right and left differentially driven wheels define a transverse dimension less than or equal to the transverse dimension of the wetting element.

In some implementations, the suction region of the vacuum assembly includes a fan and an intake conduit in fluid communication with the fan and in fluid communication with the vacuum chamber. The fan is configured to draw air from the vacuum chamber through the intake conduit to generate a negative air pressure within the vacuum chamber for drawing waste liquid from the collection region into the vacuum chamber. At least a portion of the intake conduit is arranged about 90 degrees relative to the direction of flow of the waste liquid into the vacuum chamber to block substantial flow of waste liquid into the fan.

In certain implementations, the supply volume defines a first port and the collection volume defines a second port. The first port is arranged substantially opposite the second port to allow the robot to remain in substantially the same orientation when cleaning liquid is added to the supply volume as when waste is emptied from the collection volume. In some implementations, the robot includes a bumper carried by the chassis and arranged substantially along the front end of the chassis. The bumper defines an opening providing access to the first port of the supply volume.

In another aspect, an autonomous coverage robot includes a body having forward and rear ends, a perimeter, and a top region. The robot includes a drive system carried by the body and configured to maneuver the robot over a cleaning surface, the drive system comprising right and left differentially driven wheels. The robot includes an optical receiver carried by the body substantially below the top region and substantially forward of the transverse axis defined by the right and left differentially driven wheels. The robot includes a signal channeler in optical communication with the optical receiver. The signal channeler is arranged along the top region of the body and extends substantially around the entire perimeter of the body. The signal channeler is configured to receive an optical signal from a remote transmitter in substantially any direction around the perimeter of the body. The signal channeler is internally reflective to direct the optical signal toward the receiver, and the drive system is configured to alter a heading setting in response to the optical signal received by the receiver.

In some implementations, the robot includes a collection volume carried by the body for collecting waste removed from the surface by the robot. The signal channeler forms at least a portion of the top surface of the collection volume.

In certain implementations, at least a portion of the signal channeler is formed of a material having an index of refraction of about 1.4 or greater to allow substantially total internal reflection within the signal channeler. In some implementations, the signal channeler includes a first mirror disposed along a first surface and a second mirror disposed along a second surface, opposite the first surface. The first mirror and the second mirror are configured to internally reflect light within the signal channeler.

In another aspect, an autonomous robot includes a chassis and a biased-to-drop suspension system coupled to the chassis. The biased-to-drop suspension system has a top position and a bottom position. The robot includes a vacuum assembly carried by the chassis and configured to suction waste from the cleaning surface. A collection volume is carried by the chassis and in fluid communication with the vacuum assembly for collecting waste suctioned by the vacuum assembly. The robot includes a seal movable from an open position to a closed position to interrupt at least a portion of the fluid communication between the vacuum assembly and the collection volume. The seal is coupled to the suspension system and configured to move from the open position to the closed position when the biased-to-drop suspension system moves from the top position to the bottom position.

In some implementations, the vacuum assembly includes a fan and the seal is configured to interrupt at least a portion of the fluid communication between the fan and the collection volume.

In another aspect, a robot stasis detection system includes a body configured to move over a surface and a stasis sensor carried by the body. The stasis sensor includes an optical emitter configured to emit a directed beam and a photon detector operable to detect the directed beam. The stasis sensor includes an object positioned between the directed beam and the photon detector to block substantial optical communication between the optical emitter and the photon detector. The object is movable in response to a motion sequence of the body to allow substantial optical communication between the optical emitter and the photon detector. The robot stasis detection system includes a controller in electrical communication with the stasis sensor and configured determine a stasis condition based at least in part on a level of optical communication between the optical emitter and the photon detector.

In some implementations, the controller is configured to maneuver the body to cause the motion sequence of the body. In certain implementations, the robot stasis detection system includes two driven wheels carried by the body, and the controller is configured drive the two wheels differentially to cause the motion sequence of the body. In certain implementations, the robot stasis detection system includes a wetting element carried by the body and in contact with the surface. The wetting element is configured to spread a cleaning liquid on the surface during the motion sequence of the body.

In another aspect, a method of detecting stasis of an autonomous robot includes emitting a directed beam from an optical emitter carried on the robot. The method includes controlling a drive system of the robot to provide a motion sequence of the robot. As an object carried on the robot moves in response to the motion sequence of the robot, the method includes detecting the directed beam at a photon detector carried on the robot. A stasis condition of the robot is determined based at least in part on a level of optical communication between the optical emitter and the photon detector.

In some implementations, controlling the drive system of the robot includes differentially driving two wheels carried on the robot to provide the motion sequence of the robot. In certain implementations, the robot is configured to carry a cleaning element in contact with a surface and the motion sequence of the robot is part of a cleaning routine of the robot. In some implementations, the robot defines a center vertical axis and controlling a drive system of the robot to provide a motion sequence of the robot comprises a sequence of drive commands configured to rotate the robot about the center vertical axis.

In another aspect, a method of detecting stasis of an autonomous robot includes maneuvering a robot over a surface and, from an optical emitter carried on the robot, emitting a directed beam from the optical emitter. At a photon detector carried on the robot, the method includes detecting a reflection of the directed beam from the surface. The method includes determining a stasis condition of the robot based at least in part on variations in strength of the reflection detected by the photon detector.

In some implementations, maneuvering the robot over the surface includes differentially driving two wheels to move a passive cleaning element, carried by the robot, over the surface. In certain implementations, emitting the directed beam toward the surface includes emitting the directed beam toward the surface forward of the passive cleaning element. In some implementations, the method includes comparing the determined stasis condition of the robot with a second stasis condition determined by a second sensor carried by the robot. In certain implementations, maneuvering the robot over a surface includes moving the robot over the surface at a forward rate of about 200 m/s to about 400 m/s. In some implementations, the method includes determining the presence of a cliff forward of the robot based on the strength of the signal detected by the photon detector.

In another aspect, a robot wall detection system includes a body configured to move over a surface and a sensor carried by the body for detecting the presence of a wall. The sensor includes an emitter which emits a directed beam having a defined field of emission toward a wall in a substantially forward direction of the body. The sensor includes a detector having a defined field of view extending toward the wall in a substantially forward direction of the robot. The defined field of view is near-parallel to the defined field of emission and intersects the defined field of emission at a finite region substantially forward of the sensor. A circuit in communication with the detector controls the distance between the body and the wall.

In some implementations, the body is configured to move the detector forward at about 200 mm/s to about 400 mm/s. In certain implementations, the controller is configured to maintain a constant analog value of the detector to move the body at a substantially constant distance from the wall. In some implementations, the defined field of emission is arranged relative to the defined field of view to provide a substantially linear relationship between distance from the wall and strength of the signal detected by the detector. In certain implementations, an included angle between the defined field of emission and the defined field of view is about 10 degrees to about 30 degrees.

Other aspects, features, and advantages will be apparent from the description and drawings, and from the claims.

DETAILED DESCRIPTION

An autonomous robot may be designed to clean flooring. For example, the autonomous robot may vacuum carpeted or hard-surfaces and wash floors via liquid-assisted washing and/or wiping and/or electrostatic wiping of tile, vinyl or other such surfaces. U.S. application Ser. No. 11/359,961 by Ziegler et al. entitled AUTONOMOUS SURFACE CLEANING ROBOT FOR WET AND DRY CLEANING, the disclosure of which is herein incorporated by reference in its entirety, discloses an autonomous cleaning robot.

An autonomous robot is movably supported on a surface and is used to clean the surface while traversing the surface. The robot can wet clean the surface by applying a cleaning liquid to the surface, spreading (e.g., smearing, scrubbing) the cleaning liquid on the surface, and collecting the waste (e.g., substantially all of the cleaning liquid and debris mixed therein) from the surface. As compared to comparable-sized autonomous dry cleaning robots, an autonomous wet cleaning robot can remove more debris from a surface.

Figure 1:
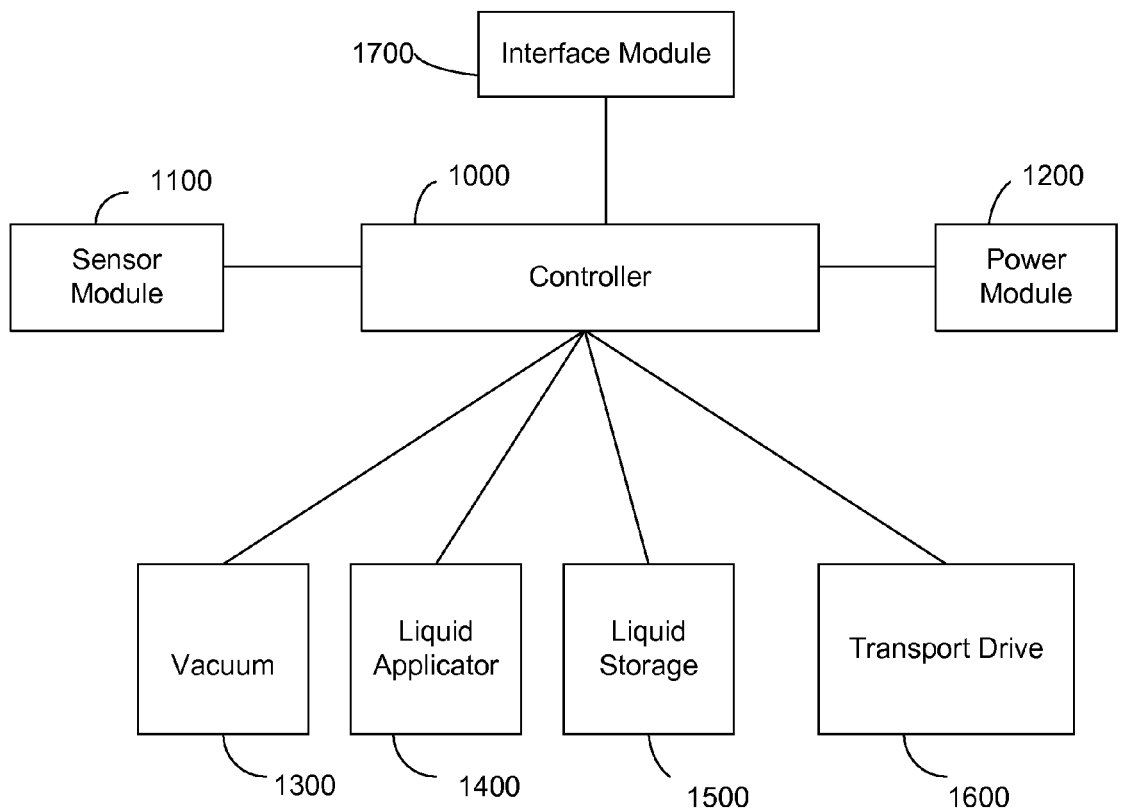
FIG. 1 is a schematic block diagram showing the interrelationship of subsystems of an autonomous cleaning robot.

FIG. 1 is a schematic block diagram showing the interrelationship of subsystems of an autonomous cleaning robot. A controller 1000 is powered by a powered by a power module 1200 and receives inputs from a sensor module 1100 and an interface module 1700. The controller 1000 combines the inputs from the sensor module 1100 with information (e.g., behaviors) preprogrammed on the controller 1000 to control a liquid storage module 1500, a liquid applicator module 1400, and a vacuum module 1300 (e.g., a wet-dry vacuum module) while also controlling a transport drive 1600 to maneuver the autonomous cleaning robot across a cleaning surface (hereinafter referred to as a "surface").

A controller 1000 (e.g., a controller on the robot) controls the autonomous movement of the robot across the surface by directing motion of the drive wheels that are used to propel the robot across the surface. The controller 1000 can redirect the motion of the robot in response to any of various different signals from sensors (e.g., sensors carried on the robot, a navigation beacon). Additionally or alternatively, the controller can direct the robot across the surface in a substantially random pattern to improve the cleaning coverage provided by the robot.

Prior to the cleaning operation, cleaning liquid can be added to the liquid storage module 1500 via an external source of cleaning liquid. The robot can then be set on a surface to be cleaned, and cleaning can be initiated through an interface module 1700 (e.g., a user interface carried by the robot). The controller 1000 controls the transport drive 1600 to maneuver the robot in a desired pattern across the surface. As the controller 1000 controls the movements of the robot across the surface, the controller also controls a liquid applicator module 1400 to supply cleaning liquid to the surface and a vacuum module 1300 to collect waste from the surface.

After the cleaning operation is complete (e.g., after all of the cleaning liquid has been dispensed from the robot, after the robot has completed a routine, after an elapsed period of time), waste can be removed from the robot. The robot is lightweight and has a compact form factor that each facilitate, for example, handling of the robot such that the robot can be moved to another area to be cleaned or put in storage until a subsequent use. The robot is substantially sealable (e.g., passively sealable, actively sealable) to minimize spillage of cleaning liquid and/or waste from the robot while the robot is in use or while the robot is being handled.

Referring to FIGS. 2-6, a robot 10 includes a chassis 100 carrying a baseplate 200, a bumper 300, a user interface 400, and wheel modules 500, 501. Wheel modules 500, 501 are substantially opposed along a transverse axis defined by the chassis 100. Baseplate 200 is carried on a substantially bottom portion of chassis 100 and at least partially supports a front portion of the chassis 100 above the surface. As wheel modules 500, 501 propel the robot 10 across the surface during a cleaning routine, the baseplate 200 makes slidable contact with the surface and wet-vacuums the surface by delivering cleaning liquid to the surface, spreading the cleaning liquid on the surface, and collecting waste from the surface and into the volume defined by the robot 10. A user interface 400 is carried on a substantially top portion of the chassis 100 and configured to receive one or more user commands and/or display a status of the robot 10. The user interface 400 is in communication with a controller (described in detail below) carried by the robot 10 such that one or more commands to the user interface 400 can initiate a cleaning routine to be executed by the robot 10. A bumper 300 is carried on a forward portion of the chassis 100 and configured to detect one or more events in the path of the robot 10 (e.g., as wheel modules 500, 501 propel the robot 10 across a surface during a cleaning routine). As described in detail below, the robot 10 can respond to events (e.g., obstacles, cliffs, walls) detected by the bumper 300 by controlling wheel modules 500, 501 to maneuver the robot 10 in response to the event (e.g., away from the event). While some sensors are described herein as being arranged on the bumper, these sensors can additionally or alternatively be arranged at any of various different positions on the robot 10.

The robot 10 stores cleaning fluid and waste and, thus, substantially the entire electrical system is fluid-sealed and/or isolated from cleaning liquid and/or waste stored on the robot 10. Examples of sealing that can be used to separate electrical components of the robot 10 from the cleaning liquid and/or waste include covers, plastic or resin modules, potting, shrink fit, gaskets, or the like. Any and all elements described herein as a circuit board, PCB, detector, or sensor can be sealed using any of various different methods.

The robot 10 can move across a surface through any of various different combinations of movements relative to three mutually perpendicular axes defined by the chassis: a central vertical axis 20, a fore-aft axis 22 and a transverse axis 24. The forward travel direction along the fore-aft axis 22 is designated F (sometimes referred to hereinafter as "forward"), and the aft travel direction along the fore-aft axis 22 is designated A (sometimes referred to hereinafter as "rearward"). The transverse axis extends between a right side, designated R, and a left side, designated L, of the robot 10 substantially along an axis defined by center points of wheel modules 500, 501. In subsequent figures, the R and L directions remain consistent with the top view, but may be reversed on the printed page.

In use, a user opens a fill door 304 disposed along the bumper 300 and adds cleaning fluid to the volume within the robot 10. After adding cleaning fluid to the robot 10, the user then closes the fill door 304 such that the fill door 304 forms a substantially water-tight seal with the bumper 300 or, in some implementations, with a port extending through the bumper 300. The user then sets the robot 10 on a surface to be cleaned and initiates cleaning by entering one or more commands on the user interface 400.

The controller carried by the robot 10 directs motion of the wheel modules 500, 501. The controller can control the rotational speed and direction of each wheel module 500, 501 independently such that the controller can maneuver the robot 10 in any of various different directions. For example, the controller can maneuver the robot 10 in the forward, reverse, right, and left directions. For example, as the robot 10 moves substantially along the fore-aft axis 22, the robot 10 can make repeated alternating right and left turns such that the robot 10 rotates back and forth around the center vertical axis 20 (hereinafter referred to as a wiggle motion). As described in detail below, such a wiggle motion of the robot 10 can allow the robot 10 to operate as a scrubber during the cleaning operation. As also described in detail below, a wiggle motion of the robot 10 can be used by the controller to detect stasis of the robot 10. Additionally or alternatively, the controller can maneuver the robot 10 to rotate substantially in place such that, for example, the robot can maneuver out of a corner or away from an obstacle. In some implementations, the controller directs the robot 10 over a substantially random (e.g., pseudo-random) path traversing the surface to be cleaned. As described in detail below, the controller is responsive to any of various different sensors (e.g., bump sensors, proximity sensors, walls, stasis conditions, and cliffs) disposed about the robot 10. The controller can redirect wheel modules 500, 501 in response to signals from the sensors such that the robot 10 wet vacuums the surface while avoiding obstacles and clutter. If the robot 10 becomes stuck or entangled during use, the controller is configured to direct wheel modules 500, 501 through a series of escape behaviors such that the robot 10 can resume normal cleaning of the surface.

The robot 10 is generally advanced in a forward direction during cleaning operations. The robot 10 is generally not advanced in the aft direction during cleaning operations but may be advanced in the aft direction to avoid an object or maneuver out of a corner or the like. Cleaning operation can continue or be suspended during aft transport.

During wet vacuuming, cleaning liquid can be dispensed to the surface through an applicator mounted directly to the chassis (e.g., to be used as an attachment point for the bumper and/or to conceal wires). Additionally or alternatively, the cleaning liquid can be dispensed to the surface through an applicator mounted to a baseplate. For example, cleaning liquid can be dispensed through trough 202 carried on the baseplate 200, along a substantially forward portion of the robot 10. The trough 202 defines injection orifices 210 configured along the length of the trough 202 to produce a spray pattern of cleaning fluid. As described in detail below, a pump upstream of the trough 202 forces cleaning liquid through injection orifices 210 to deliver cleaning liquid to the surface. In some implementations, injection orifices 210 are substantially equally spaces long the length of the trough 202 to produce a substantially uniform spray pattern of cleaning liquid on the surface. In some embodiments, the injection orifices 210 are configured to allow cleaning liquid to drip from the injection orifices 210.

A wetting element 204 is carried on the baseplate 200, substantially rearward of the trough 202. Ends of the wetting element 204 extend in a transverse direction substantially the entire width (e.g., diameter) of the robot 10. In use, the wetting element 204 slidably contacts the surface to support a forward portion of the robot 10 above the cleaning surface. As the robot 10 moves in a substantially forward direction, the sliding contact between the wetting element 204 and the surface spreads the cleaning liquid on the surface. In some implementations, a second wetting element 206 is carried on the baseplate 200, substantially rearward of the wetting element 204 to further spread and/or agitate the cleaning liquid on the surface.

As the robot continues to move forward, wheel modules 500, 501 pass through the cleaning liquid spread on the surface. A combination of weight distribution (e.g., drag) of the robot 10, material selection for the tires of the wheel modules 500, 501, and a biased-to-drop suspension system improve the traction of wheel modules 500, 501 through the cleaning liquid such that wheel modules 500, 501 can pass over the cleaning liquid without substantial slipping.

A squeegee 208 is carried on the baseplate 200 and, during use, extends from the baseplate 200 to movably contact the surface. The squeegee 208 is positioned substantially rearward of the wheel modules 500, 501. As compared to a robot including a squeegee in a more forward position, such rearward positioning of the squeegee 208 can increase the dwell time of the cleaning liquid on the surface and, thus, increase the effectiveness of the cleaning operation. Additionally or alternatively, such rearward positioning of the squeegee 208 can reduce rearward tipping of the robot 10 in response to thrust created by the wheel modules 500, 501 propelling the robot 10 in a forward direction.

As described in detail below, the movable contact between the squeegee 208 acts to lift waste (e.g., a mixture of cleaning liquid and debris) from the cleaning surface as the robot 10 is propelled in a forward direction. The squeegee 208 is configured to pool the waste substantially near suction apertures 212 defined by the squeegee 208. A vacuum assembly carried by the robot 10 suctions the waste from the cleaning surface and into the robot 10, leaving behind a wet vacuumed surface.

After all of the cleaning fluid has been dispensed from the robot 10, the controller stops movement of the robot 10 and provides an alert (e.g., a visual alert or an audible alert) to the user via the user interface 400. The user can then open an empty door 104 to expose a waste port defined by the waste collection volume remove collected waste from the robot 10. Because the fill door 304 and the empty door 104 are disposed along substantially opposite sides of the chassis, the fill door 304 and the empty door 104 can be opened simultaneously to allow waste to drain out of the robot 10 while cleaning liquid is added to the robot 10.

If the user wishes to move the robot 10 between uses, the user may move (e.g., rotate) a handle 401 away from the chassis 100 and lift the robot 10 using the handle 401. The handle 401 pivots about a transverse axis (e.g., a center transverse axis) including the center of gravity of the robot 10 such that the handle 401 can be used to carry the robot 10 substantially like a pail. The robot 10 includes a passive sealing system and/or an active sealing system such that the robot 10 remains substantially water-tight during transport. An active and/or passive sealing system can reduce the escape of waste and/or cleaning fluid from the robot 10 as the robot 10 is moved from one area to another. Accordingly, the robot 10 can be moved and stored with little risk of creating hazardous, slippery conditions resulting from liquid dripping from the robot. Additionally or alternatively, the robot 10 can be moved and stored with little risk of dripping liquid on the user or on surfaces that have already been cleaned.

After moving the robot 10, the user can position the handle 401 back into a position substantially flush with the top portion of the robot to reduce the potential for the handle 401 becoming entangled with an object while the robot 10 is in use. In some implementations, the handle 401 includes a magnetized portion that biases the handle 401 toward a position flush with the top portion of the robot. In some implementations, the handle 401 includes a spring that biases the handle 401 toward a position substantially flush with the top portion of the robot 10.

Between uses, the user can recharge a power supply carried on-board the robot 10. To charge the power supply, the user can open a charge port door 106 on a back portion of the chassis 100. With the charge port door 106 open, the user can connect a wall charger to a charge port behind the charge port door 106. The wall charger is configured to plug into a standard household electrical outlet. During the charging process, one or more indicators (e.g., visual indicators, audible indicators) on the user interface 400 can alert the user to the state of charge of the power supply. Once the power supply has been recharged (e.g., as indicated by the user interface 400), the user can disconnect the robot 10 from the wall charger and close the charge port door 106. The charge port door 106 forms a substantially water-tight seal with the chassis 100 such that the charge port remains substantially free of liquid when the charge port door 106 is closed. In some implementations, the power supply is removed from the robot 10 and charged separately from the robot 10. In some implementations, the power supply is removed and replaced with a new power supply. In some implementations, the robot 10 is recharged through inductive coupling between the robot 10 and an inductive transmitter. Such inductive coupling can improve the safety of the robot 10 by reducing the need for physical access to electronic components of the robot 10.

Form Factor

The chassis 100, baseplate 200, bumper 300, user interface 400, and wheel modules 500, 501 fit together such that robot 10 has a substantially cylindrical shape with a top surface and a bottom surface that is substantially parallel to and opposite the top surface. Such a substantially cylindrical shape can reduce the potential for the robot 10 to become entangled (e.g., snagged) and/or break on obstacles as the robot 10 traverses a surface.

In some implementations, the substantially cylindrical shape of the robot 10 has a form factor that allows a user to lift and manipulate the robot 10 in a manner similar to the manipulation of a typical canteen carried by hikers. For example, a user can fill the robot 10 with cleaning liquid by placing the robot 10 under a typical bathroom or kitchen faucet. With the robot 10 in the same orientation used to fill the robot with cleaning liquid, the robot can be emptied into the bathroom or kitchen sink. The robot 10 includes a front face 302 and a back face 102, each of which are substantially flat and configured to balance the robot 10 on end. For example, a user can place back face 102 on a substantially flat surface (e.g., a countertop, bottom of a kitchen sink, bottom of a bathtub) such that the robot 10 is balanced on the countertop with front face 302 facing upward toward the user. Such an orientation can allow a user to fill the robot 10 with cleaning liquid without holding the robot. Additionally or alternatively, a user can place front face 302 on a substantially flat surface to allow a user to more easily access components of the robot 10 (e.g., a battery compartment, a charging port).

The robot 10 performs cleaning operations in tightly dimensioned areas. In some implementations, the robot 10 can have a compact form factor for avoiding clutter or obstacles while wet-vacuuming a surface. For example, the robot 10 can be dimensioned to navigate household doorways, under toe kicks, and under many typical chairs, tables, portable islands, and stools, and behind and beside some toilets, sink stands, and other porcelain fixtures. In certain implementations, the overall height of the robot 10 is less than a standard height of a toe-kick panel of a standard North American bathroom vanity. For example, the overall height of the robot 10 can be less than about 18 centimeters (e.g., about 15 centimeters, about 12 centimeters, about 9 centimeters). In certain implementations, the overall diameter of the robot 10 is approximately equal to the standard distance between the base of an installed toilet and a bathroom wall. As compared to larger diameter robots, such a diameter of the robot 10 can improve cleaning around the base of a toilet, e.g., substantially between the toilet and the wall. For example, the overall diameter of the robot 10 can be less than about 26 centimeters (e.g., about 20 centimeters, about 15 centimeters, about 10 centimeters). In certain implementations, the wheel modules 500, 501 are configured to maneuver the robot 10 in such tightly dimensioned spaces (e.g., in a volume of less than about 3 L).

While the robot 10 is described as having a substantially cylindrical shape in the range of dimensions described above, the robot 10 can have other cross-sectional diameter and height dimensions, as well as other cross-sectional shapes (e.g. square, rectangular and triangular, and volumetric shapes, e.g. cube, bar, and pyramidal) to facilitate wet cleaning narrow or hard-to-reach surfaces.

Within a given size envelope, larger volumes of cleaning liquid can be stored by reducing, for example, the volume required for the other functions (e.g., liquid pumping, vacuuming) of the robot 10. In some implementations, the robot 10 carries a volume of cleaning fluid that is at least about 20 percent (e.g. at least about 30 percent, at least about 40 percent) of the volume of the robot 10.

Physics and Mobility

The robot 10 is configured to clean approximately 150 square feet of cleaning surface in a single cleaning operation. A larger or smaller tank may permit this to range from 100 square feet to 400 square feet. The duration of the cleaning operation is approximately 45 minutes. In implementations with smaller, larger, or 2 or more batteries on board, the cleaning time can range down to 20 minutes or up to 2 hours. Accordingly, the robot 10 is configured (physically, and as programmed) for unattended autonomous cleaning for 45 minutes or more without the need to recharge a power supply, refill the supply of cleaning fluid or empty the waste materials collected by the robot.

In implementations in which the robot 10 is configured to collect substantially all of the cleaning fluid delivered to the surface in a single pass, the average forward travel speed of the robot 10 can be a function of the cleaning quality and/or the surface coverage area required for a given implementation. For example, slower forward travel speeds can allow a longer soak time (e.g., longer contact time) between the cleaning fluid and the debris on the surface such that the debris can be more easily removed from the surface through suction with the squeegee 208. Additionally or alternatively, faster forward travel speeds can allow the robot 10 to clean a larger surface area before requiring refilling with cleaning liquid and/or recharging the power supply. Accordingly cleaning quality and surface coverage that is acceptable to consumers is achieved by configuring the robot 10 to allow between about 0.3 and about 0.7 seconds of contact between the cleaning liquid and the surface before the cleaning liquid is collected into the robot 10 through squeegee 208. For example, when the robot 10 has a diameter of about 17 centimeters and travels at a forward rate of about 25 centimeters/second, the contact time between the cleaning liquid and the surface is about 0.25 to about 0.6 seconds, the variation in contact time depending on the positioning of the cleaning fluid distribution relative to the forward edge of the robot 10 and the positioning of the vacuum assembly relative to the rearward edge of the robot.

In some implementations, the robot 10 includes a navigation system configured to allow the robot 10 to deposit cleaning liquid on a surface and subsequently return to collect the cleaning liquid from the surface through multiple passes. As compared to the single-pass configuration described above, such configurations can allow cleaning liquid to be left on the surface for a longer period of time while the robot 10 travels at a higher rate of speed. The navigation system allows the robot 10 to return to positions where the cleaning fluid has been deposited on the surface but not yet collected. The navigation system can maneuver the robot in a pseudo-random pattern across the surface such that the robot is likely to return to the portion of the surface upon which cleaning fluid has remained.

As described above, the transverse distance between wheel modules 500, 501 (e.g., the wheel base of robot 10) is substantially equal to the transverse cleaning width (e.g., the transverse width of the wetting element 204. Thus, during a cleaning operation, wheel modules 500, 501 are configured to grip a portion of the surface covered with cleaning liquid. With sufficient traction force, the wheel modules 500, 501 can propel the robot 10 through the cleaning liquid. With insufficient traction force, however, the wheel modules 500, 501 can slip on the cleaning liquid and the robot 10 can become stuck in place.

Heavier robots can apply sufficient pressure at wheels to avoid slipping as the wheels pass over the cleaning liquid. As compared to lighter robots, however, heavier robots are more difficult to handle (e.g., for refilling at a sink, for carrying to storage). Accordingly, the robot 10 is configured to weigh less than 3 kg (fully loaded with cleaning liquid) while wheel modules 500, 501 provide sufficient traction to propel robot 10 through cleaning liquid on distributed on the surface.

In some implementations, the center of gravity of the robot 10 is substantially along the transverse axis 24 such that much of the weight of the robot 10 is over the wheel modules 500, 501 during a cleaning operation. Such a weight distribution of robot 10 can exert a sufficient downward force on wheel modules 500, 501 to overcome slippage while also allowing wheel modules 500, 501 to overcome drag forces created as wetting element 204 and squeegee 208 movably contact the surface. In some implementations, the weight of the robot is distributed to overcome such drag forces while applying sufficient cleaning pressure to the surface (e.g., sufficient pressure to wetting element 204 and squeegee 208). For example, the wheel modules 500, 501 can support about 50% to about 70% of the weight of the robot 10 above the surface. The wetting element 204 can support at least about 10% of the weight of the robot above the surface, along the forward portion of the robot. The squeegee 208 can support at least about 20% of the weight of the robot above the surface, along the rearward portion of the robot. As described in detail below, the supply volume and the collection volume are configured to maintain the center of gravity of the robot substantially over the transverse axis 24 while at least about 25 percent of the total volume of the robot shifts from cleaning liquid in the supply volume to waste in the collection volume as the cleaning cycle progresses from start to finish.

In certain implementations, the robot is about 1 kg to about 5 kg full. For household use, the robot can weigh as much as 7 kg full. Exemplary ranges for physical dimensions of the robot are a full mass of 1-10 kg; a cleaning width of 5 cm-40 cm within a diameter of 10-50 cm; a wheel diameter 1.5 cm-20 cm; drive wheel contact line 2 cm-10 cm for all drive wheels (two, three, four drive wheels); drive wheel contact patch for all wheels 2 cm² or higher.

The robot 10 can be less than about 1.5 kg empty, and less than approximately 3 kg full, and carry about 0.5 kg to about 1 kg (or 400-1200 ml) of clean or dirty fluid (in the case where the robot applies fluid as well as picks it up). The waste tank can be sized according to the efficiency of the pick-up process. For example, with a comparatively inefficient squeegee designed to or arranged to leave a predetermined amount of wet fluid on each pass (e.g., so that the cleaning fluid can dwell and progressively work on stains or dried food patches), the waste tank can be designed to be equal in size or smaller than the clean tank. A proportion of the deposited fluid will never be picked up, and another portion will evaporate before it can be picked up. In implementations in which an efficient squeegee is used (e.g., silicone), then it may be necessary to size the waste tank to be equal to or bigger than the clean fluid tank. A proportion of the tank volume, e.g., 5% or higher, may also be devoted to foam accommodation or control, which can increase the size of the waste tank.

To effectively brush, wipe, or scrub the surface, the wetting element 204 and the squeegee 208 create drag, and for a robot under 10 kg, should create an average drag of less than about 40% of the weight of the robot 10 (e.g., less than about 25% of the weight of the robot). Drag forces (total drag associated with any blades, squeegees, dragging components) should not exceed 25% of robot weight to ensure good mobility in the absence of active suspensions/constant weight systems, as any lifting obstacle will otherwise remove weight from the tires and affect motive force. Maximum available traction typically is no more than about 40% of robot weight on slick surfaces with a surfactant based (low surface tension) cleaning fluid, perhaps as high as 50% in best case situations, and traction/thrust must exceed drag/parasitic forces. However, in order to successfully navigate autonomously, to have sufficient thrust to overcome minor hazards and obstacles, to climb thresholds which may encounter the scrubbing or brushing member differently from the wheels, and to escape from jams and other panic circumstances, the robot 10 can have a thrust/traction, provided mostly by the driven wheels, of about 150% or more of average drag/parasitic force. In implementations including a rotating brush, depending on the direction of rotation, the rotating brush can create drag or thrust.

In some implementations, the robot 10 has a weight of about 1.4 kg fully loaded, with less than about 100 gram-force of drag (on a surface with a static coefficient of friction of about 0.38) caused by the wetting element 204 and less than about 320 gram-force of drag (on a surface with a static coefficient of friction of about 0.77) caused by the squeegee 208, but more than 1100 gram-force of thrust contributed by wheel modules 500, 501 to propel the robot 10 at a maximum forward rate of about 200 mm/s to about 400 mm/s. In certain implementations, weight is added to the robot 10 to improve traction of wheel modules 500, 501 by putting more weight on the wheels (e.g., metal handle, clevis-like pivot mount, larger motor than needed, and/or ballast in one embodiment of the present device). With or without added weight, in some implementations, the robot can include a rotating brush and derive a functional percentage of thrust from a forwardly rotating brush (which is turned off generally in reverse), which is not a feature needed in a large industrial cleaner.

The width of the cleaning head for the mass of a household cleaning robot, under 10 kg (or even under 20 kg), differs from industrial self-propelled cleaners. This is especially true for wet cleaning. In some implementations, the robot 10 has at least about 1 cm of (wet) cleaning width for every 1 kg of robot mass (e.g., about 4, 5, or 6 cm of cleaning width for every 1 kg of robot mass), and up to about 20 cm of cleaning width for every kg of robot mass (the higher ratios generally apply to lower masses). For example, the robot 10 can weigh approximately 1.5 kg when fully loaded with cleaning liquid and can have a wet cleaning width of about 16.5 cm, such that the robot 10 can have about 11 cm of wet cleaning width for every 1 kg of robot mass.

It can be difficult to apply sufficient wiping or scrubbing force with larger cleaning width for every kg of robot mass; and lower cleaning widths per 1 kg of robot mass can lead to either an ineffective cleaning width or a very heavy robot unsuitable for consumer use, i.e., that cannot be carried easily by an ordinary (or frail) person. Self-propelled industrial cleaning machines typically have ⅓ cm of cleaning width or less per kg machine mass.

Ratios of these dimensions or properties determine whether a robot under 5 kg, and in some cases under 10 kg, will be effective for general household use. Although some such ratios are described explicitly above, such ratios (e.g., cm squared area of wheel contact per kg of robot mass, cm of wheel contact line per kg-force of drag, and the like) are expressly considered to be inherently disclosed herein, albeit limited to the set of different robot configurations discussed herein.

In certain implementations, the robot 10 includes tires having a 3 mm foam tire thickness with 2 mm deep sipes. This configuration performs best when supporting no more than 3 to 4 kg per tire. The ideal combination of sipes, cell structure and absorbency for a tire is affected by robot weight. In some implementations, rubber or vinyl tires are configured with surface features to reduce slippage.

The robot 10 includes at least one wetting element 204 and one squeegee 208. For example, a wet vacuum portion can be closely followed by a squeegee to build up the thickness of a deposited water film for pick-up. The squeegee 208 can have sufficient flexibility and range of motion to clear any obstacle taller than 2 mm, but ideally to clear the ground clearance of the robot (e.g., about a 4½ mm minimum height or the ground clearance of the robot).

Any reactionary force exhibited by the squeegee that is directionally opposite to gravity, i.e., up, subtracts from available traction and should be less than about 20% of robot weight (e.g., less than about 10% of robot weight). A certain amount of edge pressure, which has an equal reactionary force, is necessary for the squeegee to wipe and collect fluid. In order to obtain an effective combination of fluid collection, reactionary force, wear, and flexible response to obstacles, the physical parameters of the squeegee are controlled and balanced. In certain implementations, the squeegee 208 includes a working edge radius of 3/10 mm for a squeegee less than 300 mm. In some implementations, the squeegee 208 can have a working edge of about 1/10 to 5/10 mm. Wear, squeegee performance and drag force can be improved with a squeegee of substantially rectangular cross section (optionally trapezoidal) and/or 1 mm (optionally about ½ mm to 1½ mm) thickness, 90 degree corners (optionally about 60 to 120 degrees), parallel to the floor within ½ mm over its working length (optionally within up to ¾ mm), and straight to within 1/500 mm per unit length (optionally within up to 1/100), with a working edge equal to or less than about 3/10 mm as noted above. Deviations from the above parameters can require greater edge pressure (force opposite to gravity) to compensate, thus decreasing available traction.

The wetting element 204 and the squeegee 208 are configured to contact the floor over a broad range of surface variations (e.g., in wet cleaning scenarios, including tiled, flat, wood, deep grout floors). In some implementations, the wetting element 204 and/or the squeegee 208 are mounted using a floating mount (e.g., on springs, elastomers, guides, or the like) to improve contact with the broad range of surface variations. In certain implementations, the wetting element 204 and the squeegee 208 are mounted to the chassis 100 with sufficient flexibility for the designed amount of interference or engagement of the wetting element 204 and/or the squeegee 208 to the surface. As described above, any reactionary force exhibited by the brushes/scrubbing apparatus that is opposite to gravity (up) subtracts from available traction and should not exceed 10% of robot weight.

In certain implementations, the robot includes more than one brush, e.g., two counter-rotating brushes with one or more brush on either fore-aft side of the center line of the robot, or more. The robot can also include a differential rotation brush such that two brushes, each substantially half the width of the robot at the diameter of rotation, are placed on either lateral side of the fore-aft axis 22, each extending along half of the diameter. Each brush can be connected to a separate drive and motor, and can rotate in opposite directions or in the same direction or in the same direction, at different speeds in either direction, which would provide rotational and translational impetus for the robot.

The center of gravity of the robot 10 will tend to move during recovery of fluids unless the cleaner and waste tanks are balanced to continually maintain the same center of gravity location. Maintaining the same center of gravity location (by tank compartment design) can allow a passive suspension system to deliver the maximum available traction. The robot 10 includes a tank design that includes a first compartment having a profile that substantially maintains the position of the compartment center of gravity as it empties, a second compartment having a profile that substantially maintains the position of the compartment center of gravity as it fills, wherein the center of gravity of the combined tanks is maintained substantially within the wheel diameter and over the wheels. In some implementations, the robot 10 includes tanks stacked in a substantially vertical direction and configured to maintain the same location of the center of gravity of the robot 10.

In certain implementations, absent perfect fluid recovery or active suspension, superior mobility is achieved either by modeling or assuming a minimum percentage of fluid recovered across all surfaces (70% of fluid put down for example) and designing the profile of the compartments and center of gravity positions according to this assumption/model. In the alternative, or in addition, setting spring force equal to the maximum unladen (empty tank) condition can contribute to superior traction and mobility. In some implementations, suspension travel is at least equal the maximum obstacle allowed by the bumper (and other edge barriers) to travel under the robot.

Maximizing the diameter of the wheels of the robot can decrease the energy and traction requirements for a given obstacle or depression. In certain implementations, maximum designed obstacle climbing capability should be 10% of wheel diameter or less. A 4.5 mm obstacle or depression should be overcome or tackled by a 45 mm diameter wheel. In certain implementations, the robot is low for several reasons. The bumper is set low to distinguish between carpet, thresholds, and hard floors such that a bumper 3 mm from the ground will prevent the robot from mounting most carpets (2-5 mm bumper ground clearance, 3 mm being preferable). The remainder of the robot working surface, e.g., the vacuum assembly, also have members extending toward the floor (air guides, squeegees, brushes) that are made more effective by a lower ground clearance. Because the ground clearance of one embodiment is between 3-6 mm, the wheels need only be 30 mm-60 mm. Other wheel sizes can also be used.

Assembly

Figure 7:
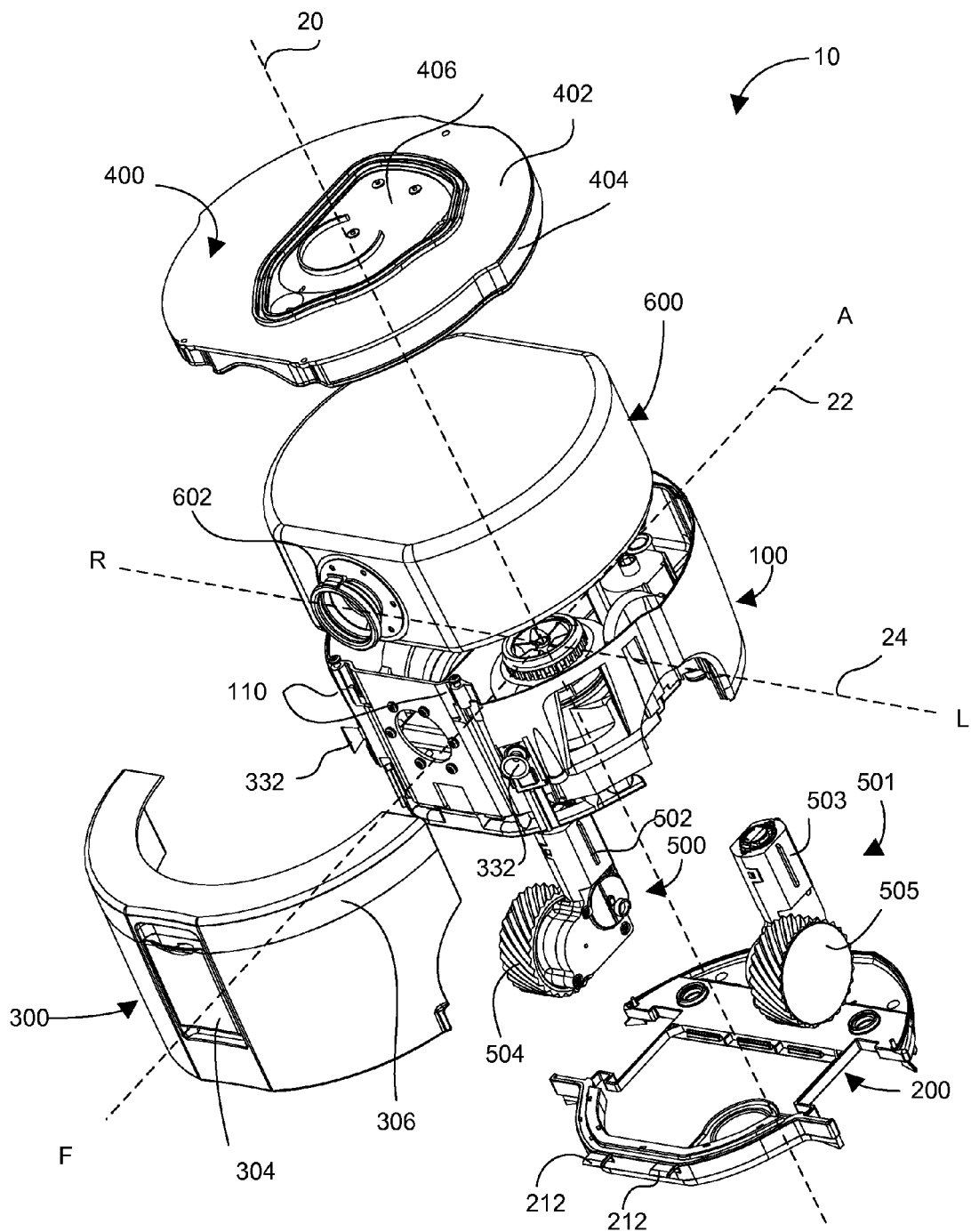
FIG. 7 is an exploded perspective view of the autonomous cleaning robot of FIG. 1 (shown the user interface removed).

Referring to FIG. 7, chassis 100 carries a liquid volume 600 substantially along an inner portion of the chassis 100. As described in detail below, portions of the liquid volume 600 are in fluid communication with liquid delivery and air handling systems carried on the chassis 100 to allow cleaning fluid to be pumped from the liquid volume 600 and to allow waste to be suctioned into the liquid volume 600. To allow the addition of cleaning liquid and the removal of waste, liquid volume 600 can be accessed through fill door 304 and empty door 104 (not shown in FIG. 7).

The wheel modules 500, 501 include respective drive motors 502, 503 and wheels 504, 505. The drive motors 502, 503 releasably connect to the chassis 100 on either side of the liquid volume 600 with the drive motors 502, 503 positioned substantially over respective wheels 504, 505. In some implementations, drive motors 502, 503 are positioned substantially horizontal to respective wheels 504, 505 to increase the size of the liquid volume 600 carried on chassis 100. In some implementations, wheel modules 500, 501 are releasably connected to chassis 100 and can be removed without the use of tools to facilitate, for example, repair, replacement, and cleaning of the wheel modules 500, 501.

A signal channeler 402 is connected to a top portion of chassis 100 and substantially covers the liquid volume 600 to allow components to be attached along a substantially top portion of the robot 10. An edge of the signal channeler 404 is visible from substantially the entire outer circumference of the robot 10 to allow the signal channeler 404 to receive a light signal (e.g., an infrared light signal) from substantially any direction. As described in detail below, the signal channeler 402 receives light from a light source (e.g., a navigation beacon) and internally reflects the light toward a receiver disposed within the signal channeler 402. For example, the signal channeler 402 can be at least partially formed of a material (e.g., polycarbonate resin thermoplastic) having an index of refraction of about 1.4 or greater to allow substantially total internal reflection within the signal channeler. Additionally or alternatively, the signal channeler 402 can include a first mirror disposed along a top surface of the signal channeler 402 and a second mirror disposed along a bottom surface of the signal channeler 402 and facing the first mirror. In this configuration, the first and second mirrors can internally reflect light within the signal channeler 402.

The signal channeler 402 includes a recessed portion 406 that can support at least a portion of the user interface 400. A user interface printed circuit board (PCB) can be arranged in the recessed portion 406 and covered by a membrane to form a substantially water-tight user interface 400. As described in detail below, a bottom portion of signal channeler 402 can form a top portion of the liquid volume 600.

Bumper 300 connects to the hinges 110 arranged substantially along the forward portion of the chassis 100. The hinged connection between bumper 300 and chassis 100 can allow the bumper to move a short distance relative to the chassis 100 when the bumper 300 contacts an obstacle. Bumper 300 is flexibly connected to a fill port 602 of the liquid volume 600 such that the bumper 300 and the fill port 602 can flex relative to one another as the bumper 300 moves relative to the chassis 100 upon contact with an obstacle.

The bumper 300 includes a substantially transparent section 306 near a top portion of the bumper. The transparent section 306 can extend substantially along the entire perimeter of the bumper 300. As described in detail below, the transparent section 306 can be substantially transparent to a signal receivable by an omni-directional receiver disposed substantially near a center portion of the signal channeler 402 such that the omni-directional receiver can receive a signal from a transmitter positioned substantially forward of the bumper 300.

The baseplate 200 is carried on a substantially bottom portion of chassis 100. The baseplate 200 includes pivot hinges that extend from a forward portion of the baseplate 200 and can allow the baseplate 200 to be snapped into complementary hinge features on the chassis 100. In some implementations, a user can unhinge the baseplate 200 from the chassis 100 without the use of tools. The baseplate 200 carries the trough 202 near a forward portion of the robot 10 and a wetting element 204 substantially rearward of the trough 202. The baseplate 200 extends around a portion of each wheel module 500, 501 to form portion of wheel wells for wheels 504, 505, substantially rearward of the wetting element 204. Rearward of the wheels 504, 505, the baseplate 200 carries a vacuum assembly including a squeegee 208 configured in slidable contact with the surface to pool waste near the contact edge between the squeegee 208 and the surface. As described in detail below, the squeegee 208 defines a plurality of orifices substantially near the contact edge between the squeegee 208 and the surface. As the vacuum assembly 1300 creates suction, waste is lifted from the surface and into the robot through the plurality of orifices defined by the squeegee 208.

In some implementations, a user can unhinge the baseplate 200 from the chassis 100 in order to clean the baseplate 200. In certain implementations, the user can remove the trough 202, the wetting element 204, and/or the squeegee 208 from the baseplate 200 to repair or replace these components.

Liquid Storage

Figure 8:
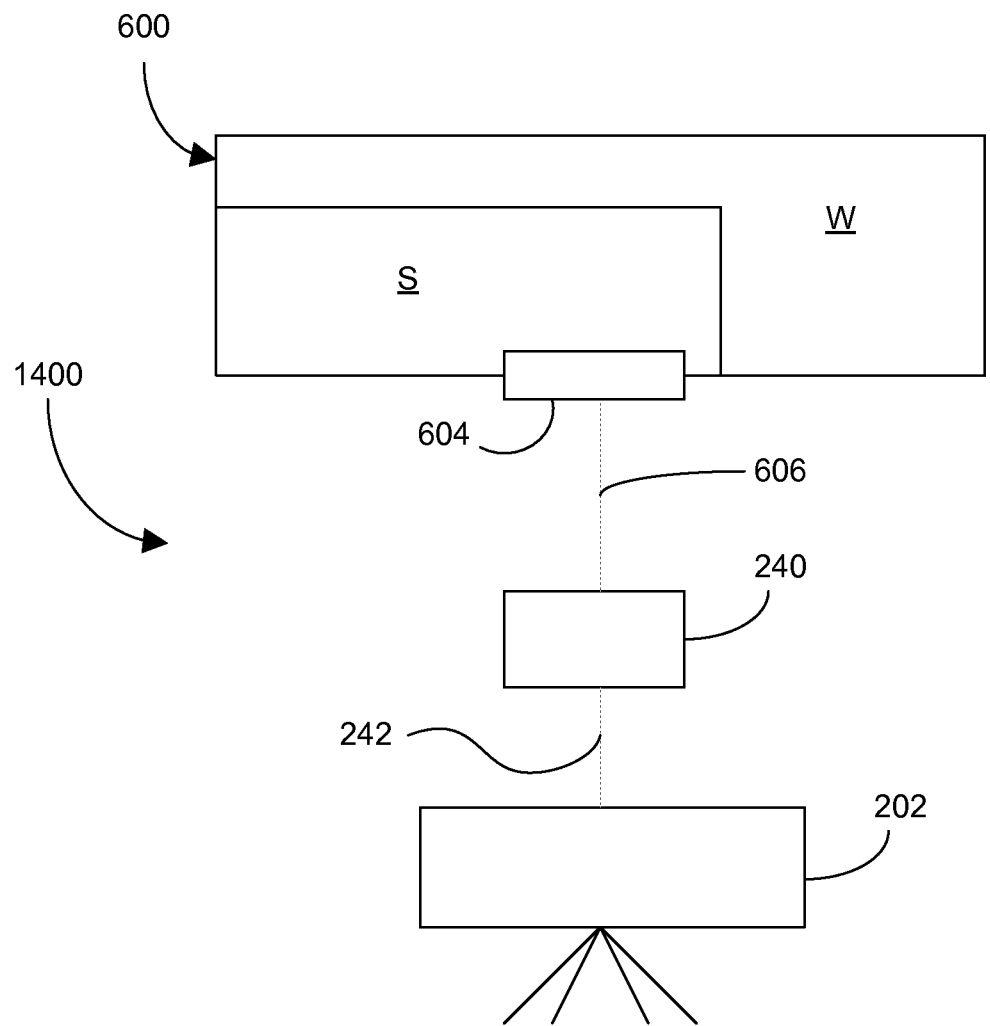
FIG. 8 is a schematic representation of a liquid applicator module of the autonomous cleaning robot of FIG. 1.

Referring to FIG. 8, in some implementations, liquid volume 600 can function as both a liquid supply volume S and a waste collection volume W. Liquid volume 600 is configured such that liquid moves from the liquid supply volume S to the surface and then is picked up and returned to a waste collection volume W. In some implementations, the supply volume S and the waste collection volume W are configured to maintain a substantially constant center of gravity along the transverse axis 24 while at least 25 percent of the total volume of the robot 10 shifts from cleaning liquid in the supply volume S to waste in the collection volume W as cleaning liquid is dispensed from the applicator and waste is collected by the vacuum assembly.

In some implementations, all or a portion of the supply volume S is a flexible bladder within the waste collection volume W and surrounded by the waste collection volume W such that the bladder compresses as cleaning liquid exits the bladder and waste filling the waste collection volume W takes place of the cleaning liquid that has exited the bladder. Such a system can be a self-regulating system which can keep the center of gravity of the robot 10 substantially in place (e.g., over the transverse axis 24). For example, at the start of a cleaning routine, the bladder can be full such that the bladder is expanded to substantially fill the waste collection volume W. As cleaning liquid is dispensed from the robot 10, the volume of the bladder decreases such that waste entering the waste collection volume W replaces the displaced cleaning fluid that has exited the flexible bladder. Toward the end of the cleaning routine, the flexible bladder is substantially collapsed within the waste collection volume W and the waste collection volume is substantially full of waste.

In some implementations, the maximum volume of the flexible bladder (e.g., the maximum storage volume of cleaning liquid) is substantially equal to the volume of the waste collection volume W. In certain implementations, the volume of the waste collection volume W is larger (e.g., about 10 percent to about 20 percent larger) than the maximum volume of the flexible bladder. Such a larger waste collection volume W can allow the robot 10 to operate in an environment in which the volume of the waste collected is larger than the volume of the cleaning liquid dispensed (e.g., when the robot 10 maneuvers over substantial spills).

While the supply volume S has been described as a flexible bladder substantially surrounded by the waste collection volume W, other configurations are possible. For example, the supply volume S and the waste collection volume W can be compartments that are stacked or partially stacked on top of one another with their compartment-full center of gravity within 10 cm of one another. Additionally or alternatively, the supply volume S and the waste collection volume W can be concentric (concentric such that one is inside the other in the lateral direction); or can be interleaved (e.g., interleaved L shapes or fingers in the lateral direction).

Liquid Applicator

Referring to FIG. 8, a liquid applicator module 1400 applies a volume of cleaning liquid onto the surface across the width of the wetting element 204 which, in some implementations, extends substantially the entire width (e.g., diameter) of the robot 10. The liquid applicator module can spray the floor directly, spray a fluid-bearing brush or roller, or apply fluid by dripping or capillary action to the floor, brush, roller, or pad. The liquid applicator module 1400 receives a supply of cleaning liquid from a supply volume S within the liquid volume 600 carried by the chassis 100. A pump 240 (e.g., a peristaltic pump) pumps the cleaning fluid through the liquid applicator module through one or more injection orifices 210 defined by the trough 202 extending along the front portion of baseplate 200 (see, e.g., FIG. 2). Each injection orifice 210 is oriented to spray cleaning liquid toward the cleaning surface. For example, at least a portion of the injection orifices 210 can be oriented to spray cleaning liquid toward the cleaning surface, in a direction substantially toward the forward direction of travel of the robot 10. Additionally or alternatively, at least a portion of the injection orifices 210 can be oriented to spray cleaning liquid toward the cleaning surface, in a direction substantially toward the rearward direction of travel of the robot 10.

The liquid applicator module 1400 includes a supply volume S which, as described in detail below, is a compartment within liquid volume 600. However, in some implementations, supply volume S is a separate volume carried by the chassis 100. Supply volume S defines an exit aperture 604 in fluid communication with a fluid conduit 70. During use, fluid conduit 606 delivers a supply of cleaning liquid to a pump assembly 240 (e.g., a peristaltic pump assembly). Pressure created by pump assembly 240 forces liquid to trough 202 and through injection orifices 210 toward the surface.

The liquid applicator module 1400 applies cleaning liquid to the surface at a volumetric rate ranging from about 0.1 mL per square foot to about 6.0 mL per square foot (e.g., about 3 mL per square foot). However, depending upon the application, the liquid applicator module 1400 can apply any desired volume of cleaning liquid onto the surface. Additionally or alternatively, the liquid applicator module 1400 can be used to apply other liquids onto the surface such as water, disinfectant, chemical coatings, and the like.

The liquid applicator module 1400 can be a closed system (e.g., when pump 240 is a peristaltic pump) such that the liquid applicator module 1400 can be used to deliver a wide variety of cleaning solutions, including solutions without damaging other components (e.g., seals) of the robot 10.

A user can fill the supply container S with a measured volume of clean water and a corresponding measured volume of a cleaning agent. The water and cleaning agent can be poured into the supply volume S through fill port 602 accessible through fill door 304 in bumper 300. The fill port 602 can include a funnel to allow for easier pouring of the cleaning liquid into the supply volume S. In some implementations, a filter is disposed between fill port 602 and the supply volume S to inhibit foreign material from entering the supply volume S and potentially damaging the liquid applicator module 1400. The supply volume S has a liquid volume capacity of about 500 mL to about 2000 mL.

Figure 2:
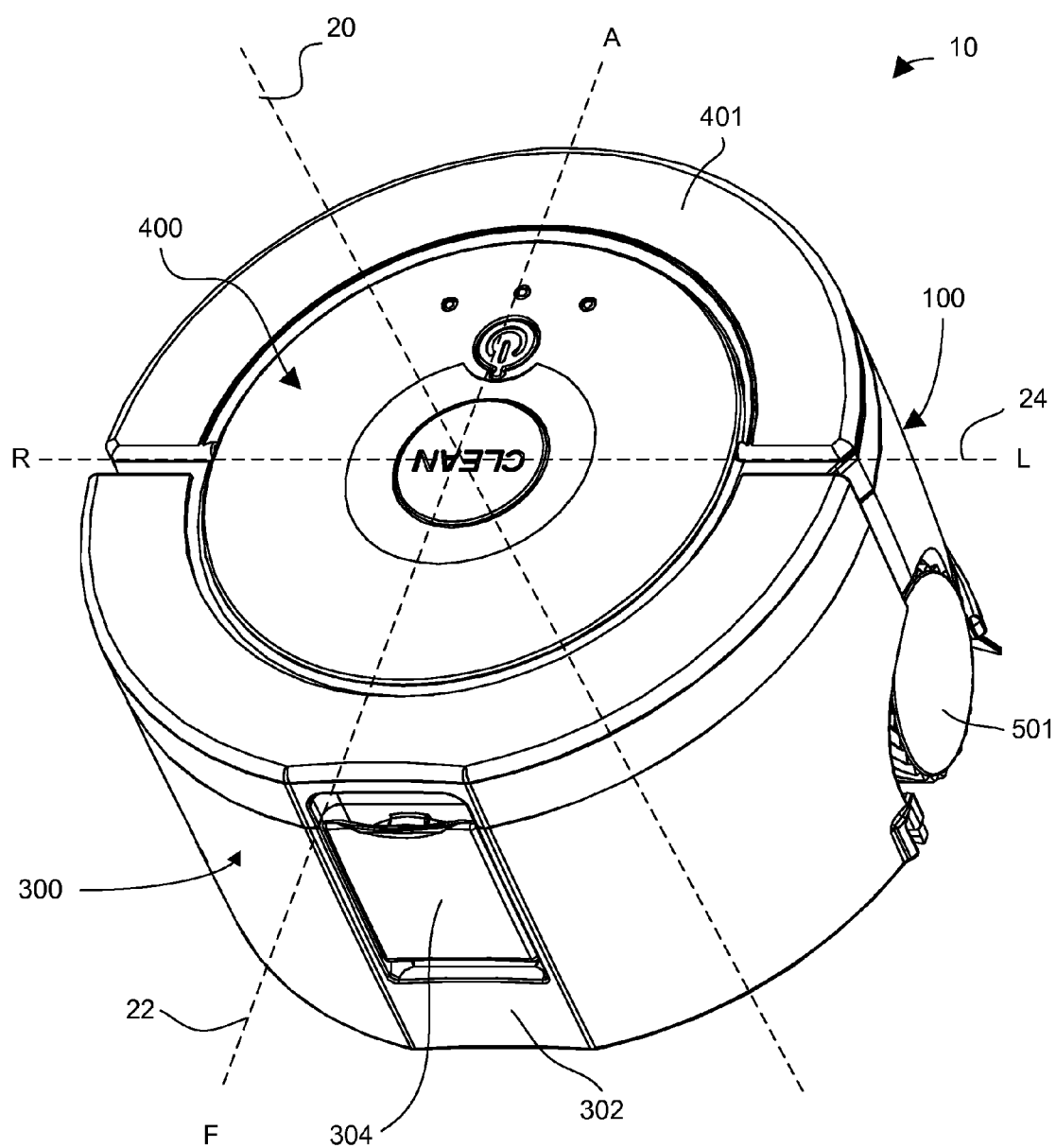
FIG. 2 is a perspective view of an autonomous cleaning robot.
Figure 9:
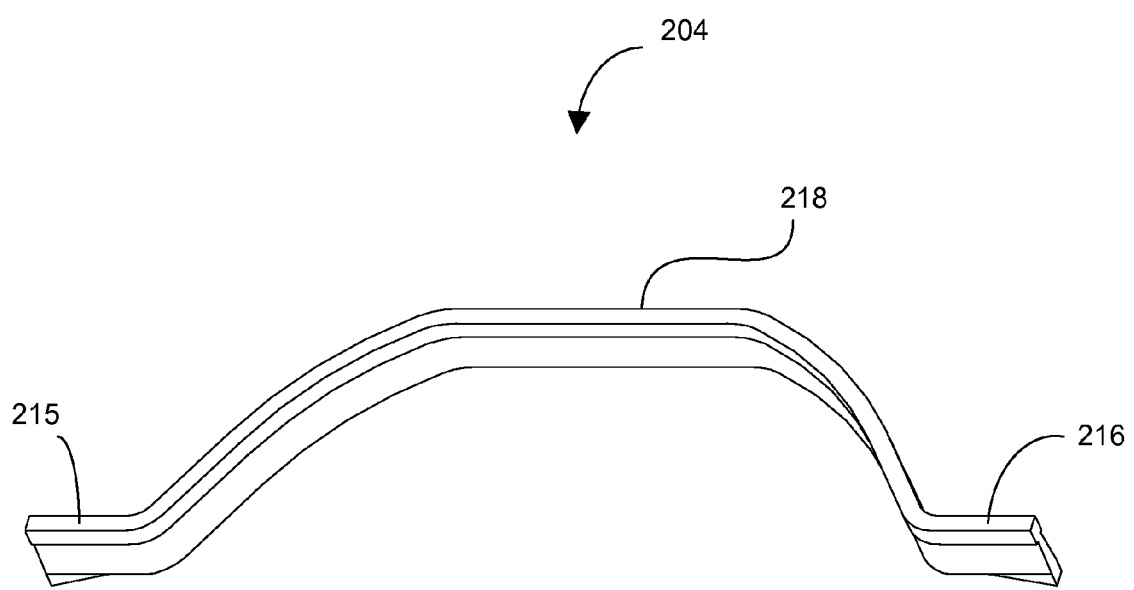
FIG. 9 is a perspective view of a wetting element of the autonomous cleaning robot of FIG. 1.

Referring to FIGS. 2 and 9, the wetting element 204 can slidably contact the surface such that the movement of the robot 10 across the surface causes the wetting element 204 to spread the cleaning liquid across the surface. Wetting element 204 is arranged substantially parallel to trough 202 and extends past each end of the trough 202 to allow, for example, for suitable smearing near the edges of the trough 202. Ends 215, 216 of wetting element 204 extend substantially in front of respective wheels 504, 505. By smearing cleaning liquid directly in front of wheels 504, 505, wetting element 204 can improve the traction between the wheels 504, 505 and the surface.

Wetting element 204 is a flexible compliant blade including a first edge configured for slidable contact with the surface and a second edge configured for coupling to the chassis 100. The wetting element 204 has a substantially arcuate shape that extends substantially parallel to the forward perimeter of the robot 10. As the wetting element 204 makes slidable contact with the floor during operation of the robot 10, the substantially arcuate can facilitate movement of the robot 10 across the surface. For example, as compared to a substantially straight wetting element, the substantially arcuate shape of wetting element 204 can gradually engage a grout line (e.g., of a tiled floor) such the robot 10 can adjust to the force required to traverse the grout line. Additionally or alternatively, the substantially arcuate shape of the wetting element 204 can allow for more efficient packaging of components within chassis 100. For example, because at least a portion of the wetting element 204 extends into the chassis, the substantially arcuate shape of the wetting element 204 can allow one or more components (e.g., a printed circuit board (PCB) to be positioned within the boundary defined by the wetting element.

Wetting element 204 includes a linear region 218 substantially centered along the wetting element 204. The linear region 218 follows a complementary linear region of baseplate 200 can function as a pivoting leading edge for mounting baseplate 200 on pivot hinges or the like. In some implementations, wetting element 204 can be mounted and dismounted from baseplate 200 separately (e.g., through the use of pivot hinges mounted on the wetting element 204).

Figure 10:
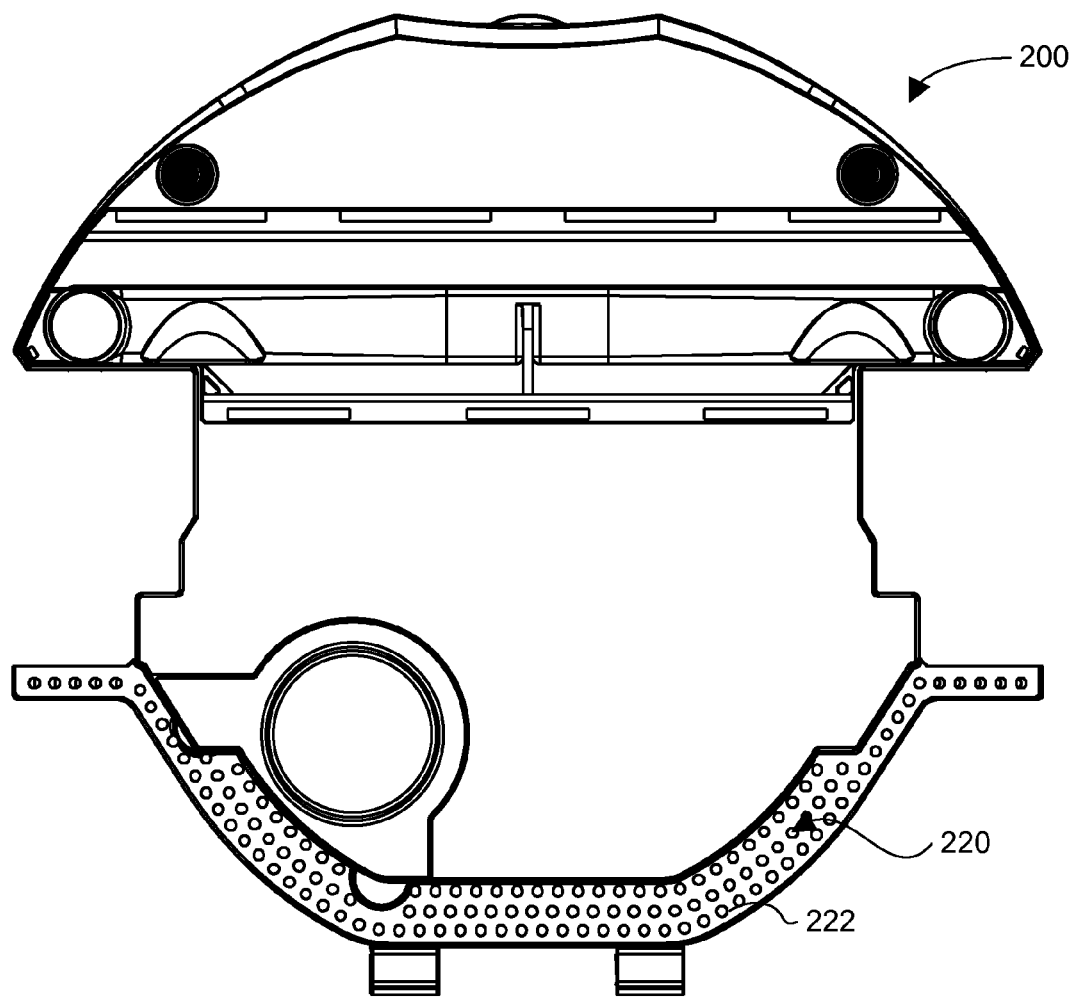
FIG. 10 is a top view of a wetting element of an autonomous cleaning robot.

Referring to FIG. 10, in some implementations, baseplate 200 includes a scrubbing brush 220 extending substantially along a front portion of the baseplate 200. The scrubbing brush 220 includes a plurality of bristle clusters 222 extending from the scrubbing brush 220 toward the cleaning surface. The bristle clusters 222 are spaced (e.g., substantially evenly spaced) along the scrubbing brush 220. Bristle clusters 222 can each include a plurality of soft compliant bristles with a first end of each bristle secured in a holder such as a crimped metal channel, or other suitable holding element. In some implementations, bristle clusters 222 are individual plugs press fit into the scrubbing brush 220. A second end of each bristle is free to bend as each bristle makes contact with the cleaning surface. These multiple points of contact between the scrubbing brush 220 and the surface can allow the robot 10 to traverse smoothly over perturbations in the surface (e.g., grout lines).

The length and diameter of the bristles of bristle clusters 222, as well as a nominal interference dimension that the smearing bristles make with respect to the cleaning surface can be varied to adjust bristle stiffness and to thereby affect the smearing action. In certain implementations, the scrubbing brush 220 includes nylon bristles within an average bristle diameter in the range of about 0.05-0.2 mm (0.002-0.008 inches). The nominal length of each bristle is approximately 16 mm (0.62 inches) between the holder and the cleaning surface and the bristles are configured with an interference dimension of approximately 0.75 mm (0.03 inches).

While bristles have been described, other implementations are additionally or alternatively possible. For example, the scrubbing brush 220 can include a woven or nonwoven material, e.g., a scrubbing pad or sheet material configured to contact the surface.

Cleaning liquid can be introduced to the scrubbing brush 220 in any of various different ways. For example, cleaning liquid can be injected or dripped on the surface immediately forward of the scrubbing brush. Additionally or alternatively, cleaning liquid can be introduced through bristle clusters 222 such that the bristle clusters 222 substantially wick the cleaning liquid toward the surface.

Additionally or alternatively, the baseplate 200 can carry other elements configured to spread the cleaning liquid on the surface. For example, the baseplate 200 can carry a sponge or a rolling member in contact with the surface.

In some implementations, the baseplate 200 carries one or more active scrubbing elements that are movable with respect to the cleaning surface and with respect to the robot chassis. Movement of the active scrubbing elements can increase the work done between the scrubbing element and the cleaning surface. Each active scrubbing element can be driven for movement with respect to the chassis 100 by a drive module, also attached to the chassis 100. Active scrubbing element can also include a scrubbing pad or sheet material held in contact with the cleaning surface, or a compliant solid element such a sponge or other compliant porous solid foam element held in contact with the surface and vibrated by a vibrated backing element. Additionally or alternatively, active scrubbing elements can include a plurality of scrubbing bristles, and/or any movably supported conventional scrubbing brush, sponge, or scrubbing pad used for scrubbing. In certain implementations, an ultrasound emitter is used to generate scrubbing action. The relative motion between active scrubbing elements and the chassis can include linear and/or rotary motion and the active scrubbing elements can be configured to be replaceable or cleanable by a user.

Figure 11:
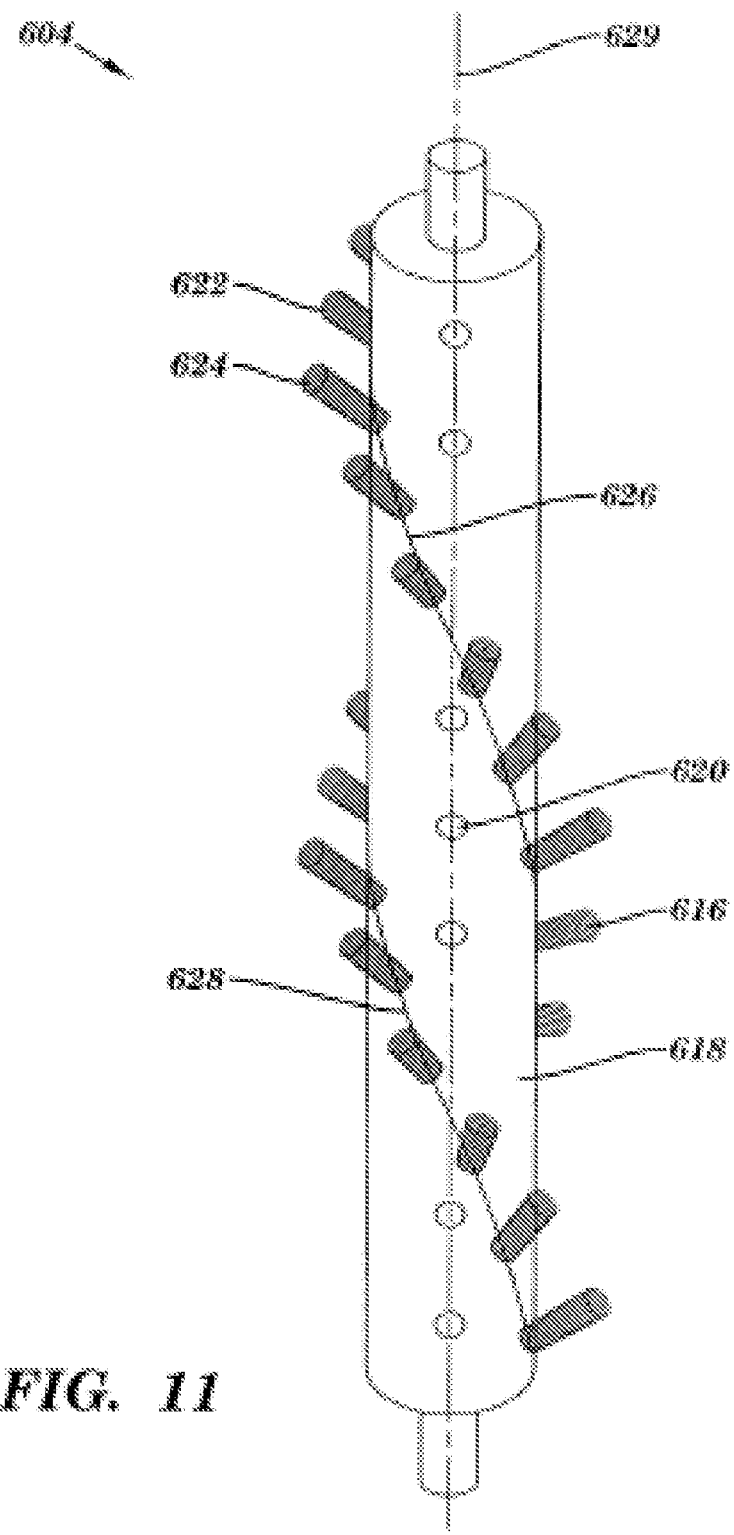
FIG. 11 is a perspective view of an active brush element.

Referring to FIG. 11, in some implementations, an active scrubbing element includes a rotatable brush assembly 604 disposed across the cleaning width, rearward of injection orifices 210, for actively scrubbing the surface after the cleaning fluid has been applied thereon. The rotatable brush assembly 604 includes a cylindrical bristle holder element 618 defining a longitudinal axis 629. The bristle holder element 618 supports scrubbing bristles 616 extending radially outward therefrom. The rotatable brush assembly 604 can be supported on chassis 100 for rotation about a rotation axis that extends substantially parallel with the cleaning width. The scrubbing bristles 616 are long enough to interfere with the cleaning surface during rotation such that the scrubbing bristles 616 are bent by the contact with the cleaning surface.

Additional bristles can be introduced into receiving holes 620. The spacing between adjacent bristle clusters (e.g., bristle clusters 622, 624) can be reduced to increase scrubbing intensity.

Scrubbing bristles 616 can be installed in the brush assembly in groups or clumps with each clump including a plurality of bristles held by a single attaching device or holder. Clump locations can be disposed along a longitudinal length of the bristle holder element 618 in one or more patterns 626, 628. The one or more patterns 626, 628 place at least one bristle clump in contact with cleaning surface across the cleaning width during each revolution of the rotatable brush element 604. The rotation of the brush element 604 is clockwise as viewed from the right side such that relative motion between the scrubbing bristles 616 and the cleaning surface tends to move loose contaminants and waste liquid toward the rearward direction. Additionally or alternatively, the friction force generated by clockwise rotation of the brush element 604 can drive the robot in the forward direction thereby adding to the forward driving force of the robot transport drive system. The nominal dimension of each scrubbing bristles 616 extended from the cylindrical holder 618 can cause the bristle to interfere with the cleaning surface and there for bend as it makes contact with the surface. The interference dimension is the length of bristle that is in excess of the length required to make contact with the cleaning surface. Each of these dimensions along with the nominal diameter of the scrubbing bristles 616 may be varied to affect bristle stiffness and therefore the resulting scrubbing action. For example, scrubbing brush element 604 can include nylon bristles having a bend dimension of approximately 16-40 mm (0.62-1.6 inches), a bristle diameter of approximately 0.15 mm (0.006 inches), and an interference dimension of approximately 0.75 mm (0.03 inches) to provide scrubbing performance suitable for many household scrubbing applications.

Figure 12:
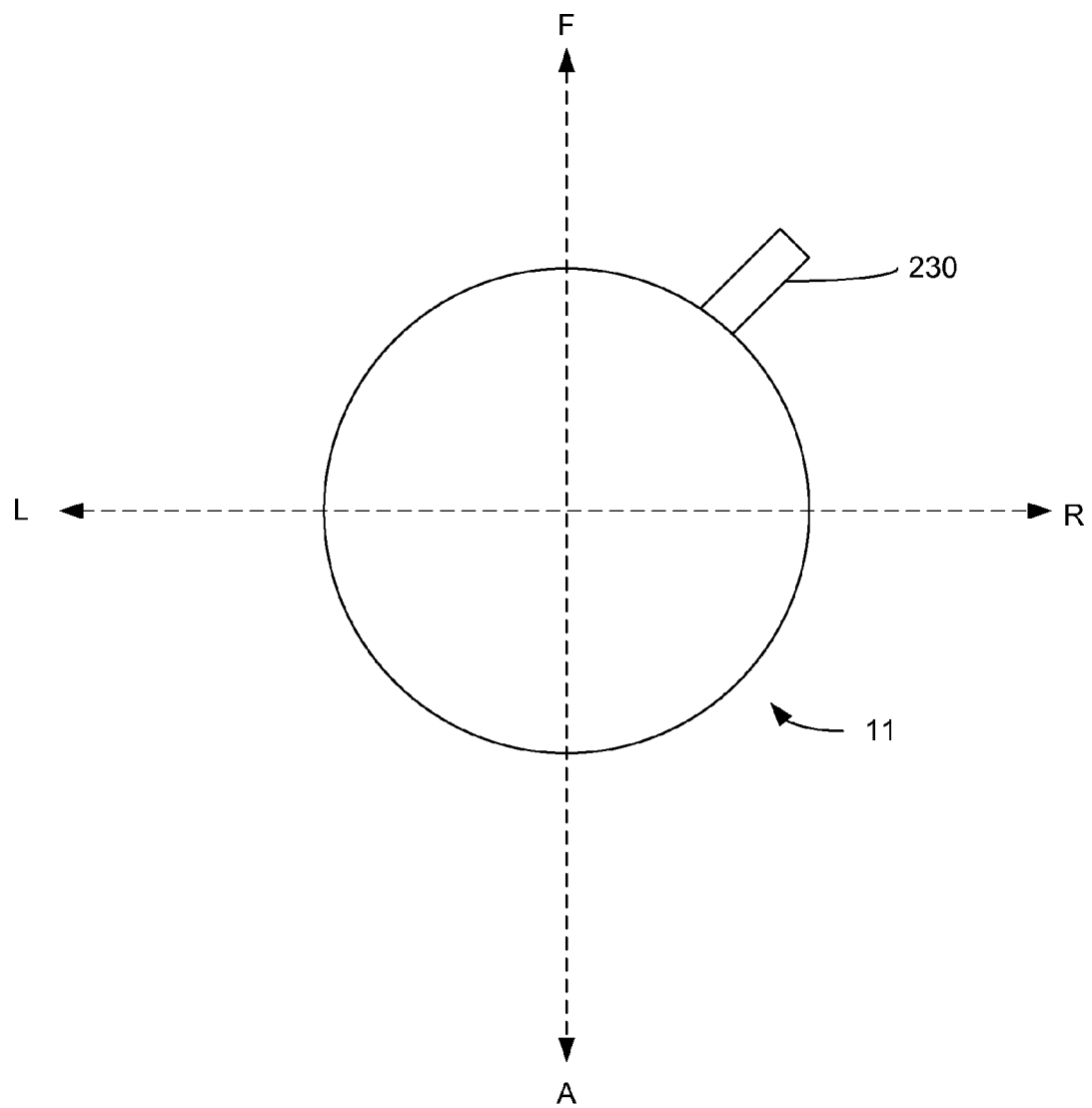
FIG. 12 is a top view of an autonomous cleaning robot.

Referring to FIG. 12, in some implementations, an autonomous cleaning robot 11 includes an extension element 230 carried by the robot 11 along a substantially forward portion of the robot 11. The extension element 230 extends beyond the substantially circular cross-section of the robot 11. In use, the extension element 230 contacts the surface and is oriented to push debris back toward the robot such that the debris can be collected by other components (e.g., wet vacuuming components) carried by the robot 11. The extension element 230 can reach into areas (e.g., corners) that are otherwise substantially inaccessible to autonomous cleaning robots with circular cross-sections. A spring (not shown) can support the extension element 230 on the robot 11 such that the spring detents the extension element 230 to an original orientation relative to the robot 11. In some implementations, the extension element 230 includes a flexible compliant blade.

While the extension element has been described as being carried by the robot along a substantially forward portion of the robot, other implementations are possible. For example, an extension element can be carried by the robot along a substantially rearward portion of the robot. In such a configuration, the extension element can be in fluid communication with the vacuum module (e.g., with the squeegee) such that debris is suctioned toward the chassis when the extension element encounters debris on the surface. The extension element mounted along a substantially rearward portion to the robot can be spring mounted to allow flexure in response to contact with an obstacle and to return to an original position when it is disengaged from the obstacle.

Air Moving

Figure 13:
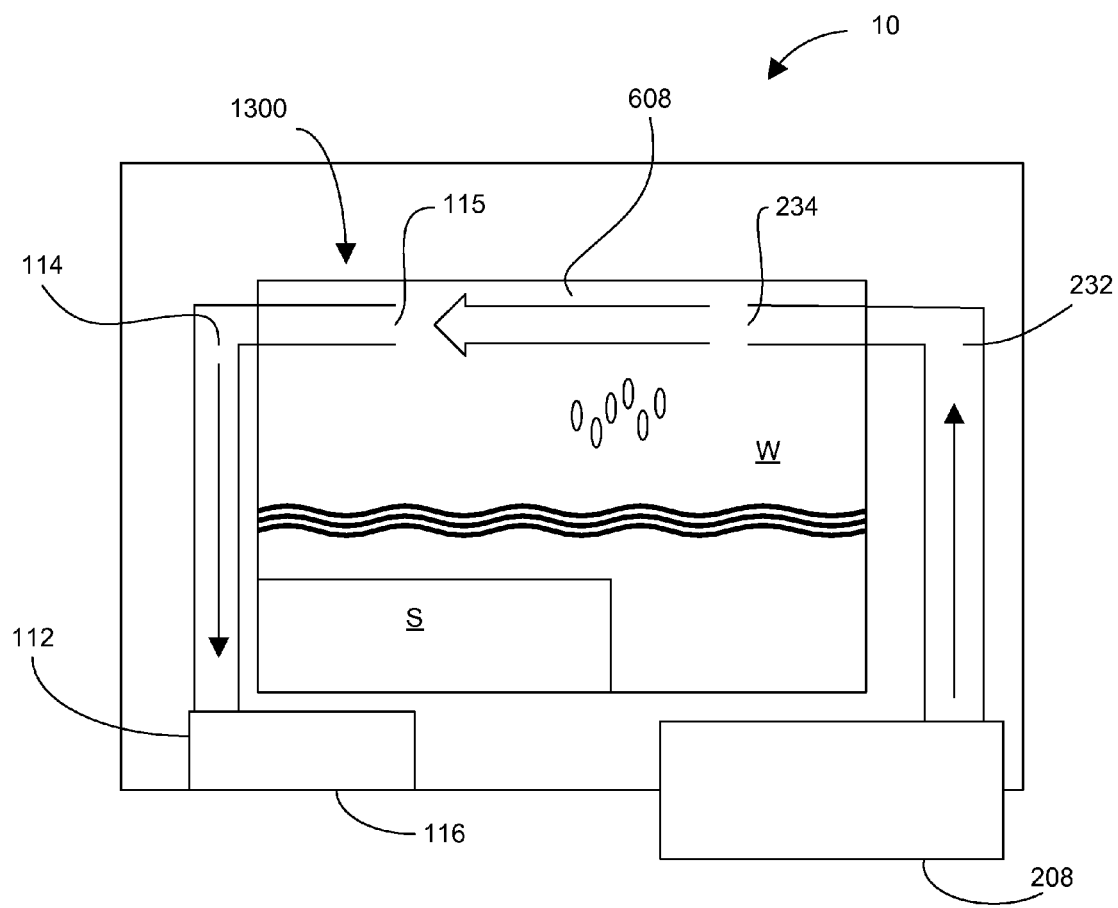
FIG. 13 is a schematic representation of a vacuum module of an autonomous cleaning robot.

Referring to FIG. 13, a vacuum module 1300 includes a fan 112 in fluid communication with the waste collection volume W and the squeegee 208 in contact with the surface. In use, the fan 112 creates a low pressure region along the fluid communication path including the waste collection volume W and the squeegee 208. As described in further detail below, the fan 112 creates a pressure differential across the squeegee 208, resulting in suction of waste from the surface and through the squeegee 208. The suction force created by the fan 112 can further suction the waste through one or more waste intake conduits 232 (e.g., conduits disposed on either end of the squeegee 208) toward a top portion of the waste collection volume W.

The top portion of the waste collection volume W defines a plenum 608 between exit apertures 234 of waste inlet conduits 232 and inlet aperture 115 of fan intake conduit 114. While the fan 112 is in operation, the flow of air and waste through plenum 608 generally moves from exit apertures 234 toward the inlet aperture 115. In some implementations, plenum 608 has a flow area greater than the combined flow area of the one or more waste intake conduits 232 such that, upon expanding in the top portion of the waste collection volume W, the velocity of the moving waste decreases. At this lower velocity, heavier portions of the moving waste (e.g. water and debris) will tend to fall into the waste collection volume W under the force of gravity while lighter portions (e.g., air) of the moving waste will continue to move toward one or more fan inlet conduits 114. The flow of air continues through the fan inlet conduit 114, through the fan 112, and exits the robot 10 through a fan exit aperture 116.

The vacuum module 1300 can include a passive anti-spill system and/or an active anti-spill system that substantially prevents waste from exiting waste collection volume W when the robot 10 is not in use (e.g., when a user lifts the robot 10 from the surface). By reducing the likelihood that waste will spill from the robot, such anti-spill systems can protect the user from coming into contact with the waste during handling. Additionally or alternatively, such anti-spill systems can reduce the likelihood that waste will contact the fan and potentially diminish the performance of the fan over time.

Passive anti-spill systems generally orient flow paths of the vacuum module 1300 such that spilling is unlikely under normal handling conditions. In passive anti-spill systems the fan 112 can be positioned at a distance from waste in the waste collection volume W to reduce the likelihood that waste from the waste collection volume W will reach the fan 112 during handling. For example, in a passive anti-spill system at least a portion of the fan inlet conduit 114 can be arranged at about 90 degrees relative to the direction of flow of the waste liquid into the plenum 608. Accordingly, passive anti-spill systems can include indirect (e.g., winding) flow paths along the vacuum module 1300. To minimize flow losses resulting from expanding and contracting cross-sections of these flow paths, passive anti-spill systems can include flow paths of substantially uniform cross-sectional area. Active anti-spill systems generally include one or more moving parts that move to seal at least a portion of the flow paths of the vacuum module 1300. As compared to passive anti-spill systems, active anti-spill systems can include shorter and straighter flow paths along the vacuum module 1300 (e.g., along the plenum 608). Additionally or alternatively, passive anti-spill systems and active anti-spill systems can include seals throughout the vacuum module 1300 to reduce the likelihood of spilling during normal handling. Examples of seals that can be used in anti-spill systems include epoxy, ultrasonic welding, plugs, gaskets, and polymeric membranes.

Figure 14:
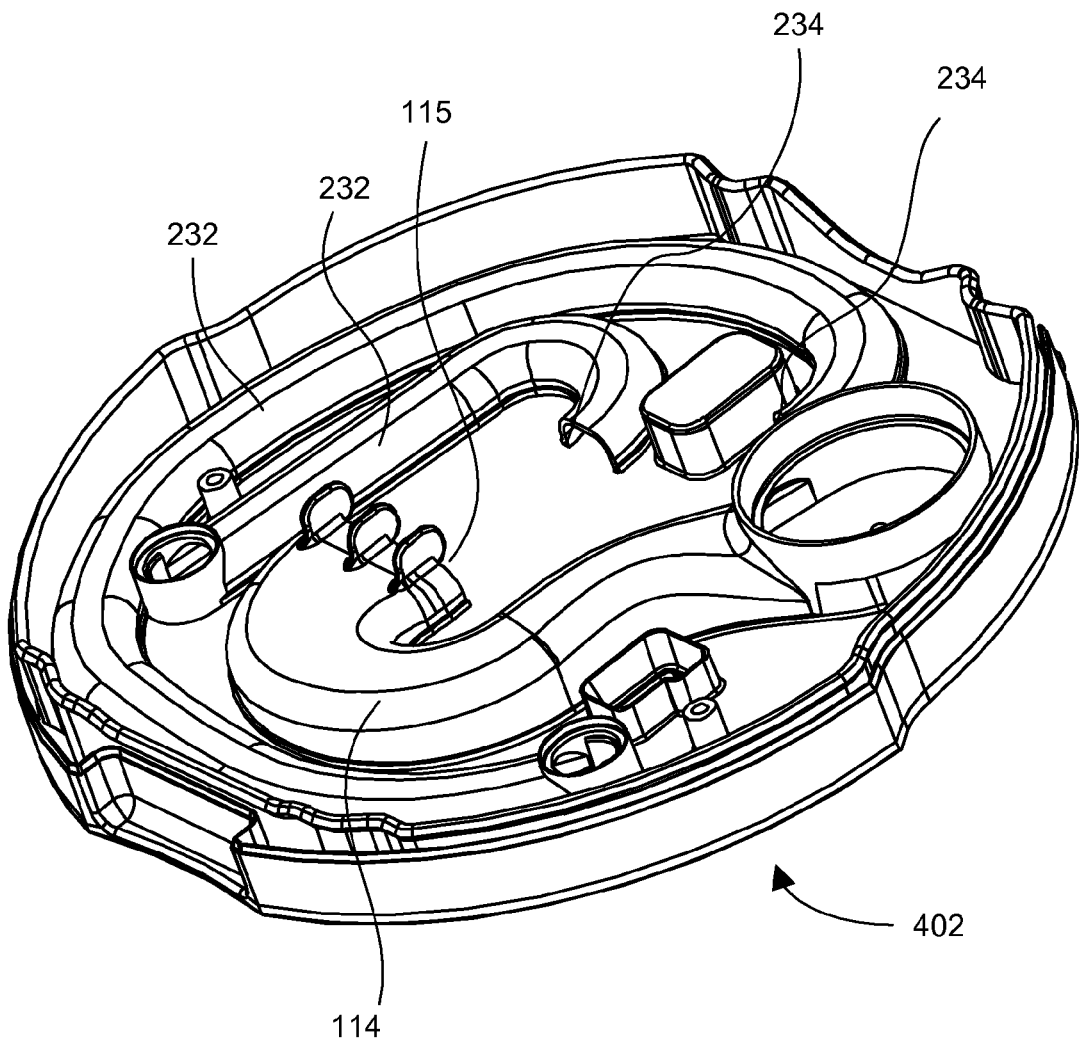
FIG. 14 is a perspective view of a portion of the vacuum module of an autonomous cleaning robot.

Referring to FIG. 14, the signal channeler 402 can be carried along a top portion of the liquid volume 600 such that a bottom portion of the signal channeler 402 defines a portion of the plenum 608 in a passive anti-spill system. As compared to a configuration with a separate signal channeler and plenum, this configuration can reduce the amount of volume required of internal components of the robot 10 and, thus, increase the volume available for liquid volume 600. In some implementations, the signal channeler 402 carries at least a portion of the one or more waste intake conduits 232 and at least a portion of the fan intake conduit 114. The fan 112 can be carried on the chassis 100, below liquid volume 600 such that the fan 112 is oriented substantially 90 degrees to the flow direction through the plenum 608. Such an orientation can reduce the likelihood of that waste will cross the plenum 608, enter the fan inlet conduit 114, and reach the fan 112.

In some implementations of a passive anti-spill system, the one or more waste intake conduits 232 and the fan intake conduit 114 can be oriented relative to one another such each exit aperture 234 of the one or more waste intake conduits 232 is substantially perpendicular to the fan inlet aperture 115. Such a perpendicular orientation can reduce the likelihood that waste will traverse the plenum 608 and reach the fan 112 at the end of the fan intake conduit 114.

Figure 15A:
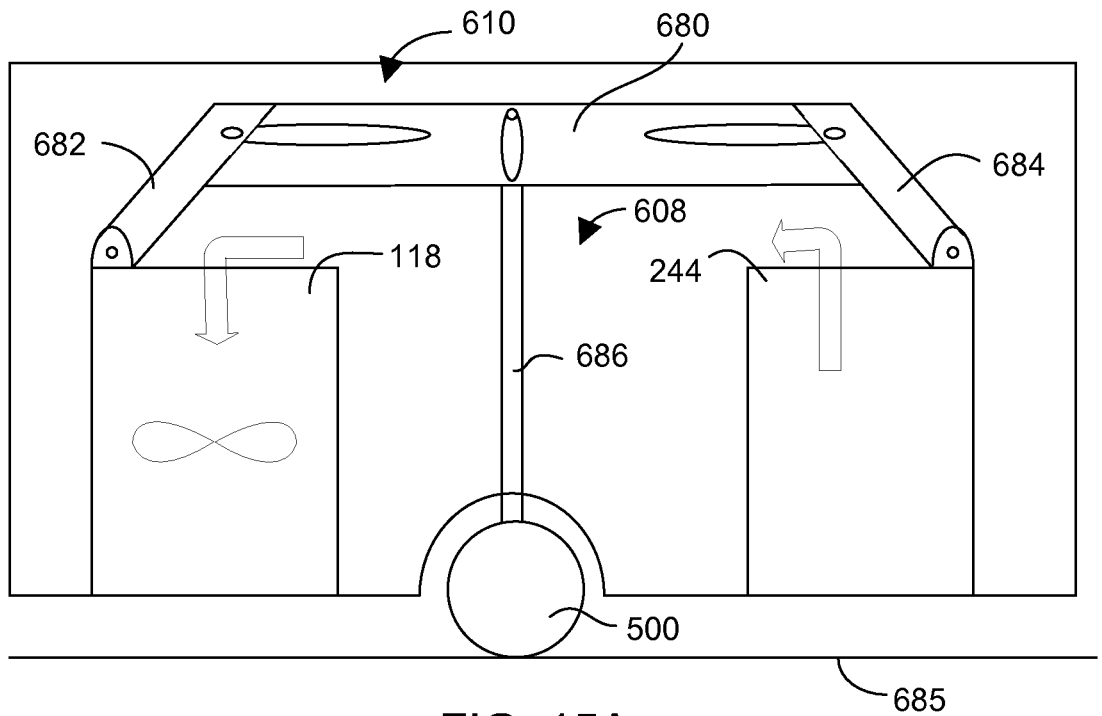
FIG. 15A-B is a schematic representation of an active sealing system of an autonomous cleaning robot.
Figure 15B:
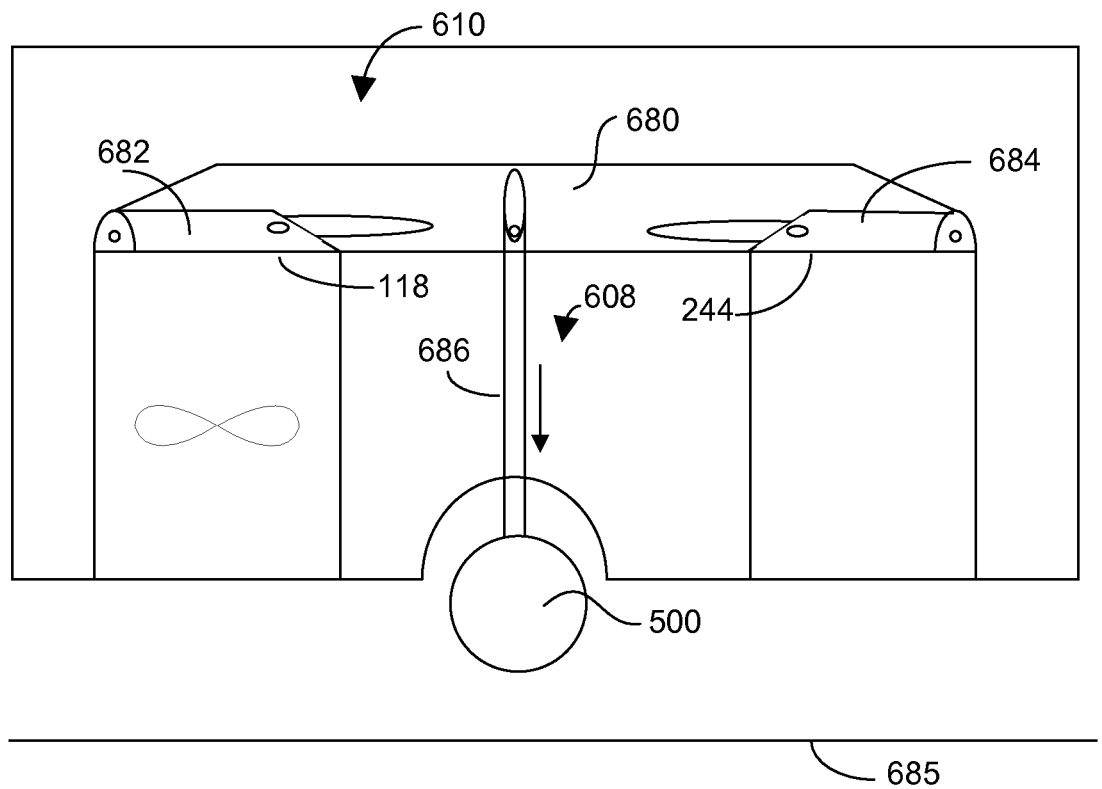

Referring to FIGS. 15A-B an active anti-spill system 610 can include a linkage 680 extending between a forward seal 682 and one or more rear seals 684. The forward seal 682 is configured to form a substantially water right seal over a fan intake conduit 118. The one or more rear seals 684 are configured to form a substantially water tight seal over one or more waste intake conduits 244. A coupler 686 extends between the wheel module 500 and the linkage 680 such that the coupler can transmit at least a portion of the vertical motion of the wheel module 500 to the linkage 680.

The wheel module 500 is part of a biased-to-drop suspension system such that placement of the wheel 500 on the surface 685 forces at least a portion of the wheel module 500 to move upward in a substantially vertical direction. As wheel module 500 moves upward in a substantially vertical direction, coupler 686 moves along with the wheel module 500 to push linkage 680 to an open position. In the open position, linkage 680 holds forward seal 682 and one or more rear seals 684 away from the respective fan intake conduit 118 and one or more waste intake conduits 244. With the linkage 680 in the open position, fan intake conduit 118 and the one or more waste intake conduits 244 are in fluid communication such that waste can be drawn through the one or more waste intake conduits 244 toward plenum 608, where waste can fall into the waste collection volume W (not shown in FIGS. 15A-B) and air can flow toward the fan intake conduit 118.

When the robot 10 is lifted from the surface, the wheel module 500 moves downward in a substantially vertical direction. As the wheel module 500 moves downward in a substantially vertical direction, coupler 686 moves along with the wheel module 500 to pull linkage 680 to a closed position. In the closed position, linkage 680 holds forward seal 682 and one or more rear seals 684 in position to cover (e.g., forming a substantially water tight seal) the respective fan intake conduit 118 and one or more waste linkage conduits 244. With the linkage 680 in the closed position, fan intake conduit 118 and the one or more waste intake conduits 244 are not in fluid communication and, thus, waste is less likely to enter the fan intake conduit 118 and reach the fan 112.

Coupler 686 has been described as extending between wheel module 500 and linkage 680. In some implementations, an analogous coupler extends between wheel module 501 and linkage 680 to move the linkage 680 and, thus, move seals 682, 684 between an open and a closed position.

While anti-spill system 610 has been described as including the coupler 686, the coupler 686 can be omitted in certain implementations. For example, the movement of the wheel module 500 can be detected by a switch (e.g., a contact switch) in electrical communication with an actuator configured to move the linkage 680 between the open position and the closed position. Additionally or alternatively, the movement of the wheel module 500 can be detected by a hydraulic switch (e.g., using waste liquid in the waste collection volume W as the hydraulic fluid).

Figure 16:
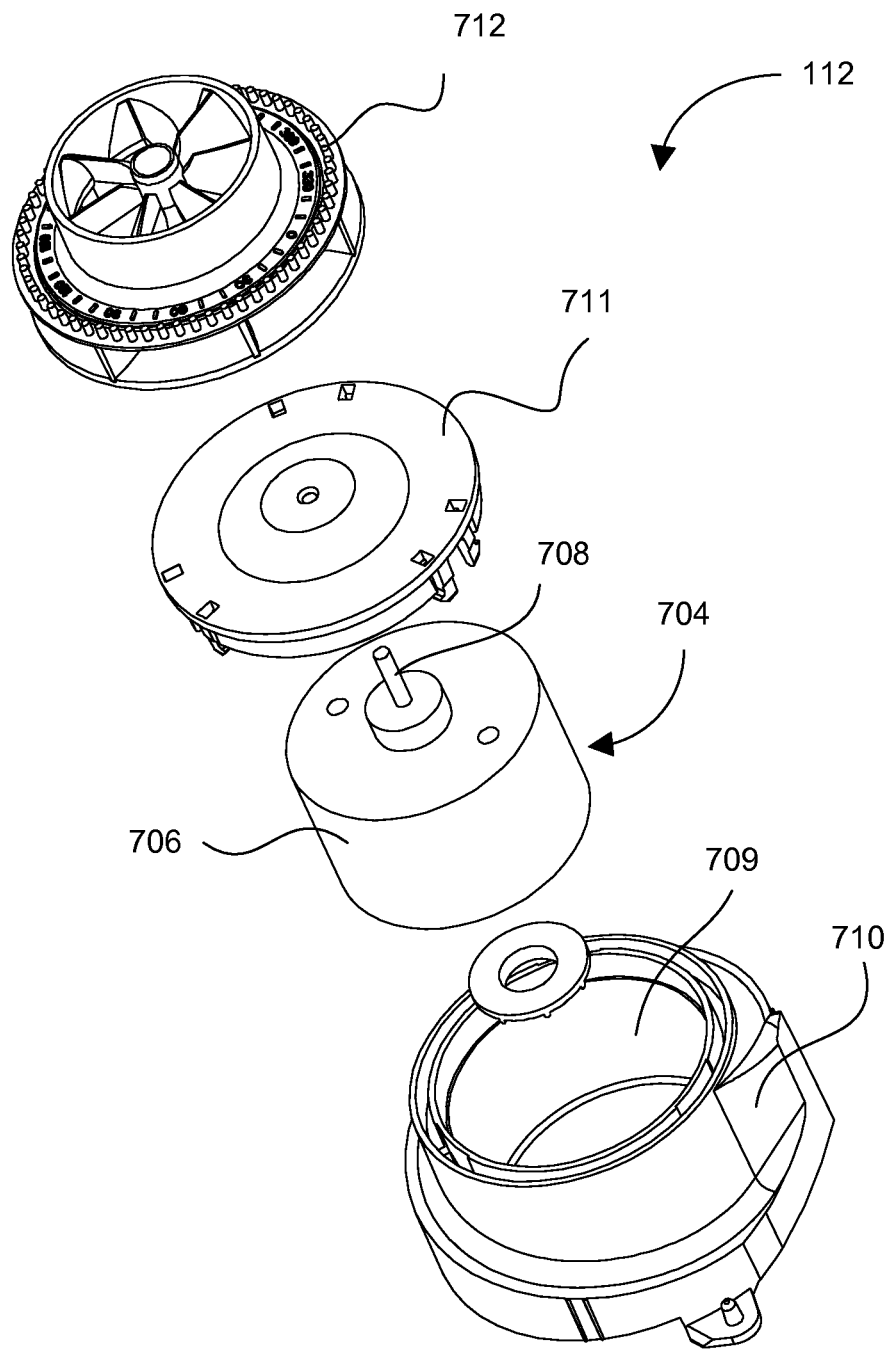
FIG. 16 is an exploded perspective view of a fan of an autonomous cleaning robot.
Figure 17:
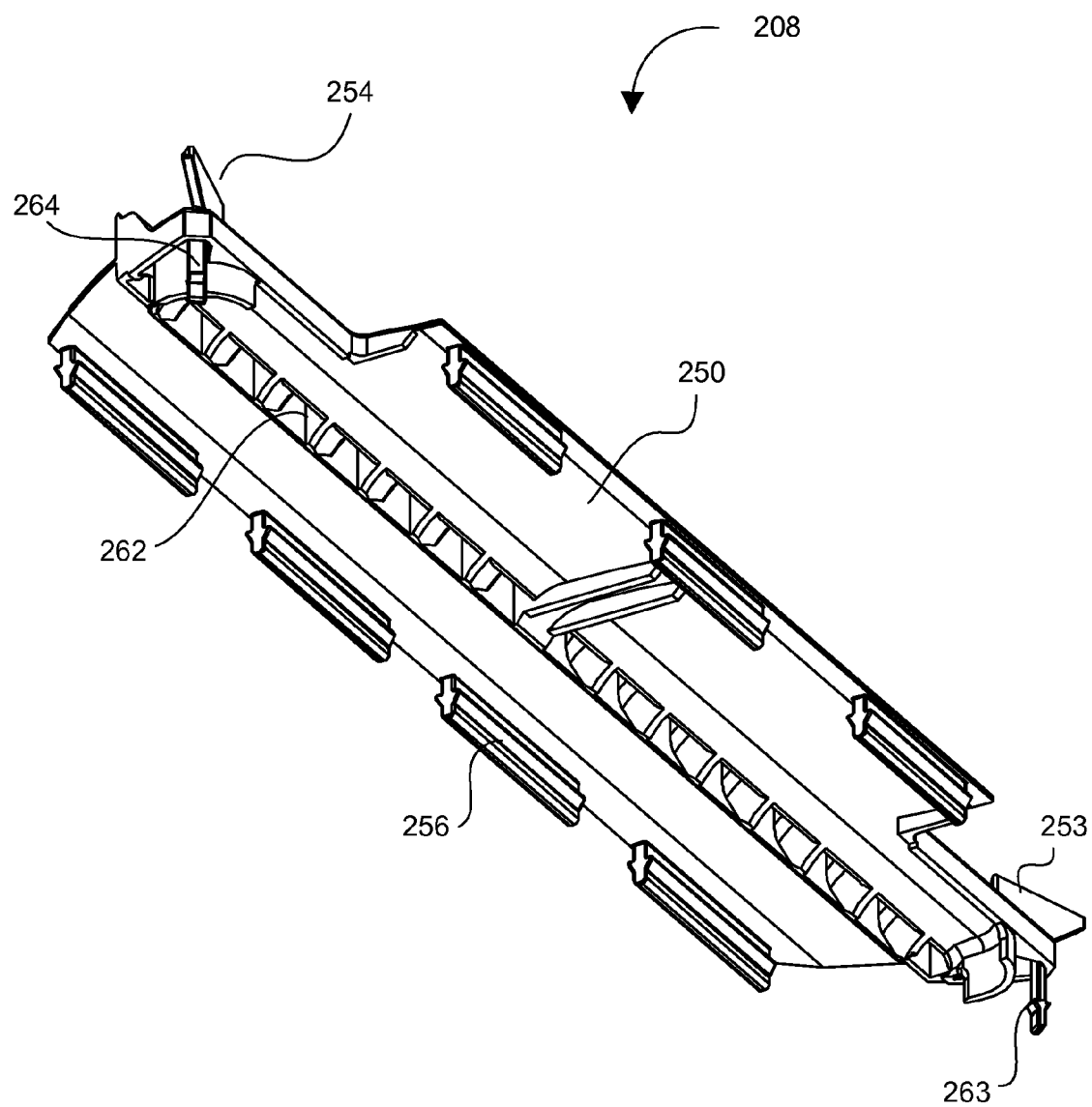
FIG. 17 is a perspective view of a squeegee of the autonomous cleaning robot of FIG. 1.
Figure 18:
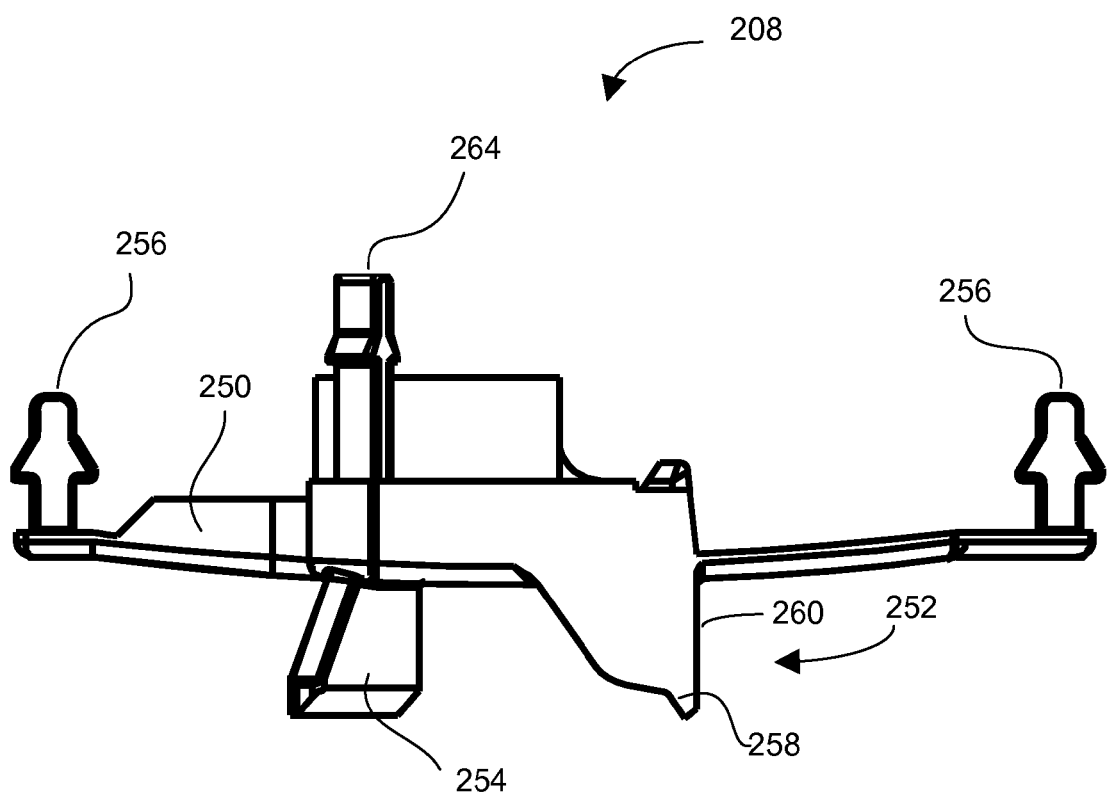
FIG. 18 is a side view of the squeegee of the autonomous cleaning robot of FIG. 1.
Figure 19:
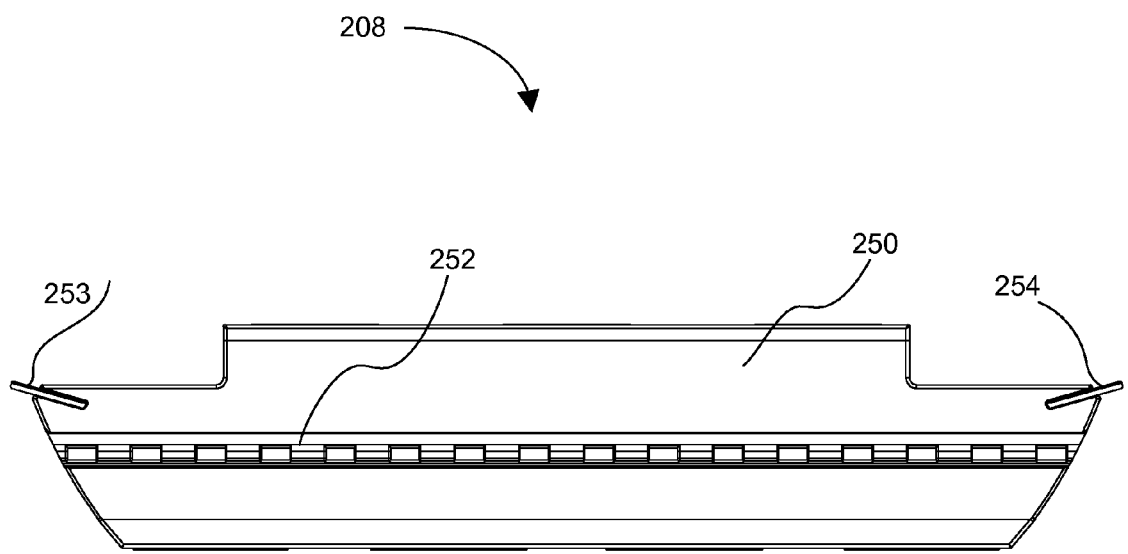
FIG. 19 is a bottom view of the squeegee of the autonomous cleaning robot of FIG. 1.

Referring to FIG. 16, the fan 112 includes a rotary fan motor 704, having a fixed housing 706 and a rotating shaft 708 extending therefrom. The fixed motor housing 706 is disposed in a center portion 709 of a fan scroll 710. A fan seal 711 is configured to engage the fan scroll 710 to substantially cover the fan motor 704 disposed substantially within the center portion 709 of the fan scroll 710. Together, the fan seal 711 and the fan scroll 710 form a protective housing that can protect the fan motor 704 from moisture and debris. The rotating shaft 708 of the fan motor 704 projects outward through the fan seal 711 to connect to the impeller 712. In use, the fan motor 704 rotates the rotating shaft 708 to turn the impeller 712 and, thus, move air.

The fan impeller 712 includes a plurality of blade elements arranged about a central rotation axis thereof and is configured to draw air axially inward along its rotation axis and expel the air radially outward when the impeller 718 is rotated. Rotation of the impeller 712 creates a negative air pressure zone (e.g., a vacuum) on its input side and a positive air pressure zone at its output side. The fan motor 704 is configured to rotate the impeller 712 at a substantially constant rate of rotational velocity, e.g., 14,000 RPM, which generates a higher air flow rate than conventional fans for vacuum cleaners or wet vacuums. Rates as low as about 1,000 RPM and as high as about 25,000 RPM are contemplated, depending on the configuration of the fan.

Scroll 710 can fold back in on itself to allow a 30 percent larger impeller, without any loss in scroll volume while maintaining the same package size. The inducer is the portion of the fan blade dedicated to inlet flow only. A "moat" (i.e., a channel or wall) can be positioned in front of the impeller to reduce the likelihood of water entering the impeller. The impeller used for air handling moves air through the system at considerable velocity, which can lead to water being pulled out of the dirty tank, through the impeller, and back to the floor. The moat is configured to prevent or limit this occurrence.

The air flow rate of the fan may range from about 60-100 CFM in free air and about 60 CFM in the robot. In some implementations, the vacuum module 1300 includes both a wet vacuum subsystem and a dry vacuum subsystem and the air flow rate of the fan can split (e.g., manually adjusted) between the wet and dry vacuum subsystems. Additionally or alternatively, a multi-stage fan design can produce a similar air flow rate, but higher static pressure and velocity, which can help to maintain flow. Higher velocity also enables the device to entrain dry particles and lift and pull fluids (e.g., debris mixed with cleaning liquid).

Figure 3:
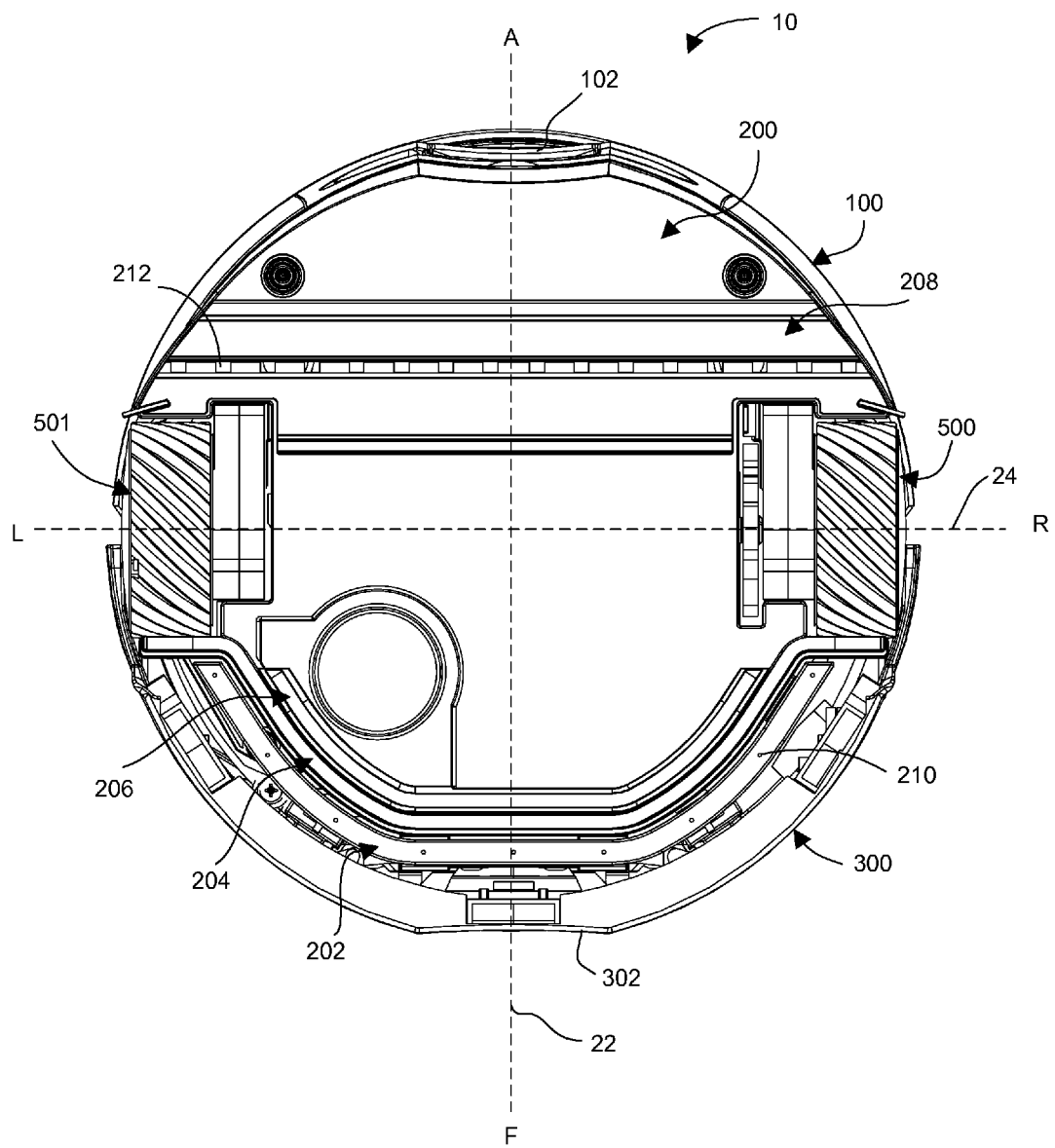
FIG. 3 is a bottom view of the autonomous cleaning robot of FIG. 1.

Referring to FIGS. 3 and 13, the exhaust from the fan 112 moves through a pump exit conduit 242 and exits the baseplate 200 through a fan exhaust port 116 substantially rearward of the wetting element and substantially forward of the transverse axis 24. Such positioning of the fan exhaust port 116 can, for example, allow the exhaust air flow to agitate the cleaning liquid deposited on the surface prior to collection by squeegee 208. In some implementations, exhaust from the fan exhaust port 116 is directed substantially toward the wheel modules 500, 501 to improve traction of the robot 10 over the surface.

Referring again to FIG. 3, the squeegee 208 is configured in slidable contact with the surface while the robot 10 is in motion. The positioning of the squeegee 208 substantially rearward of the wheels 504, 505 can stabilize the motion of the robot 10. For example, during sudden acceleration of the robot 10, the squeegee 208 can prevent the robot from substantially rotating about the transverse axis 24. By providing such stabilization, the squeegee 208 can prevent the wetting element 204 carried on a forward portion of the robot 10 from substantially lifting from the surface. When the overall weight of the robot 10 is less than 3.6 kg, for example, such positioning of the squeegee 208 can be particularly useful for providing stabilization. For such lightweight robots, the center of gravity of the robot 10 can be positioned substantially over the transverse axis 24 of the robot such that substantial weight is placed over the wheels 504, 505 for traction while the squeegee 208 provides stabilization for the forward direction of travel and the wetting element 204 provides stabilization for the reverse direction of travel.

Referring to FIGS. 3, 17-19, the squeegee 208 includes a base 250 extending substantially the entire width of the baseplate 200. A substantially horizontal lower section 252 extends downwardly from the base 250 toward the surface. Edge guides 253, 254 are disposed near each transverse end of the base 250 and extend downwardly from the base 250. A plurality of fastener elements 256 extend upwardly from the base 250 and are configured to fit (e.g., interference fit) within corresponding apertures on baseplate 200 to hold the squeegee 208 securely in place as the robot 10 moves about the surface.

The horizontal lower section 252 includes a scraper section 258 extending substantially downwardly from an intake section 260. The scraper section 258 defines a substantially rearward edge of the horizontal lower section 252. During use, the scraper section 258 forms a slidable contact edge between the squeegee 208 and the surface. The scraper section 258 is substantially thin and formed of a substantially compliant material to allow the scraper section 258 to flex during slidable contact with the surface. In some implementations, the scraper section 258 is angled slightly forward to improve collection of waste from the surface. In certain implementations, the scraper section 258 is angled slightly rearward to reduce the frictional force required to propel the robot 10 in the forward direction.

The intake section 260 defines a plurality of suction ports 262 substantially evenly spaced in the direction of the transverse axis 24 to allow, for example, substantially uniform suction in the direction of the transverse axis 24 as the robot 10 performs cleaning operations. The suction ports 262 each extend through the squeegee 208 (e.g., from a lower portion of the horizontal lower section 252 to a top portion of the base 250). The suction ports 262 extend through the base such that a lower portion of each suction port 262 is substantially near the forward edge of the scraper section 258. When negative air pressure is generated by fan 112, waste is suctioned from the forward edge of the scraper section 258, through the section ports 262, and toward the waste collection volume W (e.g., as described above).

Edge guides 253, 254 are arranged on respective ends of squeegee 208 and extend downwardly from the base 250 to contact the surface during a cleaning operation. The edge guides 253, 254 can be configured to push waste toward the fore-aft axis 22 of the robot 10. By guiding waste toward a center portion of the squeegee 208, the edge guides 253, 254 can improve the efficiency of waste collection at the transverse edges of the robot 10. For example, as compared to robots without edge guides 253, 254, the edge guides 253, 254 can reduce streaks left behind by the robot 10.

Edge guides 253, 254 include respective fasteners 263, 264 extending upward from the edge guides 253, 254 and through the base 250. The edge guide fasteners 263, 264 extend further from the base than fastener elements 256 and, in some implementations, fasten into the baseplate 200 to reduce the likelihood that the squeegee 250 will become detached from the robot 10 during a cleaning operation. In some implementations, fasteners 263, 264 are pressed into the baseplate 200 and held in place through an interference fit. In certain implementations fasteners 263, 264 are screwed into the chassis 100. Additionally or alternatively, the edge guide fasteners 263 can be fastened to the chassis 100.

Fastener elements 256 extend upwardly from the base 250, along the forward and rearward portions of the base 250. Each fastener element 256 is substantially elongate along the transverse axis 24 and includes a stem portion 265 and a head portion 266. The squeegee 208 is secured to the baseplate 200 by pushing fastener elements 256 into corresponding apertures on the baseplate 200. As the fastener elements 256 are pushed into apertures on the baseplate 200, the head portions 266 deform to pass through the apertures. Upon passing through the apertures, each head portion 266 expands to its substantially original shape and the head portion 266 substantially resists passing through the aperture in the opposite direction. Accordingly, fastener elements 256 substantially secure the squeegee 208 to the baseplate.

While the squeegee 208 has been described as being fixed relative to the baseplate 200, other implementations are possible. In some implementations, the squeegee can pivot relative to the baseplate 200. For example, the squeegee can pivot about the central vertical axis 20 when a lower edge of the squeegee encounters a bump or discontinuity in the cleaning surface. When the lower edge of the squeegee is free of the bump or discontinuity, the squeegee can return to its normal operating position.

In some implementations, the squeegee is a split squeegee. For example, the squeegee can include a forward portion and a rearward portion as two separate pieces that can be separately removed from the baseplate for repair and replacement.

In certain implementations, the squeegee is split into a left portion and a right portion. As the robot spins in place or turns, the squeegee can assume a configuration in which one side is bent backward and one side is bent forward. For non-split squeegees, the point at which the bend switches from backward to forward can act as a more or less solid column under the robot, tending to high center it and interfere with mobility. By providing a split in the center of the squeegee, this tendency can be mitigated or eliminated, increasing mobility.

Transport Drive System

Referring again to FIGS. 2-7, the robot 10 is supported for transport over the surface by a transport system 1600. The transport system 1600 includes a pair of independent wheel modules 500, 501 respectively arranged on the right side and the left side of the chassis. The wetting element 204 and the squeegee 208 are in slidable contact with the surface and form part of the transport system 1600. In some implementations, the transport system 1600 can include a caster positioned substantially forward and/or substantially rearward of the wheel modules 500, 501. The wheel modules 500, 501 are substantially aligned along the transverse axis 24 of the robot 10. The wheel modules 500, 501 are independently driven and controlled by the controller 1000 to advance the robot 10 in any direction along the surface. The wheel modules 500,

501 each include a motor and each is coupled to a gear assembly. Outputs of the respective gear assemblies drive the respective wheel 504, 505.

The controller 1000 measures the voltage and current to each motor and calculates the derivative of the measured current to each motor. The controller 1000 uses the measured voltage, measured current, and the calculated derivative of the measured current to determine the speed of the motor. For example, the controller 1000 can use a mathematical model (e.g., a DC motor equation) to determine motor speed from the measured voltage, measured current, and the calculated derivative. In certain implementations, the same mathematical model can be used for each drive motor. The mathematical model can include one or more constants (e.g., mechanical constants) are calibrated for a given motor. The one or more constants can be calibrated using any of various different methods. For example, motors can be matched at the factory to have the same constant. As another example, the constants can be calibrated at the factory and stored onboard the robot 10 (e.g. on the controller 1000). As yet another example, constants can be calibrated for a number of motors of the same type and representative values of the constants (e.g., averages) can be used for each of the motors, provided that the variation in motor constants is within an acceptable range. As another example, the controller 1000 can include code that learns (e.g., using a neural network) the motor constants over time.

The wheel modules 500, 501 are releasably attached to the chassis 100 and forced into engagement with the surface by respective springs. The wheel modules 500, 501 are substantially sealed from contact with water using one or more the following: epoxy, ultrasonic welding, potting welds, welded interfaces, plugs, and membranes.

The springs are calibrated to apply substantially uniform force to the wheels along the entire distance of travel of the suspension. The wheel modules 500, 501 can each move independently in a vertical direction to act as a suspension system. For example, the wheel modules 500, 501 can allow about 4 mm of suspension travel to about 8 mm of suspension travel (e.g., about 5 mm of suspension travel) to allow the robot 10 to navigate over obstacles on the surface, but to prevent the robot 10 from crossing larger thresholds that mark the separation of cleaning areas (e.g., marking the separation between a kitchen floor and a living room floor). When the robot 10 is lifted from the surface, the respective suspension systems of wheel modules 500, 501 drop the wheel modules 500, 501 to the lowest point of travel of the respective suspension system. This configuration is sometimes referred to as a biased-to-drop suspension system. In some implementations, the wheel modules 500, 501 can include a wheel drop sensor that senses when a wheel 504, 505 of wheel modules 501, 502 moves down and sends a signal to the controller 1000. Additionally or alternatively, the controller 1000 can initiate behaviors that can allow the robot 10 to navigate toward a more stable position on the surface.

The biased-to-drop suspension system of the robot 10 includes a pivoted wheel assembly including resilience and/or damping, having a ride height designed considering up and down force. In some implementations, the suspension system delivers within 1-5% (e.g., about 2%) of the minimum downward force of the robot 10 (i.e., robot mass or weight minus upward forces from the resilient or compliant contacting members such as brushes/squeegees, etc). That is, the suspension is resting against "hard stops" with only 2% of the available downward force applied (spring stops having the other 98%, optionally 99%-95%), such that almost any obstacle or perturbation capable of generating an upward force will result in the suspension lifting or floating the robot over the obstacle while maintaining maximum available force on the tire contact patch. This spring force (and in corollary, robot traction) can be maximized by having an active system that varies its force relative to the changing robot payload (relative clean and dirty tank level). In some implementations, actuation for an active suspension is provided by electrical actuators or solenoids, fluid power, or the like, with appropriate damping and spring resistance. While a pivoted wheel assembly has been described, other implementations are possible. For example, the biased-to-drop suspension system can include a vertically traveling wheel module including conical springs to produce a biased-to-drop suspension system.

Figure 20:
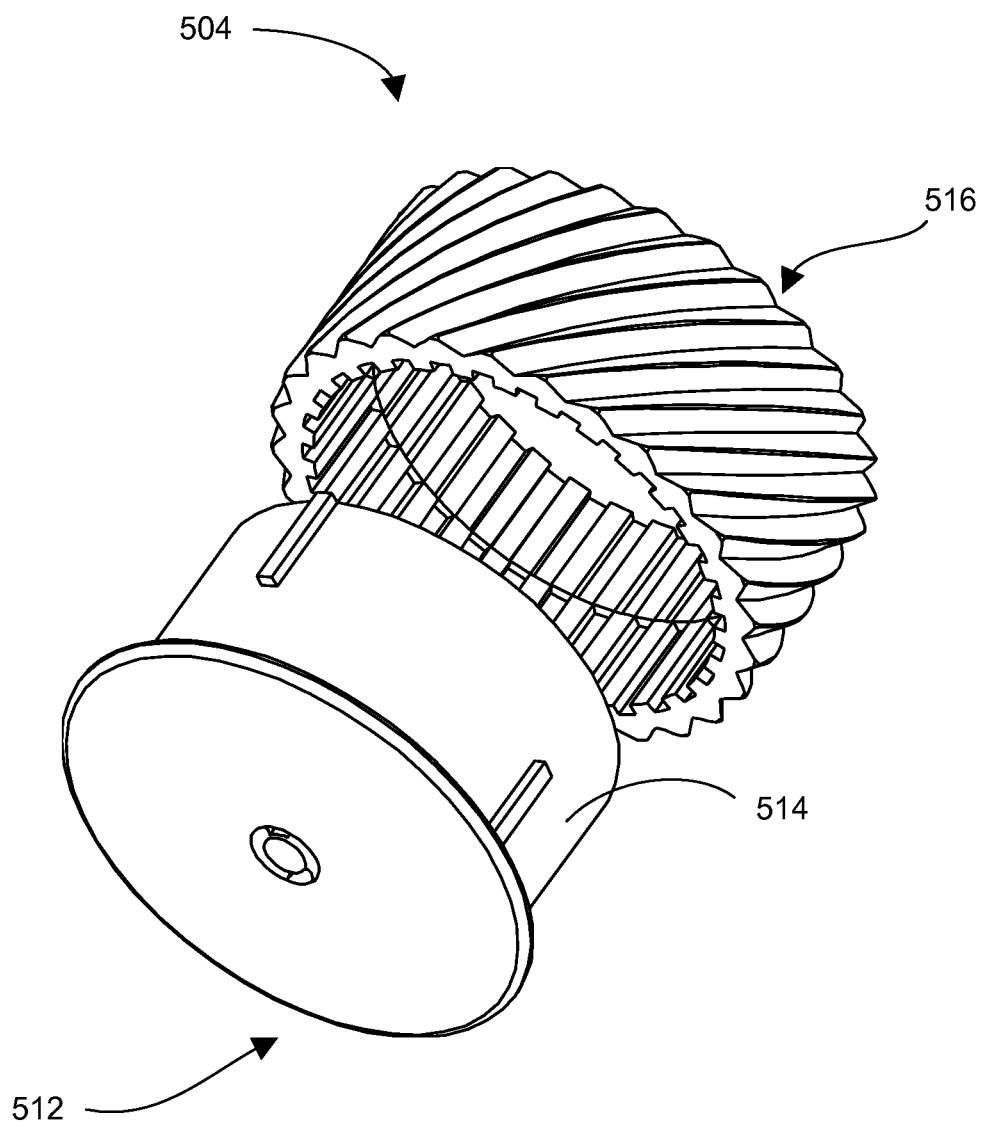
FIG. 20 is an exploded perspective view of a wheel of the autonomous cleaning robot of FIG. 1.

Wheels 504, 505 are configured to propel the robot 10 across a wet soapy surface. Referring to FIG. 20, wheel 504 includes a rim 512 configured to couple to the wheel module 500. The drive wheel module includes a drive motor and a drive train transmission for driving the wheel for transport. The drive wheel module can also include a sensor for detecting wheel slip with respect to the surface.

The rim 512 is formed from a stiff material such as a hard molded plastic to maintain the wheel shape and to provide stiffness. The rim 512 provides an outer diameter sized to receive an annular tire 516 thereon. The annular tire 516 is configured to provide a non-slip, high friction drive surface for contacting the surface and for maintaining traction on the soapy surface.

In one implementation, the annular tire 516 has an internal diameter of approximately 37 mm and is sized to fit appropriately over the outer diameter 514 of rim 512. The annular tire 516 can be bonded, taped or otherwise interference fit to the outer diameter 514 to prevent slipping between an inside diameter of the annular tire 516 and the outer diameter 514 of the rim 512. The tire radial thickness can be about 3 mm. The tire material is a chloroprene homopolymer stabilized with thiuram disulfide black with a density of 14-16 pounds per cubic foot, or approximately 15 pounds per cubic foot foamed to a cell size of 0.1 mm plus or minus 0.02 mm. The tire has a post-foamed hardness of about 69 to 75 Shore 00. The tire material is sold by Monmouth Rubber and Plastics Corporation under the trade name DURAFOAM DK5151 HD.

Other tire materials are contemplated, depending on the particular application, including, for example, those made of neoprene and chloroprene, and other closed cell rubber sponge materials. Tires made of polyvinyl chloride (PVC) (e.g., injection molded, extruded) and acrylonitrile-butadiene (ABS) (with or without other extractables, hydrocarbons, carbon black, and ash) may also be used. Additionally, tires of shredded foam construction may provide some squeegee-like functionality, as the tires drive over the wet surface being cleaned. Tires made from materials marketed under the trade names RUBATEX R411, R421, R428, R451, and R4261 (manufactured and sold by Rubatex International, LLC); ENSOLITE (manufactured and sold by Armacell LLC); and products manufactured and sold by American Converters/VAS, Inc.; are also functional substitutions for the DURAFOAM DK5151 HD identified above.

In certain embodiments, the tire material may contain natural rubber(s) and/or synthetic rubber(s), for example, nitrile rubber (acrylonitrile), styrene-butadiene rubber (SBR), ethylene-propylene rubber (EPDM), silicone rubber, fluorocarbon rubber, latex rubber, silicone rubber, butyl rubber, styrene rubber, polybutadiene rubber, hydrogenated nitrile rubber (HNBR), neoprene (polychloroprene), and mixtures thereof.

In certain embodiments, the tire material may contain one or more elastomers, for example, polyacrylics (i.e. polyacrylonitrile and polymethylmethacrylate (PMMA)), polychlorocarbons (i.e. PVC), polyfluorocarbons (i.e. polytetrafluoromethylene), polyolefins (i.e. polyethylene, polypropylene, and polybutylene), polyesters (i.e. polyetheylene terephthalate and polybutylene terephthalate), polycarbonates, polyamides, polyimides, polysulfones, and mixtures and/or copolymers thereof. The elastomers may include homopolymers, copolymers, polymer blends, interpenetrating networks, chemically modified polymers, grafted polymers, surface-coated polymers, and/or surface-treated polymers.

In certain embodiments, the tire material may contain one or more fillers, for example, reinforcing agents such as carbon black and silica, non-reinforcing fillers, sulfur, cross linking agents, coupling agents, clays, silicates, calcium carbonate, waxes, oils, antioxidants (i.e. para-phenylene diamine antiozonant (PPDA), octylated diphenylamine, and polymeric 1,2-dihydro-2,2,4-trimethylquinoline), and other additives.

In certain embodiments, the tire material may be formulated to have advantageous properties, for example, desired traction, stiffness, modulus, hardness, tensile strength, impact strength, density, tear strength, rupture energy, cracking resistance, resilience, dynamic properties, flex life, abrasion resistance, wear resistance, color retention, and/or chemical resistance (i.e. resistance to substances present in the cleaning solution and the surface being cleaned, for example, dilute acids, dilute alkalis, oils and greases, aliphatic hydrocarbons, aromatic hydrocarbons, halogenated hydrocarbons, and/or alcohols).

It is noted that cell size of the closed cell foam tires may impact functionality, in terms of traction, resistance to contaminants, durability, and other factors. Cell sizes ranging from approximately 20 μm to approximately 400 μm may provide acceptable performance, depending on the weight of the robot and the condition of the surface being cleaned. Particular ranges include approximately 20 μm to approximately 120 μm, with a mean cell size of 60 μm, and more particularly approximately 20 μm to approximately 40 μm, for acceptable traction across a variety of surface and contaminant conditions.

In certain embodiments, the tires are approximately 13 mm wide, although wider tires may provide additional traction. As indicated above, tires may be approximately 3 mm thick, although tires of 4 mm-5 mm in thickness or more may be utilized for increased traction. Thinner tires of approximately 1.5 mm and thicker tires of approximately 4.5 mm may be beneficial, depending on the weight of the robot, operating speed, movement patterns, and surface textures. Thicker tires may be subject to compression set. If the cleaning robot is heavier, larger tires may be desirable nonetheless. Tires with outer rounded or square edges may also be employed.

To increase traction, the outside diameter of the tire can be siped. Siping generally provides traction by (a) reducing the transport distance for fluid removal from the contact patch by providing a void for the fluid to move into, (b) allowing more of the tire to conform to the floor, thereby increasing tread mobility, and (c) providing a wiping mechanism that aids in fluid removal. In at least one instance, the term "siped" refers to slicing the tire material to provide a pattern of thin grooves 1110 in the tire outside diameter. In one embodiment, each groove has a depth of approximately 1.5 mm and a width or approximately 20 to 300 microns. The siping may leave as little as ½ mm or less of tire base, for example, 3.5 mm deep siping on a 4 mm thick tire. The groove pattern can provide grooves that are substantially evenly spaced apart, with approximately 2 to 200 mm spaces between adjacent grooves. "Evenly spaced" may mean, in one instance, spaced apart and with a repeating pattern, not necessarily that every siped cut is the same distance from the next. The groove cut axis makes an angle G with the tire longitudinal axis. The angle G ranges from about 10-50 degrees, in certain embodiments.

In other embodiments, the siping pattern is a diamond-shaped cross hatch at 3.5 mm intervals, which may be cut at alternating 45 degree angles (.+-.10 degrees) from the rotational axis. Substantially circumferential siping, siping that forces away liquid via channels, and other siping patterns are also contemplated. Depth and angle of siping may be modified, depending on particular applications. Moreover, while increased depth or width of siping may increase traction, this benefit should be balanced against impacting the structural integrity of the tire foam. In certain embodiments, for example, it has been determined that 3 mm-4 mm thick tires with diamond crossed siping at 7 mm intervals provides good tire traction. Larger tires may accommodate a finer pattern, deeper siping, and/or wider siping. Additionally, particularly wide tires or tires made from certain materials may not require any siping for effective traction. While certain siping patterns may be more useful on wet or dry surfaces, or on different types of surfaces, siping that provides consistent traction across a variety of applications may be the most desirable for a general purpose robot cleaner.

While the tires have been described as including a siped outside diameter, other implementations are possible. For example, the tires can be Natural Rubber tires with an aggressive diagonal V-rib pattern.

The various tire materials, sizes, configurations, siping, etc., impact the traction of the robot during use. In certain embodiments, the robot's wheels roll directly through the spray of cleaning solution, which affects the traction, as do the contaminants encountered during cleaning. A loss of traction of the wheels may cause operating inefficiencies in the form of wheel slippage, which can lead to the robot deviating from its projected path. This deviation can increase cleaning time and reduce battery life. Accordingly, the robot's wheels should be of a configuration that provides good to excellent traction on all surfaces, with the smallest corresponding motor size.

Typical contaminants encountered during cleaning include chemicals, either discharged by the robot or otherwise. Whether in a liquid state (e.g., pine oil, hand soap, ammonium chloride, etc.) or a dry state (e.g., laundry powder, talcum powder, etc.), these chemicals may break down the tire material. Additionally, the robot tires may encounter moist or wet food-type contaminants (e.g., soda, milk, honey, mustard, egg, etc.), dry contaminants (e.g., crumbs, rice, flour, sugar, etc.), and oils (e.g., corn oil, butter, mayonnaise, etc.). All of these contaminants may be encountered as residues, pools or slicks, or dried patches. The tire materials described above have proven effective in resisting the material breakdown caused by these various chemicals and oils. Additionally, the cell size and tire siping described has proven beneficial in maintaining traction while encountering both wet and dry contaminants, chemical or otherwise. Dry contaminants at certain concentrations, however, may become lodged within the siping. The chemical cleaner used in the device, described below, also helps emulsify certain of the contaminants, which may reduce the possible damage caused by other chemical contaminants by diluting those chemicals.

In addition to contaminants that may be encountered during use, the various cleaning accessories (e.g., brushes, squeegees, etc.) of the device affect the traction of the device. The drag created by these devices, the character of contact (i.e., round, sharp, smooth, flexible, rough, etc.) of the devices, as well as the possibility of slippage caused by contaminants, varies depending on the surface being cleaned. Limiting the areas of contact between the robot and the surface being cleaned reduces attendant friction, which improves tracking and motion. One and one-half pounds of drag force versus three to five pounds of thrust has proven effective in robots weighing approximately 5-15 pounds. Depending on the weight of the robot cleaner, these numbers may vary, but it is noted that acceptable performance occurs at less than about 50% drag, and is improved with less than about 30% drag.

The tire materials (and corresponding cell size, density, hardness, etc.), siping, robot weight, contaminants encountered, degree of robot autonomy, floor material, and so forth, all impact the total traction coefficients of the robot tires. For certain robot cleaners, the coefficient of traction (COT) for the minimum mobility threshold has been established by dividing a 0.9 kg-force drag (as measured during squeegee testing) by 2.7 kg-force of normal force, as applied to the tires. Thus, this minimum mobility threshold is approximately 0.33. A target threshold of 0.50 was determined by measuring the performance of shredded black foam tires. Traction coefficients of many of the materials described above fell within a COT range of 0.25 to 0.47, thus within the acceptable range between the mobility threshold and the target threshold. Additionally, tires that exhibit little variability in traction coefficients between wet and dry surfaces are desirable, given the variety of working conditions to which a cleaning robot is exposed.

The robot cleaning device may also benefit by utilizing sheaths or booties that at least partially or fully surround the tires. Absorbent materials, such as cotton, linen, paper, silk, porous leather, chamois, etc., may be used in conjunction with the tires to increase traction. Alternatively, these sheaths may replace rubberized wheels entirely, by simply mounting them to the outer diameter 1104 of the cup shaped wheel element 1102. Whether used as sheaths for rubber tires or as complete replacements for the rubber tires, the materials may be interchangeable by the user or may be removed and replaced via automation at a base or charging station. Additionally, the robot may be provided to the end user with sets of tires of different material, with instructions to use particular tires on particular floor surfaces.

The cleaning solution utilized in the robot cleaner should be able to readily emulsify contaminants and debond dried waste from surfaces, without damaging the robot or surface itself. Given the adverse effects described above with regard to robot tires and certain chemicals, the aggressiveness of the cleaning solution should be balanced against the short and long-term negative impacts on the tires and other robot components. In view of these issues, virtually any cleaning material that meets the particular cleaning requirements may be utilized with the cleaning robot. In general, for example, a solution that includes both a surfactant and a chelating agent may be utilized. Additionally, a pH balancing agent such as citric acid may be added. Adding a scent agent, such as eucalyptus, lavender, and/or lime, for example, may improve the marketability of such a cleaner, contributing to the perception on the part of the consumer that the device is cleaning effectively. A blue, green, or other noticeable color may also help distinguish the cleaner for safety or other reasons. The solution may also be diluted and still effectively clean when used in conjunction with the robot cleaner. During operation, there is a high likelihood that the robot cleaner may pass over a particular floor area several times, thus reducing the need to use a full strength cleaner. Also, diluted cleaner reduces the wear issues on the tires and other components, as described above. One such cleaner that has proven effective in cleaning, without causing damage to the robot components, includes alkyl polyglucoside (for example, at 1-3% concentration) and tetrapotassium ethylenediamine-tetraacetate (tetrapotassium EDTA) (for example, at 0.5-1.5% concentration). During use, this cleaning solution is diluted with water to produce a cleaning solution having, for example, approximately 3-6% cleaner and approximately 94-97% water. Accordingly, in this case, the cleaning solution actually applied to the floor may be as little as 0.03% to 0.18% surfactant and 0.01 to 0.1% chelating agent. Of course, other cleaners and concentrations thereof may be used with the disclosed robot cleaner.

For example, the families of surfactants and chelating agents disclosed in U.S. Pat. No. 6,774,098, the disclosure of which is hereby incorporated by reference in its entirety, are also suitable for application in the robot having the tire materials and configurations disclosed. To balance the aggressiveness of the cleaners disclosed in the '098 patent with the wear caused on the machine components, however, it is preferred that the cleaning agents should (i) include no solvent, or include solvent at a percentage lower than that of the chelating agent of an alcohol solvent, or have the disclosed solvents in ½ to ¹⁄₁₀₀ the concentrations, and/or (ii) be further diluted for deterministic single pass, deterministic repeat passes, or random multipass use in a robot by 20%+/−15% (single pass), 10%+/−8% (repeat pass), and from 5% to 0.1% (random multipass) respectively, of the concentrations disclosed; and/or (iii) be further combined with an anti-foaming agent known to be compatible with the selected surfactant and chelating agent in percentages the same as or lower than commercial carpet cleaners, e.g., less than 5% of silicone emulsion, and/or (iv) replaced with or compatibly mixed with an odor remover of viable bacterial cultures.

In certain embodiments, the cleaning solution utilized in the robot cleaner includes (or is) one or more embodiments of the "hard surface cleaner" described in U.S. Pat. No. 6,774,098, preferably subject to (i), (ii), (iii), and/or (iv) above. Certain embodiments of the "hard surface cleaner" in U.S. Pat. No. 6,774,098, are described in the following paragraphs.

In one embodiment, the hard surface cleaner comprises: (a) a surfactant system consisting of amine oxides within the general formula (I): or quaternary amine salts within the general formula (II): or combinations of the foregoing amine oxides and quaternary amine salts; and (b) a very slightly water-soluble polar organic compound having a water solubility ranging from about 0.1 to 1.0 weight percent, a weight ratio of the very slightly water-soluble polar organic compound to the surfactant system ranging from about 0.1:1 to about 1:1, wherein $R^1$ and $R^2$ are the same or different and are selected from the group consisting of methyl, ethyl, propyl, isopropyl, hydroxyethyl and hydroxypropyl, $R^3$ is selected from the group consisting of straight chain alkyls, branched chain alkyls, straight chain heretroalkyls, branched chain heteroalkyls and alkyl ethers, each having from about 10 to 20 carbon atoms, $R^4$ is selected from the group consisting of alkyl groups having from 1 to about 5 carbon atoms, and X is a halogen atom.

In another embodiment, the hard surface cleaner comprises: (a) either (i) a combination of a nonionic surfactant and a quaternary ammonium surfactant or (ii) an amphoteric surfactant, the total amount of the surfactant being present from about 0.001-10%, wherein the nonionic surfactant is selected from the group consisting of an alkoxylated alkylphenol ether, an alkoxylated alcohol, or a semi-polar nonionic surfactant which itself is selected from the group consisting of mono-long-chain alkyl, di-short-chain trialkyl amine oxides, alkylamidodialkyl amine oxides, phosphine oxides and sulfoxides; (b) no more than 50% of at least one water-soluble or dispersible organic solvent having a vapor pressure of at least 0.001 mm Hg at 25.degree. C.; (c) 0.01-

25% of tetraammonium ethylenediamine-tetraacetate (tetraammonium EDTA) as a chelating agent; and (d) water.

In yet another embodiment, the hard surface cleaner comprises (a) a surfactant selected from the group consisting of anionic, nonionic surfactants, and mixtures thereof, with optionally, a quaternary ammonium surfactant, the total amount of surfactant being present from about 0.001-10% by weight; (b) at least one water-soluble or dispersible organic solvent having a vapor pressure of at least 0.001 mm Hg at 25.degree. C., the at least one organic solvent being selected from the group consisting of alkanols, diols, glycol ethers, and mixtures thereof present in an amount from about 1% to 50% by weight of the cleaner; (c) tetrapotassium ethylenediamine-tetraacetate (potassium EDTA) as a chelating agent, the potassium EDTA present from about 0.01-25% weight-of the cleaner; and (d) water.

In still another embodiment, the hard surface cleaner comprises (a) a nonionic surfactant with optionally, a quaternary ammonium surfactant, the total amount of the surfactant being present from about 0.001-10%, wherein the nonionic surfactant is selected from the group consisting of an alkoxylated alkylphenol ether, an alkoxylated alcohol, or a semipolar nonionic surfactant which itself is selected from the group consisting of mono-long-chain alkyl, di-short-chain trialkyl amine oxides, alkylamidodialkyl amine oxides, phosphine oxides and sulfoxides; (b) no more than 50% of at least one water-soluble or dispersible organic solvent having a vapor pressure of at least 0.001 mm Hg at 25.degree. C.; (c) 0.01-25% of tetraammonium ethylenediamine-tetraacetate (tetraammonium EDTA) as a chelating agent; and (d) water.

In certain embodiments, the hard surface cleaner has a viscosity of less than about 100 cps and comprises: (a) at least about 85% water, in which is dissolved (b) at least about 0.45 equivalent per kilogram of an inorganic anion which, when combined with calcium ion, forms a salt which has a solubility of not more than 0.2 g/100 g water at 25.degree. C., wherein the anion is carbonate, fluoride, or metasilicate ion, or a mixture of such anions, (c) at least 0.3% by weight, based on the weight of the composition, of a detersive surfactant including an amine oxide of the form $RR^1R^2N \rightarrow O$ wherein R is $C_6$-$C_{12}$ alkyl and $R^1$ and $R^2$ are independently $C_{1-4}$ alkyl or $C_{1-4}$ hydroxyalkyl, and (d) at least about 0.5 weight percent of a bleach, based upon the weight of the composition, wherein the cleaning composition is alkaline and essentially free of chelating agents, phosphorus-containing salt, and abrasive.

In certain embodiments, the cleaning solution utilized in the robot cleaner includes (or is) one or more embodiments of the hard surface cleaners described in U.S. Pat. Nos. 5,573,710, 5,814,591, 5,972,876, 6,004,916, 6,200,941, and 6,214,784, all of which are incorporated herein by reference.

U.S. Pat. No. 5,573,710 discloses an aqueous multiple-surface cleaning composition which can be used for the removal of grease and stains from hard surfaces or hard fibrous substrates such as carpet and upholstery. The composition contains (a) a surfactant system consisting of amine oxides within the general formula (I): or quaternary amine salts within the general formula (II): or combinations of the foregoing amine oxides and quaternary amine salts; and (b) a very slightly water-soluble polar organic compound. The very slightly water-soluble polar organic compound may have a water solubility ranging from about 0.1 to 1.0 weight percent, and the weight ratio of the very slightly water-soluble polar organic compound to the surfactant system may range from about 0.1:1 to about 1:1. $R^1$ and $R^2$ may be selected from the group consisting of methyl, ethyl, propyl, isopropyl, hydroxyethyl and hydroxypropyl. $R^1$ and $R^2$ may be the same or different. $R^3$ may be selected from the group consisting of straight chain alkyls, branched chain alkyls, straight chain heretroalkyls, branched chain heteroalkyls and alkyl ethers, each having from about 10 to 20 carbon atoms. $R^4$ may be selected from the group consisting of alkyl groups having from 1 to about 5 carbon atoms. X is a halogen atom.

In certain cases, the composition further includes a water soluble organic compound in an amount effective to reduce streaking. The water soluble organic compound may be selected from water soluble glycol ethers and water soluble alkyl alcohols. The water soluble organic compound may have a water solubility of at least 14.5 weight percent. The weight ratio of the surfactant system to the water soluble organic compound may range from about 0.033:1 to about 0.2:1.

U.S. Pat. No. 5,814,591 describes an aqueous hard surface cleaner with improved soil removal. The cleaner includes (a) either (i) a nonionic, an amphoteric surfactant, or a combination thereof, or (ii) a quaternary ammonium surfactant, the surfactants being present in a cleaning effective amount; (b) at least one water-soluble or dispersible organic solvent having a vapor pressure of at least 0.001 mm Hg at 25.degree. C., the at least one organic solvent present in a solubilizing- or dispersion-effective amount; (c) ammonium ethylenediamine-tetraacetate (ammonium EDTA) as a chelating agent, the ammonium EDTA present in an amount effective to enhance soil removal in the cleaner; and (d) water. The total surfactant maybe present in an amount from about 0.001-10%. In a concentrated product, the surfactant may be present up to 20% by weight. The nonionic surfactant may be selected from the group consisting of an alkoxylated alkylphenol ether, an alkoxylated alcohol, or a semi-polar nonionic surfactant which itself is selected from the group consisting of mono-long-chain alkyl, di-short-chain trialkyl amine oxides, alkylamidodialkyl amine oxides, phosphine oxides and sulfoxides. The at least one water-soluble or dispersible organic solvent may be present in an amount of no more than 50% by weight of the cleaner. The ammonium EDTA may be a tetraammonium EDTA and present in an amount of about 0.01-25% by weight of the total cleaner.

U.S. Pat. No. 5,972,876 discloses an aqueous hard surface cleaner comprising (a) a surfactant selected from the group consisting of anionic, nonionic surfactants, and mixtures thereof, with optionally, a quaternary ammonium surfactant, the total amount of surfactant being present in a cleaning-effective amount; (b) at least one water-soluble or dispersible organic solvent having a vapor pressure of at least 0.001 mm Hg at 25.degree. C., the organic solvent being present in a solubilizing- or dispersion-effective amount; (c) tetrapotassium ethylenediamine-tetraacetate (potassium EDTA) as a chelating agent, the potassium EDTA present in an amount effective to enhance soil removal in the cleaner; and (d) water. The total amount of surfactant may be present from about 0.001-10% by weight. The at least one organic solvent may be selected from the group consisting of alkanols, diols, glycol ethers, and mixtures thereof, and is present in an amount from about 1% to 50% by weight of the cleaner. The potassium EDTA may be present from about 0.01-25% weight of the cleaner.

U.S. Pat. No. 6,004,916 discloses an aqueous, hard surface cleaner which contains (a) either a nonionic or amphoteric surfactant with optionally, a quaternary ammonium surfactant, the surfactants being present in a cleaning effective amount; (b) at least one water-soluble or dispersible organic solvent having a vapor pressure of at least 0.001 mm Hg at 25.degree. C., the at least one organic solvent present in a solubilizing- or dispersion-effective amount; (c) ammonium ethylenediamine-tetraacetate (ammonium EDTA) as a chelating agent, the ammonium EDTA present in an amount effective to enhance soil removal in the cleaner; and (d) water. The surfactant may be a nonionic surfactant with optionally, a quaternary ammonium surfactant. The nonionic surfactant may be selected from the group consisting of an alkoxylated alkylphenol ether, an alkoxylated alcohol, or a semi-polar nonionic surfactant which itself is selected from the group consisting of mono-long-chain alkyl, di-short-chain trialkyl amine oxides, alkylamidodialkyl amine oxides, phosphine oxides and sulfoxides. The total amount of the surfactant may be present from about 0.001-10%. The at least one water-soluble or dispersible organic solvent may be present in an amount of no more than 50% by weight of the cleaner. The ammonium EDTA may be a tetraammonium EDTA which is present in an amount from 0.01-25% by weight of the total cleaner.

U.S. Pat. No. 6,200,941 discloses a diluted hard surface cleaning composition. The cleaning composition contains (a) at least about 85% water, in which is dissolved (b) at least about 0.45 equivalent per kilogram of an inorganic anion which, when combined with calcium ion, forms a salt which has a solubility of not more than 0.2 g/100 g water at 25.degree. C.; (c) at least 0.3% by weight, based on the weight of the composition, of a detersive surfactant. The composition preferably has a viscosity of less than about 100 cps. The anion may be carbonate, fluoride, or metasilicate ion, or a mixture of such anions. The detersive surfactant may include an amine oxide of the form $RR^1R^2N \rightarrow O$ wherein R is $C_6$-$C_{12}$ alkyl and $R^1$ and $R^2$ are independently $C_{14}$ alkyl or $C_{14}$ hydroxyalkyl. The composition may further contain at least about 0.5 weight percent of a bleach, based upon the weight of the composition. In one case, the cleaning composition is alkaline and essentially free of chelating agents, phosphorus-containing salt, and abrasive.

U.S. Pat. No. 6,214,784 describes a composition similar to that disclosed in U.S. Pat. No. 5,972,876. The composition may include dipotassium carbonate as a buffer.

Controller Module

Control module 1000 is interconnected for two-way communication with each of a plurality of other robot subsystems. The interconnection of the robot subsystems is provided via network of interconnected wires and or conductive elements, e.g. conductive paths formed on an integrated printed circuit board or the like, as is well known. In some implementations, the two-way communication between the control module 1000 one or more of the robot subsystems occurs through a wireless communication path. The control module 1000 at least includes a programmable or preprogrammed digital data processor, e.g. a microprocessor, for performing program steps, algorithms and or mathematical and logical operations as may be required. The control module 1000 also includes a digital data memory in communication with the data processor for storing program steps and other digital data therein. The control module 1000 also includes one or more clock elements for generating timing signals as may be required.

In general, the robot 10 is configured to clean uncarpeted indoor hard floor surface, e.g. floors covered with tiles, wood, vinyl, linoleum, smooth stone or concrete and other manufactured floor covering layers that are not overly abrasive and that do not readily absorb liquid. Other implementations, however, can be adapted to clean, process, treat, or otherwise traverse abrasive, liquid-absorbing, and other surfaces. Additionally or alternatively, the robot 10 can be configured to autonomously transport over the floors of small enclosed furnished rooms such as are typical of residential homes and smaller commercial establishments. The robot 10 is not required to operate over predefined cleaning paths but may move over substantially all of the cleaning surface area under the control of various transport algorithms designed to operate irrespective of the enclosure shape or obstacle distribution. For example, the robot 10 can move over cleaning paths in accordance with preprogrammed procedures implemented in hardware, software, firmware, or combinations thereof to implement a variety of modes, such as three basic operational modes, i.e., movement patterns, that can be categorized as: (1) a "spot-coverage" mode; (2) a "wall/obstacle following" mode; and (3) a "bounce" mode. In addition, the robot 10 is preprogrammed to initiate actions based upon signals received from sensors incorporated therein, where such actions include, but are not limited to, implementing one of the movement patterns above, an emergency stop of the robot 10, or issuing an audible alert. These operational modes of the robot are specifically described in U.S. Pat. No. 6,809,490, by Jones et al., entitled, Method and System for Multi-Mode Coverage for an Autonomous Robot, the entire disclosure of which is herein incorporated by reference it its entirety. However, the present disclosure also describes alternative operational modes.

The robot 10 also includes the user interface 400. The user interface 400 provides one or more user input interfaces that generate an electrical signal in response to a user input and communicate the signal to the controller 1000. A user can input user commands to initiate actions such as power on/off, start, stop or to change a cleaning mode, set a cleaning duration, program cleaning parameters such as start time and duration, and or many other user initiated commands. While the user interface 400 has been described as a user interface carried on the robot 10, other implementations are additionally or alternatively possible. For example, a user interface can include a remote control device (e.g., a hand held device) configured to transmit instructions to the robot 10. Additionally or alternatively, a user interface can include a programmable computer or other programmable device configured to transmit instructions to the robot 10. In some implementations, the robot can include a voice recognition module and can respond to voice commands provided by the user. User input commands, functions, and components contemplated for use with the present invention are specifically described in U.S. patent application Ser. No. 11/166,891, by Dubrovsky et al., filed on Jun. 24, 2005, entitled Remote Control Scheduler and Method for Autonomous Robotic Device, the entire disclosure of which is herein incorporated by reference it its entirety. Specific modes of user interaction are also described herein.

Sensor Module

The robot 10 includes a sensor module 1100. The sensor module 1100 includes a plurality of sensors attached to the chassis and integrated with the robot subsystems for sensing external conditions and for sensing internal conditions. In response to sensing various conditions, the sensor module 1100 can generate electrical signals and communicate the electrical signals to the controller 1100. Individual sensors can perform any of various different functions including, but not limited to, detecting walls and other obstacles, detecting drop offs in the surface (sometimes referred to as cliffs), detecting debris on the surface, detecting low battery power, detecting an empty cleaning fluid container, detecting a full waste container, measuring or detecting drive wheel velocity distance traveled or slippage, detecting cliff drop off, detecting cleaning system problems such rotating brush stalls or vacuum system clogs or pump malfunctions, detecting inefficient cleaning, cleaning surface type, system status, temperature, and many other conditions. In particular, several aspects of the sensor module 1100 as well as its operation, especially as it relates to sensing external elements and conditions are specifically described in U.S. Pat. No. 6,594,844, by Jones, entitled Robot Obstacle Detection System, and U.S. patent application Ser. No. 11/166,986, by Casey et al., filed on Jun. 24, 2005, entitled Obstacle Following Sensor Scheme for a Mobile Robot, the entire disclosures of which are herein incorporated by reference it their entireties.

The robot 10 includes control and sensor components in close proximity to the wet cleaning components. As described above, the robot 10 can be sized to fit within any of various different confined spaces typically encountered in household cleaning applications. Accordingly, much of the volume of robot 10 is occupied by the liquid storage 1500, liquid applicator 1400, and vacuum subsystems 1300, each of which can include the transport of water, solvents, and/or waste throughout the robot 10. As distinguished from many dry vacuuming robots that do not use wet cleaners and do not generate waste, some of the sensors and control elements of the robot 10 are sealed and/or positioned to minimize exposure to water or more damaging cleaning fluids or solvents. As distinguished from many industrial cleaners, some of the sensors and control elements of the robot 10 are packaged in close proximity to (e.g., within less than about an inch of) cleaning elements, cleaning fluids, and/or waste.

The controller 1000 can be implemented using a PCB carried by the chassis 100 and secured in any of various different positions along the chassis. For example, the PCB can be carried on a top portion of the signal channeler 402, in the recessed portion 406.

The entire main control PCB is fluid sealed, either in a water resistant or waterproof housing having at least JIS grade 3 (mild spray) water/fluid resistance, but grade 5 (strong spray), grade 7 (temporary immersion), and ANSI/IEC 60529-2004 standards for equivalent water ingress protection are also desirable. In some implementations, the main control PCB is sealed in a JIS grade 3-7 housing (1) by a screwed-down and gasketed cover over the main housing; (2) by a welded, caulked, sealed, or glued cover secured to the main housing; (3) by being pre-assembled in a water resistant, water-tight, water-proof, or hermetically sealed compartment or module; or (4) by being positioned in a volume suitable for potting or pre-potted in resin or the like.

Many sensor elements have a local small circuit board, sometimes with a local microprocessor and/or A/D converter and the like, and these components are often sensitive to fluids and corrosion. In some implementations, sensor circuit boards distributed throughout the body of the robot 10 are sealed in a JIS grade 3-7 housing in a similar manner. In some implementations, multiple circuit boards, including at least the main circuit board and one remote circuit board (e.g., a user interface circuit board) several centimeters from the main board, may be sealed by a single matching housing or cover. For example, all or some of the circuit boards can be arranged in a single plastic or resin module having extensions which reach to local sensor sites. Additionally or alternatively, a distributed cover can be secured over all of the circuit boards. Exposed electrical connections and terminals of sensors, motors, or communication lines can be sealed in a similar manner, with covers, modules, potting, shrink fit, gaskets, or the like. In this manner, substantially the entire electrical system is fluid-sealed and/or isolated from cleaning liquid and/or waste. Any and all electrical or electronic elements defined herein as a circuit board, PCB, detector, sensor, etc., are candidates for such sealing.

Figure 21:
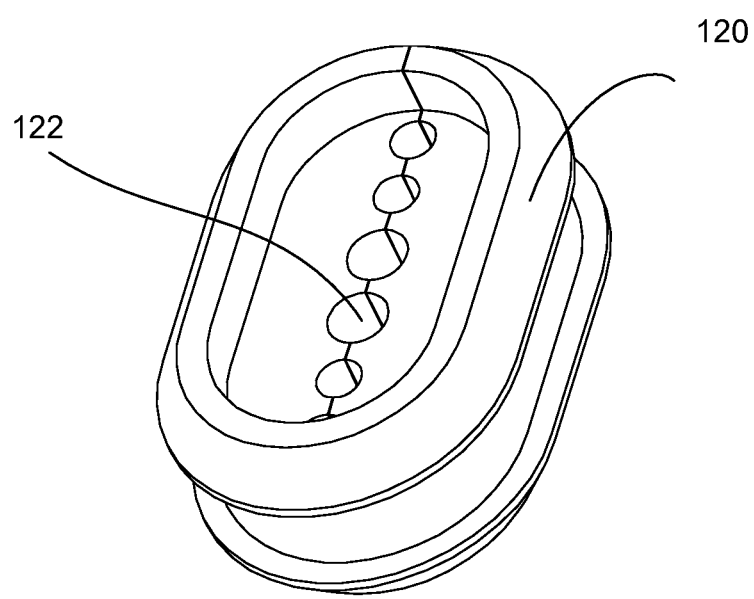
FIG. 21 is a perspective view of a wire seal of an autonomous cleaning robot.

Referring to FIG. 21, electrical components (e.g., a PCB, the fan 112) of the robot 10 can be substantially isolated from moisture and/or waste using a wire seal 120. The wire seal 120 defines one or more apertures 122 extending through the wire seal 120 such that lead wires of an electrical component can be passed from one side of the wire seal 120 to the other, through the one or more apertures 122. With lead wires extending through the one or more apertures 122, a sealant (e.g., potting material) can be introduced into the one or more apertures 122 to hold the lead wires in place. In use, the wire seal 120 can be positioned on the robot 10 such that the electrical component is mounted in a substantially dry portion of the robot 10 while the lead wires extend through the wire seal 120 toward a wet portion of the robot 10. The sealing provided by the wire seal 120 can protect the electrical component from damage due to moisture and/or waste.

Omni-Directional Receiver

Figure 22:
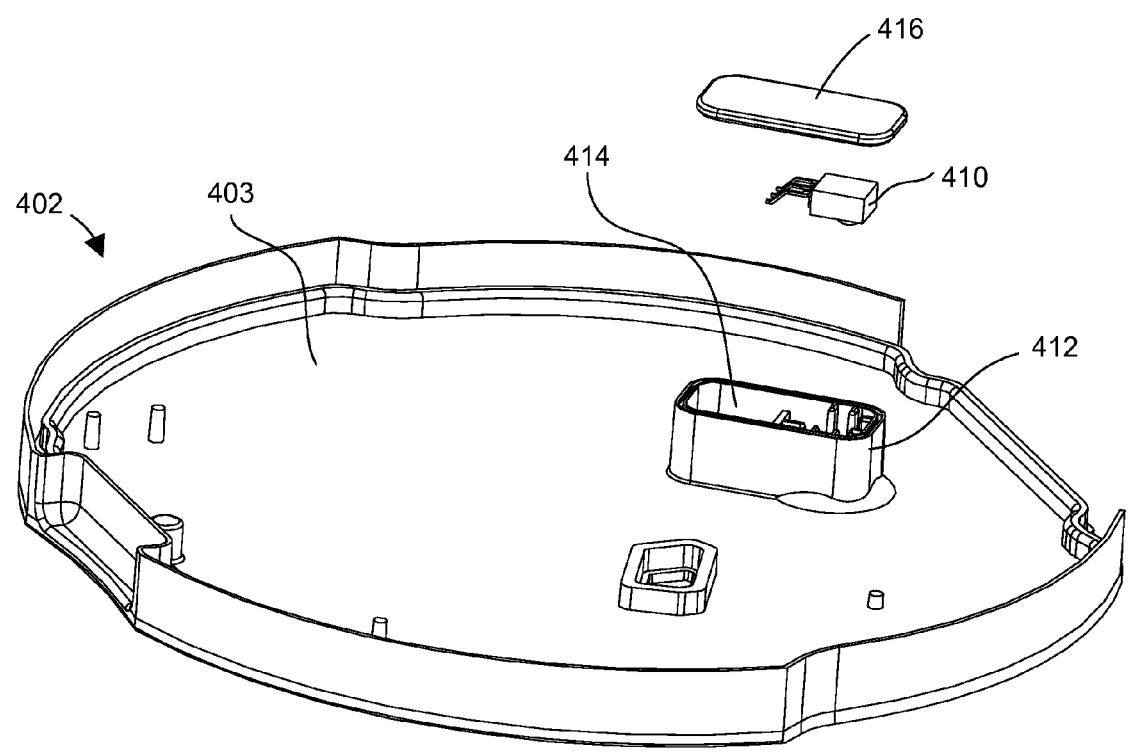
FIG. 22 is an exploded perspective view of a signal channeler and omni-directional receiver of an autonomous cleaning robot.

Referring to FIG. 22, the robot 10 includes an omni-directional receiver 410 disposed along a bottom portion of signal channeler 402. For the purpose of illustration, FIG. 22 shows the signal channeler 402 without waste intake conduits 234 and without fan intake conduit 114 attached. Several aspects of the omni-directional sensor 410 as well as its operation, especially as it relates to the navigation and direction of the robot 10 are specifically described in U.S. patent application Ser. No. 11/633,869, by Ozick et al., entitled "AUTONOMOUS COVERAGE ROBOT NAVIGATION SYSTEM," the entire disclosure of which is herein incorporated by reference in its entirety.

The omni-directional receiver 410 is positioned on the signal channeler 402, substantially off-center from (e.g., substantially forward of) the central vertical axis 20 of the robot 10. The off-center positioning of omni-directional receiver 410 can allow the control module 1000 to be more sensitive in one direction. In some implementations, such sensitivity allows the robot 10 to discern directionality during maneuvers. For example, if the omni-directional receiver 410 receives a signal, the control module 1000 can direct the robot 10 to turn in place until the signal received by the omni-directional receiver 410 weakens and/or disappears. In some implementations, the control module 1000 directs the robot 10 to drive in the direction in which a weakened signal and/or no signal is detected (e.g., away from the source of the signal) and, if the robot 10 turns 360 degrees and is still stuck in the beam, the robot 10 will turn 180 degrees and drive forward in a last attempt to get free.

As shown in FIG. 22, the omni-directional receiver 410 can be disposed substantially along a bottom portion 403 of the signal channeler 402, facing toward the chassis 100. As compared to a configuration in which an omni-directional receiver extends from a top surface of the signal channeler (e.g., forming the highest point of the robot), disposing the omni-directional receiver 410 along the bottom portion 403 of the signal channeler 402 can lower the overall height profile of the robot 10. Additionally or alternatively, this configuration can protect the omni-directional receiver 410 from damage as the robot 10 maneuvers through tight spaces and/or bumps into an overhead obstruction.

In some implementations, the omni-directional receiver 410 can be configured to receive transmissions of infrared light (IR). In such implementations, a guide (e.g. a light pipe) can guide emissions reflected off a conical reflector and channel them to an emission receiver.

The omni-directional receiver 410 is disposed substantially within a cavity 414 defined by a housing 412. A cover 416 extends over the cavity 414 and forms a substantially water-tight seal with the housing 412 to enclose the omni-directional receiver 410. In some implementations, the cover 416 is releasably attached to the housing 412 to allow, for example, replacement and/or repair of the omni-directional receiver 410. The substantially water-tight seal between the housing 412 and the cover 414 can include any of various different seals. Examples of seals include epoxy, ultrasonic welding, potting wells, welded interfaces, plugs, gaskets, and polymeric membranes.

During use, an active external device (e.g., a navigation beacon) can send a signal toward the signal channeler 402. The signal channeler 402 is configured for total internal reflection of the incident signal such that the signal moves substantially unattenuated within the signal channeler 402 (e.g., within the material forming the signal channeler). In some implementations, the signal channeler 402 is a substantially uniform layer of polished polycarbonate resin thermoplastic. The signal moving through the signal channeler 402 is internally reflected through the signal channeler 402. The omni-directional receiver 410 is arranged to detect signal reflected through the signal channeler. The omni-directional receiver 416 is in communication (e.g., electrical communication) with the control module 1000. Upon detecting a signal traveling through the signal channeler 402, the omni-directional receiver 416 sends a signal to the control module 1000.

In some implementations, the control module 1000 responds to the signal from the omni-directional receiver 416 by controlling the wheel modules 500, 501 to navigate the robot 10 away from the source of the signal. For example, as an initial escape procedure, the control module 1000 can direct the wheel modules 500, 501 to move the robot 10 in a rearward direction. Such movement in the rearward direction, can position the robot 10 further away from the beam such that robot 10 can determine directionality (e.g., spin out of the beam) by rotating substantially in place. In a subsequent escape procedure, the controller 1000 can direct the robot 10 in a direction away from the signal.

In some implementations, the robot 10 is configured to detect the virtual wall pattern and is programmed to treat the virtual wall pattern as a room wall so that the robot does not pass through the virtual wall pattern.

In some implementations, the robot 10 includes a radio to control the state of the navigation beams through commands transmitted over a packet radio network.

Control module 1000 can be configured to maneuver the robot 10 about a first area while the robot 10 is in a cleaning mode. In the cleaning mode, the robot 10 can be redirected in response to detecting a gateway marking emission (e.g., from a beacon). In addition, the control module 1000 can be configured to maneuver the robot 10 through a gateway into the second bounded area while in a migration mode.

In some implementations, the control module 1000 is configured to move the robot 10 in a first bounded area in the cleaning mode for a preset time interval. When the present time interval elapses, the control module 1000 can move the robot 10 in a migration mode. While in migration mode, the controller 1000 can direct the wheel modules 500, 501 to maneuver the robot while substantially suspending the wet cleaning process. In some implementations, the migration mode can be initiated when the omni-directional receiver 410 encounters the gateway marking emission a preset number of times.

Wall Follower

Dust and dirt tend to accumulate at room edges. To improve cleaning thoroughness and navigation, the robot 10 can follow walls. Additionally or alternatively, the robot 10 can follow walls as part of a navigation strategy (e.g., a strategy to promote full coverage). Using such a strategy, the robot can be less prone to becoming trapped in small areas. Such entrapments could otherwise cause the robot to neglect other, possibly larger, areas.

Using a wall follower, the distance between the robot and the wall is substantially independent of the reflectivity of the wall. Such consistent positioning can allow the robot 10 to clean with substantially equal effectiveness near dark and light colored walls alike. The wall follower includes a dual collimation system including an infrared emitter and detector. In such a collimation system, the field of view of the infrared emitter and detector can be restricted such that there is a limited, selectable volume where the cones of visibility intersect. Geometrically, the sensor can be arranged so that it can detect both diffuse and specular reflection. This arrangement can allow the wall following distance of the robot 10 to be precisely controlled, substantially independently of the reflectivity of the wall. The distance that the robot 10 maintains between the robot and the wall is independent of the reflectivity of the wall.

Figure 4:
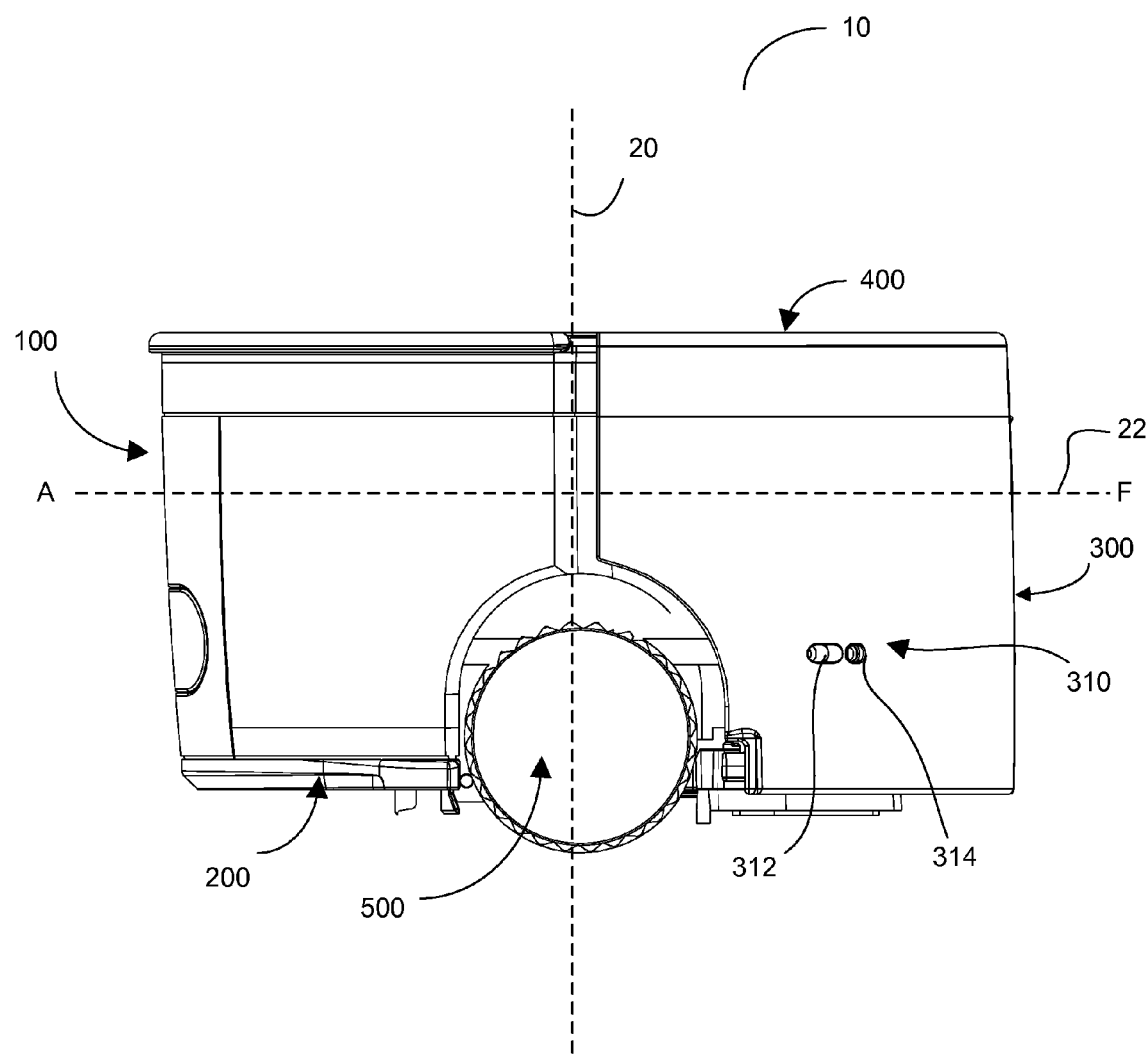
FIG. 4 is a side view of the autonomous cleaning robot of FIG. 1.
Figure 5:
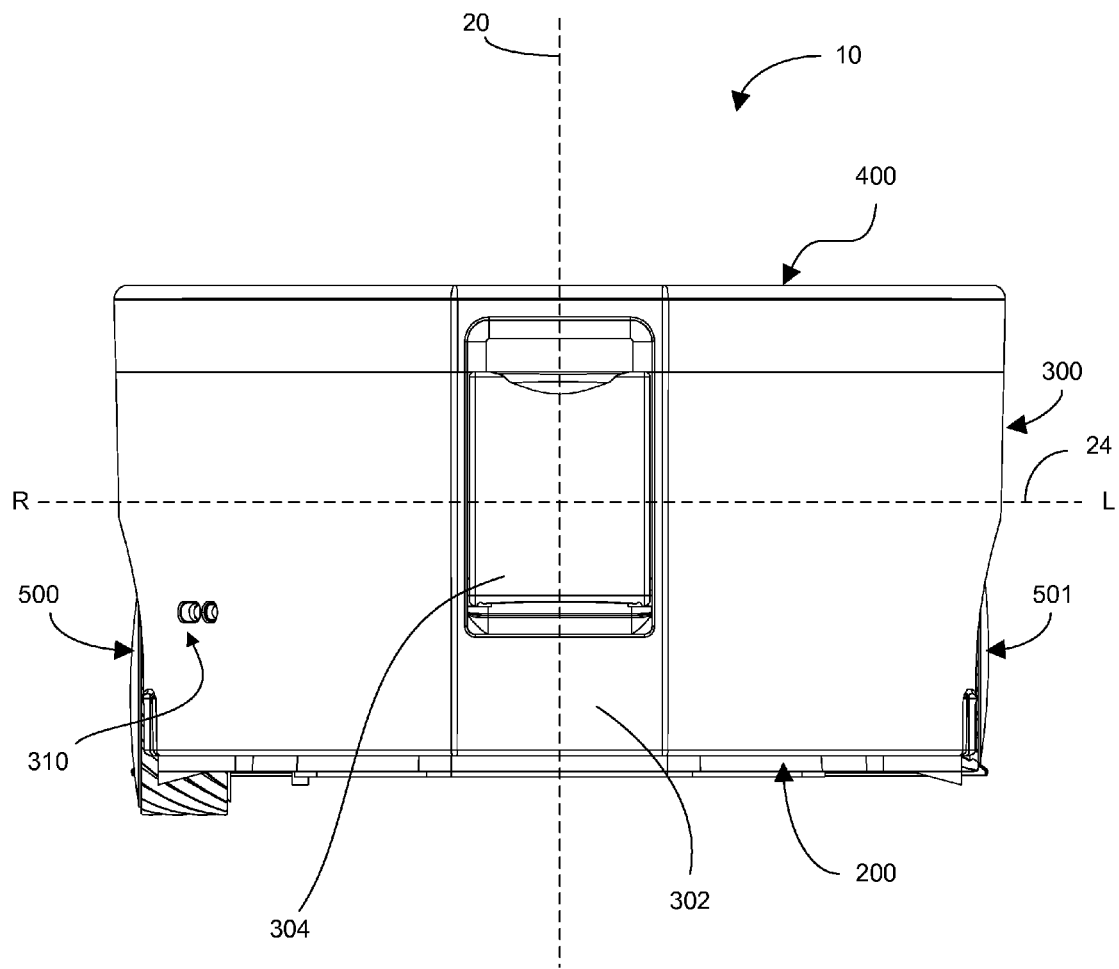
FIG. 5 is a front view of the autonomous cleaning robot of FIG. 1.
Figure 6:
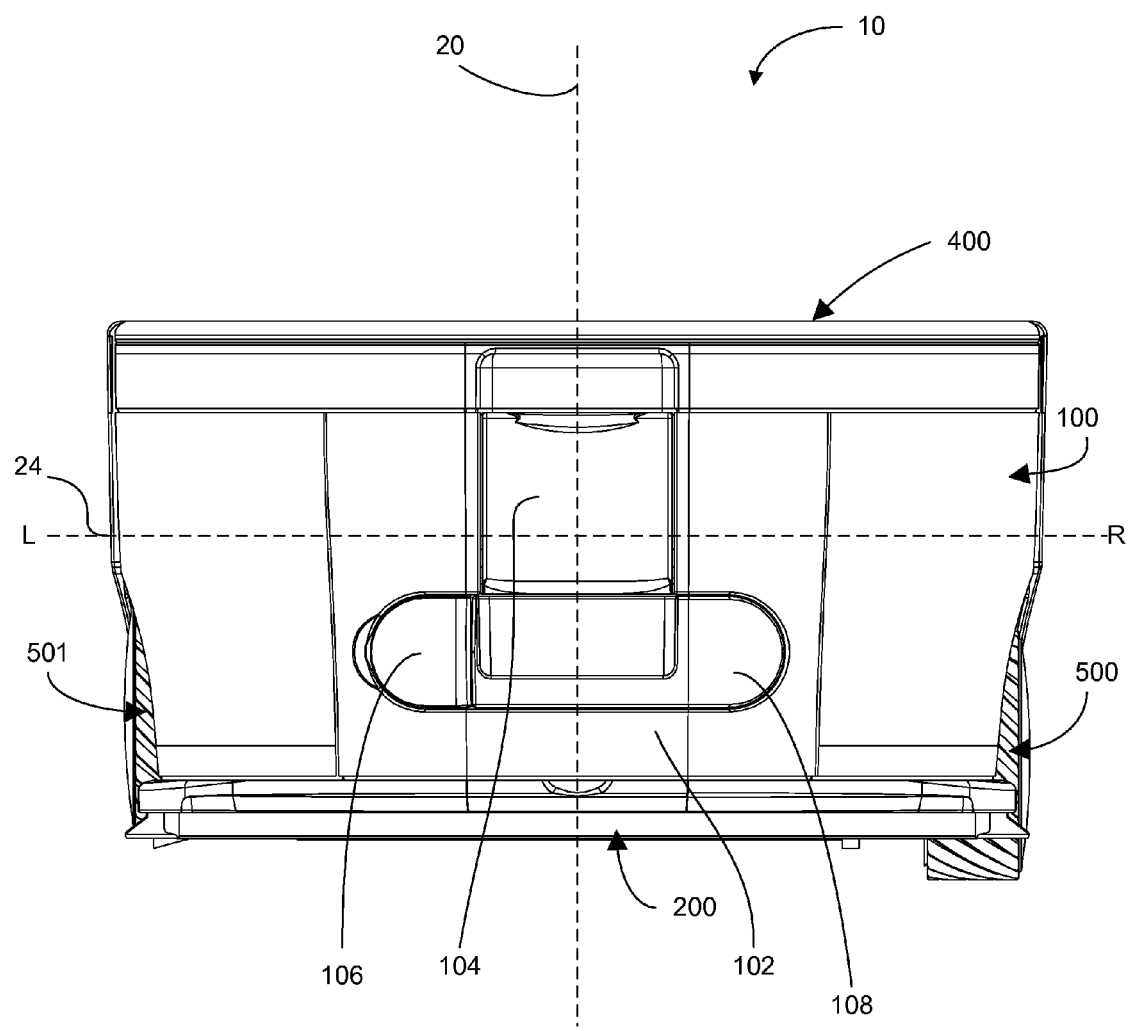
FIG. 6 is a rear view of the autonomous cleaning robot of FIG. 1.
Figure 23A:
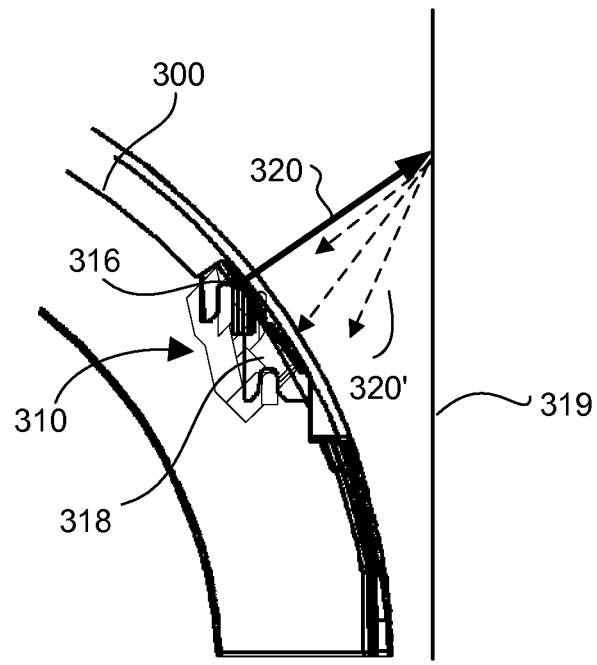
FIG. 23A is a partial top cross-sectional view of a wall follower sensor mounted on a bumper of the autonomous cleaning robot of FIG. 1.
Figure 23B:
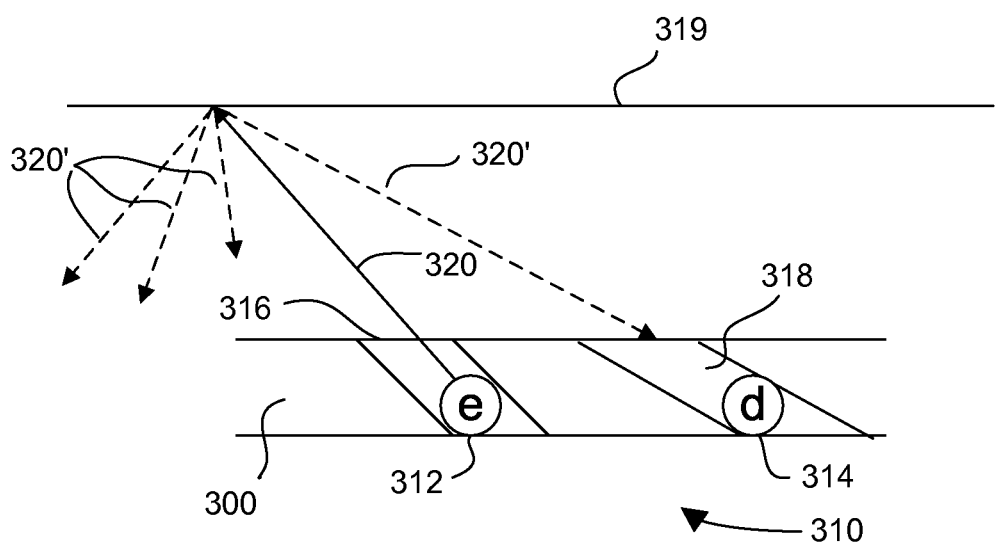
FIG. 23B is a schematic representation of a wall follower sensor of an autonomous cleaning robot.

Referring to FIG. 4 and 23A-B, the robot 10 includes a wall follower sensor 310 disposed substantially along the right side of the bumper 300. The wall follower sensor 310 includes an optical emitter 312 substantially forward of a photon detector 314. In some implementations, the position of the wall follower sensor 310 and the optical emitter 312 can be reversed such that the wall follower sensor 310 is substantially forward of the optical emitter 312.

The emitter 312 and detector 314 are arranged in respective collimator tubes 316, 318, which can be defined by the bumper 300 or defined by a housing mountable to the bumper 300. The collimator tubes 316, 318 are spaced closely together in a near-parallel orientation such that the field of emission of the emitter 312 intersects the field of view of the detector 314 at a distance forward of the wall follower sensor (e.g., about 1 cm to about 10 cm). As compared to wall follower sensors used on some slower moving robots in which the emitter and detector are aimed directly at the wall, the near-parallel orientation of the emitter 312 and the detector 314 results in an intersection zone that is both farther away and deeper for a given separation between the emitter 312 and the detector 314. In some implementations, the angle formed between the field of emission of the emitter 312 and the field of view of the detector 314 is between about 10 degrees and 30 degrees (e.g., about 20 degrees). Angles within this range result in a monotonic relationship between the angle to the wall and the signal strength. In some implementations, the respective collimators of the emitter and the detector are angled toward one another. In some implementations, the angles of the respective collimators can change as the forward speed of the robot changes.

The near-parallel orientation of the optical emitter 312 and photon detector 314 can allow the robot 10 to follow the wall within a short distance of the wall. As compared to an orientation in which the collimator of an emitter and the collimator of a detector are substantially angled toward each other, the near-parallel orientation of the optical emitter 312 and the photon detector 314 can result in a more linear relationship between the distance from the wall and signal strength.

FIG. 23B shows a schematic of the operation of the wall follower sensor 310. The emitter 312 can emit a signal 320 toward wall 319. The wall 319 reflects the signal such that a reflected signal 320' scatters from the wall in various different directions. At least a portion of the reflected signal 320' reflects back toward the field of view of the detector 314. The detection of the reflected signal 320' within the field of view of the detector generates a signal to the controller 1000. In some implementations, the controller 1000 uses the signal to control the distance between the robot 10 and the wall 319.

Figure 24:
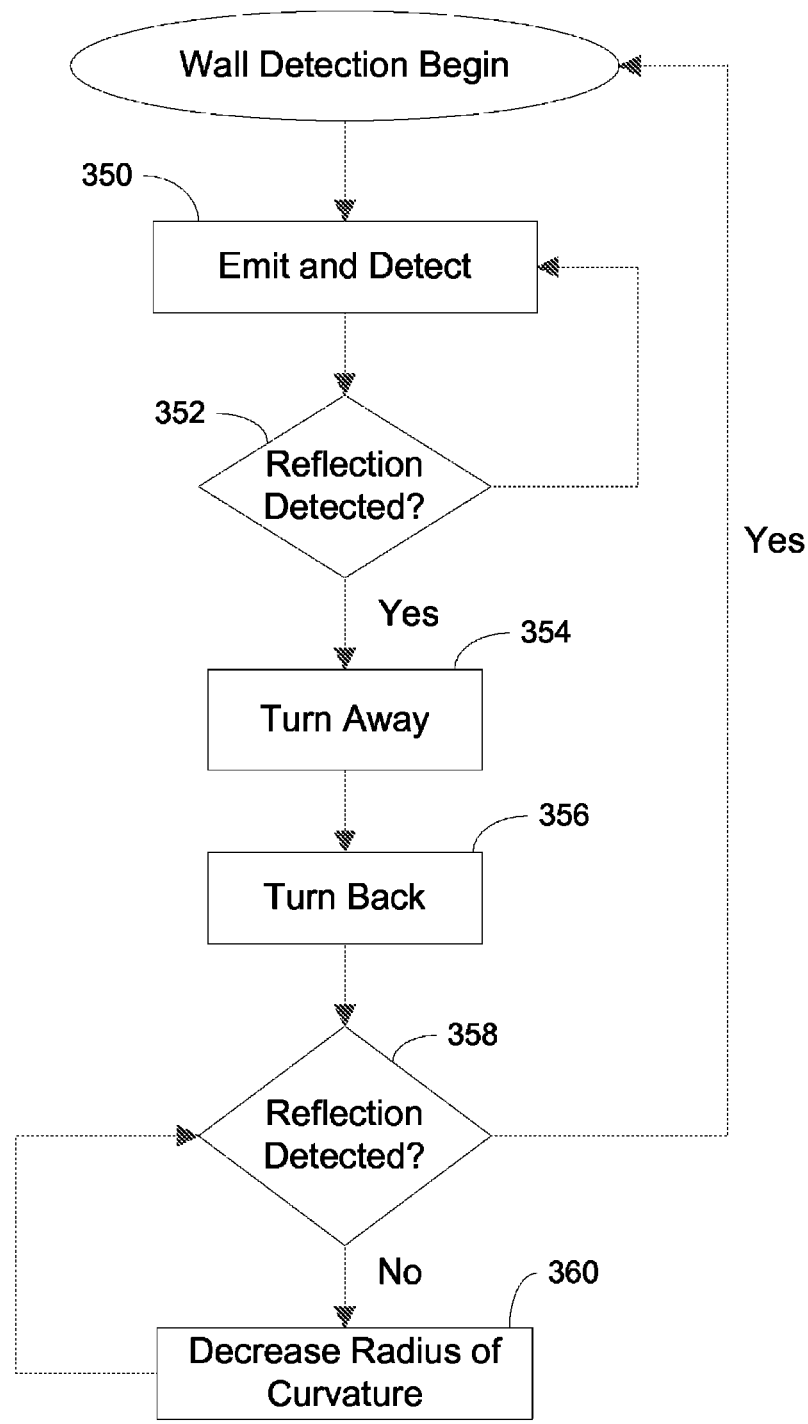
FIG. 24 is a flow chart depicting steps associated with the logic of an autonomous cleaning robot including a wall follower.

Referring to FIG. 24, the control module 1000 can include logic that controls wheel modules 500, 501 in response to signals detected by the wall follower sensor 310 to control the movement of the robot 10 at a substantially parallel fixed distance from the wall. The wall follower sensor 310 can modulate 350 signals from the emitter and detect signals from the detector (e.g., as described above) until a reflection is detected 352. A wall is then next to the robot and the control module 1000 causes the robot to turn away 354 from the wall and then turn back 356 until a reflection (the wall) is again detected 358. By continuously decreasing the radius of curvature of the robot 360, the path of the robot along the wall is made smoother. Additionally or alternatively, the controller 1000 can steer the robot 10 to maintain a substantially constant analog value of the detected signal which can result in a maintaining the robot at a substantially constant distance from the wall as the robot follows the wall.

In addition to or in the alternative to detecting signals emitted by the optical emitter 312, the photon detector 314 can be used as a receiver for other signals. For example, the photon detector 314 can be used as an infrared port for receiving serial data transmission. Such transfer of data through the photon detector 314 can reduce the need for cable ports that can be difficult to seal and can act as water leak paths when not in use. In some implementations, the control module 1000 can swap the photon detector 314 between a wall following mode and a data transfer mode. For example, when the control module 1000 detects that the robot 10 is not moving (e.g., through voltage and current signals received from the wheel modules 500, 501), the control module 1000 can monitor the photon detector 314 for a data transfer character. Upon detecting a data transfer character, the control module 1000 can switch the photon detector 314 to a data transfer mode in which data can be transferred through the photon detector as described above. Additionally or alternatively, upon detecting the data transfer character, the control module 1000 can switch between an internal wireless serial port (e.g., a BLUETOOTH wireless serial port) to an external wall follower serial port without specific commands or requiring a switch button. The control module 1000 can prevent the robot 10 from moving until the data transfer is complete. For example, the control module 1000 can refuse to move the wheel modules 500, 501 during a state in which the wall follower sensor 310 is enabled as a serial port (e.g., when the robot is powered on but not cleaning). In certain implementations, when the control module 1000 detects that the robot is moving, the control module 1000 will ignore the data transfer character such that the controller 1000 will not receive software updates while the robot 10 is in motion.

While the wall follower has been described

Bump Sensors

Bump sensors can be used to detect if the robot physically encounters an obstacle. Bump sensors can use a physical property such as capacitance or physical displacement within the robot to determine the robot has encountered an obstacle.

Referring to FIG. 7, the chassis 100 carries a right bump sensor 330 and a left bump sensor 332 substantially along a forward portion of the chassis 100. The bump sensors 330, 332 are substantially uniformly positioned on either side of the fore-aft axis 22 and are positioned at substantially the same height along the center vertical axis 20. As described above, bumper 300 is attached to chassis 100 by hinges 110 such that the bumper 300 can move a distance rearward along the fore-aft axis 22 if the bumper 300 encounters an obstacle. In the absence of a bump, the bumper 300 is hingedly supported on the chassis 100 at a short distance substantially forward of each bump sensor 330, 332. If the bumper 300 is moved rearward (e.g., through an encounter with an obstacle), the bumper 300 can press on one or both bump sensors 330, 332 to create a bump signal detectable by the control module 1000.

In response to the detected bump signal, the control module 1000 can navigated away from the bump. For example, the control module 1000 can move the robot 10 backwards. In some implementations, the bumper 300 can move transversely in response to a bump such that the bump sensors 330, 332 can be used to determine the directionality of the bump. For example, if the bumper 300 encounters an obstacle on the right side, the bumper 300 can move transversely to the left to come into contact with the right bump sensor 330. If the control module 1000 detects a signal from the right bump sensor 330 but does not detect a signal from the left bump sensor 332, the control module 1000 can initiate an escape behavior that will move the robot toward the left, away from the sensed bump condition. In an analogous example, the control module 1000 can navigate the robot 10 away from a bump detected on the left side of the robot 10.

In some implementations, the control module 1000 can interrupt a cleaning routine (e.g., stop the application of liquid to the cleaning surface) upon activation of one or both of the bump sensors 330, 332 and, additionally or alternatively, resume the cleaning routine upon completion of an escape routine. In certain implementations, bump sensors can detect the amount of mechanical shock encountered by the bumper such that a control module can stop the cleaning routine if the detected shock is above a threshold value (e.g., a shock indicating that the robot has fallen off of a surface).

For the purposes of illustration and explanation, the right bump sensor 330 is described in detail below. The left bump sensor 332 includes features analogous to the right bump sensor 330 and is identical to the right bump sensor 330 unless otherwise indicated.

Figure 25:
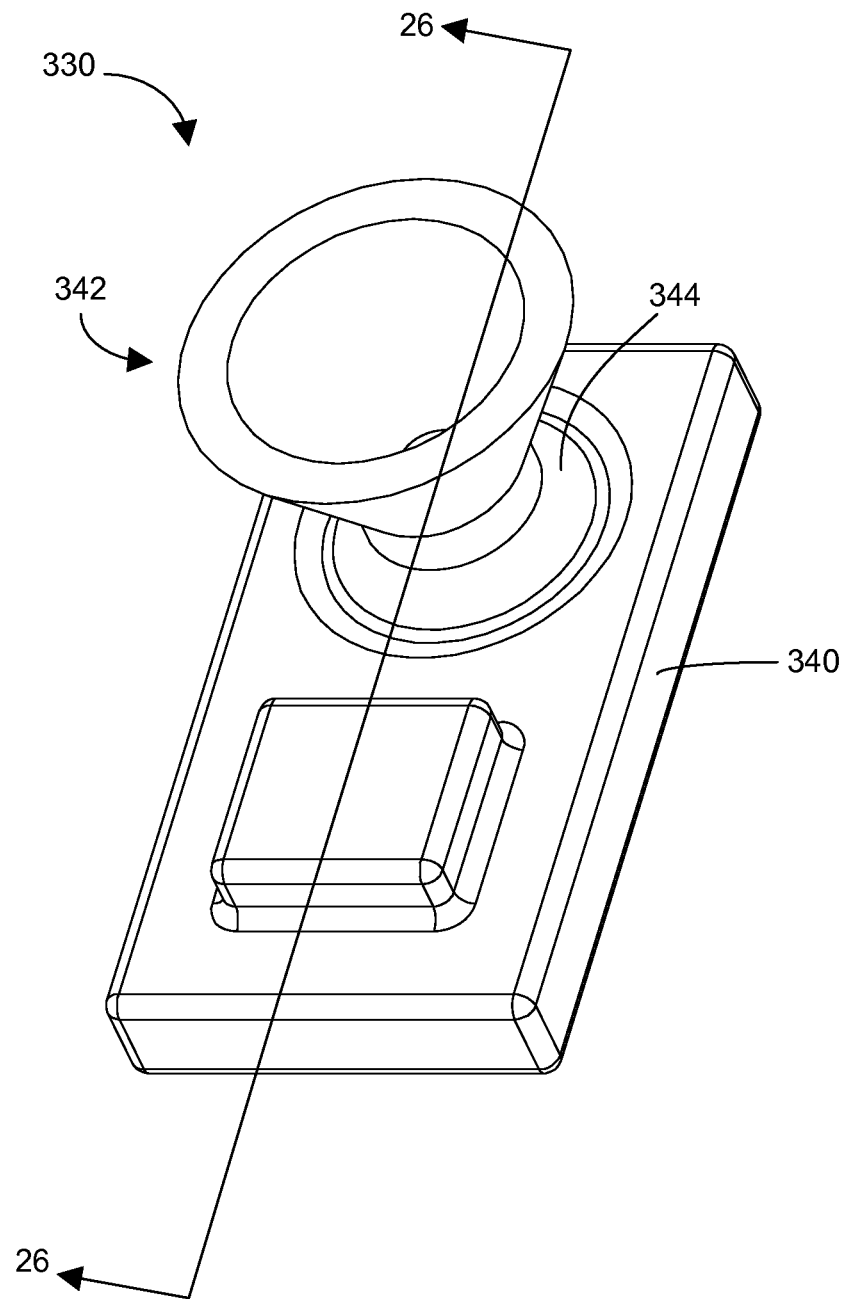
FIG. 25 is a perspective view of a bump sensor of an autonomous cleaning robot.
Figure 26:
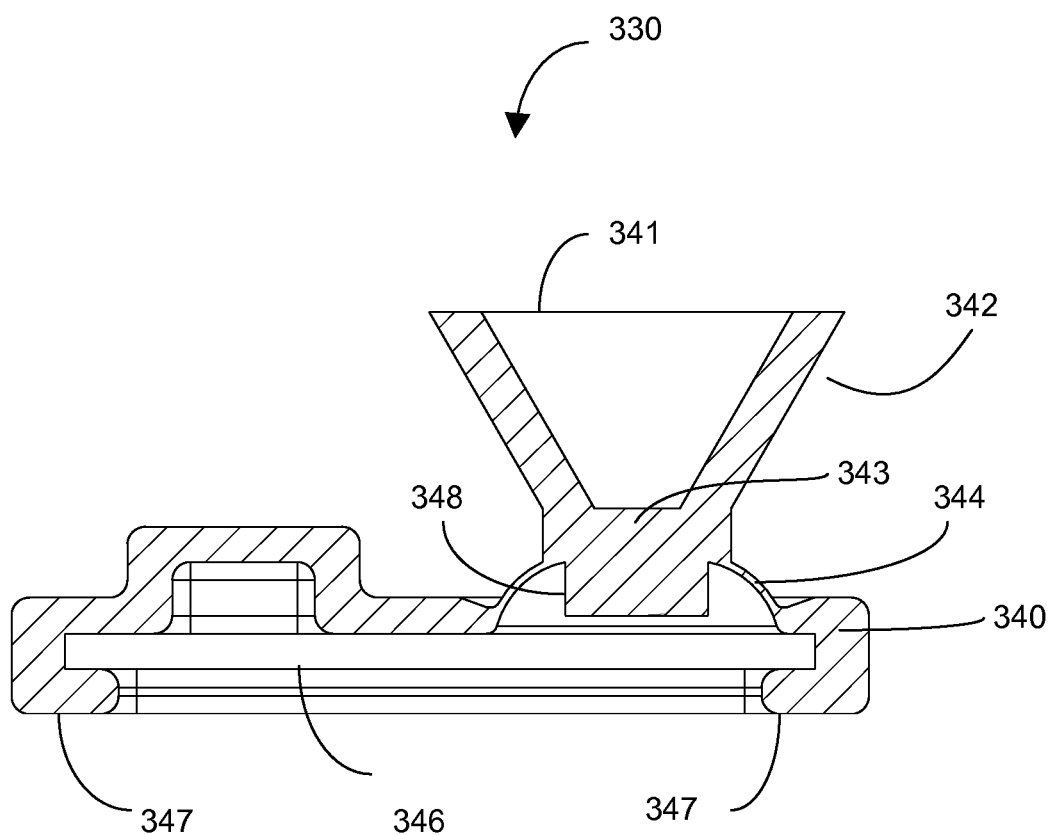
FIG. 26 is a cross sectional view of the bump sensor of FIG. 25 taken along the line 26-26.

Referring to FIGS. 25 and 26, the bump sensor 330 includes a sensor body 340, a cone 342 supported on a surface of the sensor body 340, and a bumper switch PCB 346 held on a surface of the sensor body 340 substantially opposite to the surface supporting the cone 342. The sensor body 340 includes overlapping regions 347 configured to extend around edge regions of the bumper switch PCB 346 to hold the bumper switch PCB 346 substantially in place. The overlapping regions 347 can include a small amount of adhesive to hold the bumper switch PCB 346 in place. The bumper switch PCB 346 carries an electric circuit and is configured for electrical communication with the controller module 1000.

The cone 342 includes a wide end 341 and a narrow end 343 and defines a frusto-conical cavity therebetween. The wide end 341 is supported away from the sensor body 340. In use, the bumper 300 contacts the wide end 341 when upon encountering an obstacle. A conductive pill 348 is disposed along the narrow end 343 of the cone 342. The conductive pill 348 can be carbon and, additionally or alternatively, formed in the shape of a puck.

The sensor body 340 includes a resilient region 344 that forms a dome-shaped cavity extending from the sensor body 340. The resilient region 344 supports the narrow end of a cone 342, with the wide end of the cone 342 extending away from the resilient region 344. At least a portion of the conductive pill 348 extends into the dome-shaped cavity formed by the resilient region 344 at a distance (e.g., at least about 2 mm) from the bumper switch PCB.

The resilient region 344 is configured to flex toward the sensor body 340 in response to pressure exerted on the wide end 341 of the cone 342 such that conductive pill 348 contacts the bumper switch PCB 346, acting as a mechanical switch to complete the circuit carried on the bumper switch PCB 346

(e.g., generate a signal to controller module 1000). In some implementations, the cone 342 and/or the resilient region 344 absorb some of the mechanical shock generated by contact with the bumper 300 and, thus, reduce the force transmitted from the conductive pill 348 to the bumper switch PCB 346. Such deformation of the cone 342 can reduce the likelihood that the mechanical shock of encountering an obstacle will damage (e.g., fracture) the bumper switch PCB 346.

Upon removal of pressure from the wide end of the cone 342, the resilient region 344 returns the cone 342 substantially to its initial orientation away from the bumper switch PCB 346. With the conductive pill 348 positioned away from the bumper switch PCB 346, the circuit carried by the bumper switch PCB 346 is incomplete and no signal is sent to the control module 1000.

In some implementations, the base 340 and cone 342 are integrally formed of silicone. In certain implementations, the silicone is molded over the conductive pill 348 to hold the conductive pill 348 substantially in place on the narrow end 348 of the cone 342.

Cliff Sensor

Cliff sensors can be used to detect if a portion (e.g., a forward portion) of the robot has encountered an edge (e.g., a cliff). Cliff sensors can use an optical emitter and photon detector pair to detect the presence of a cliff. In response to a signal from a cliff detector, the robot can initiate any of various different cliff avoidance behaviors.

Figure 27:
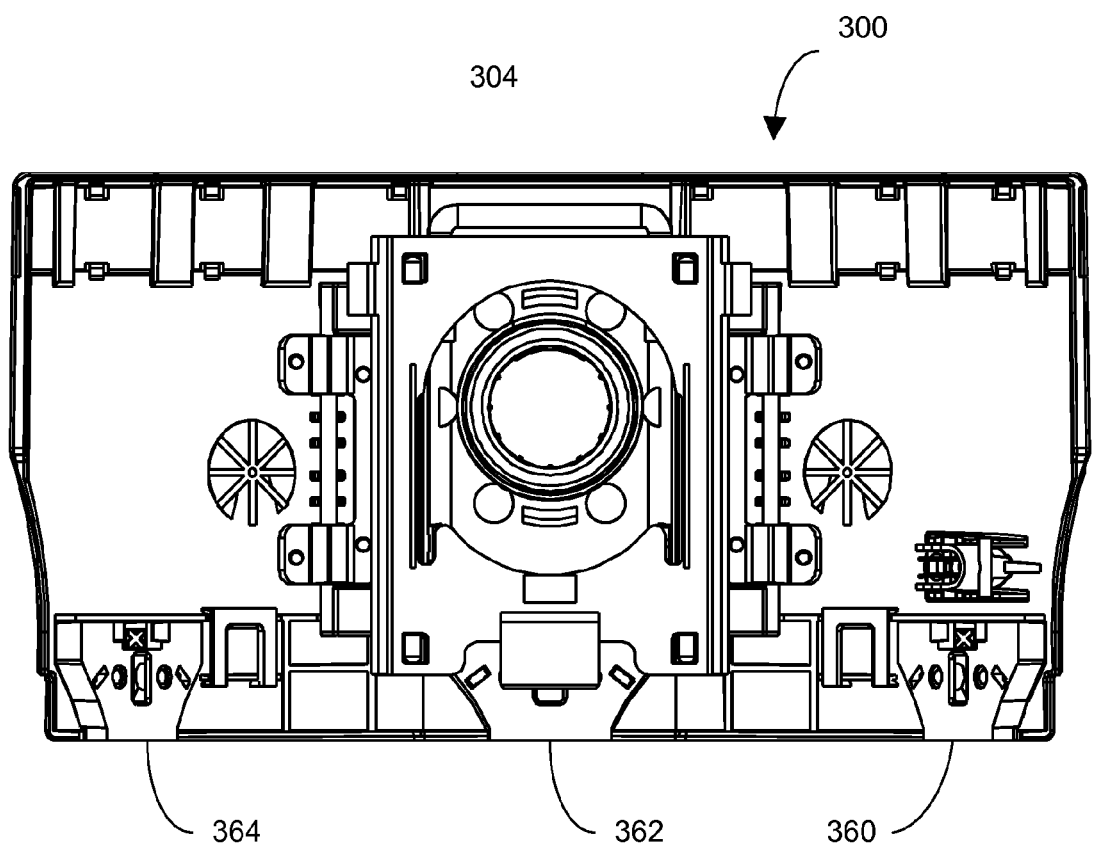
FIG. 27 is a rear view of the bumper of the autonomous cleaning robot of FIG. 1.

Referring to FIG. 27, bumper 300 includes a left cliff sensor 360, a center cliff sensor 362, and a right cliff sensor 364, each disposed along a lower portion of the bumper 300. The cliff sensors 360, 362, 364 substantially uniformly spaced from one another and each sensor 360, 362, 364 is aimed downward toward the surface. Center cliff sensor 362 is arranged near the center of the bumper 300, substantially below the fill door 304.

Figure 28:
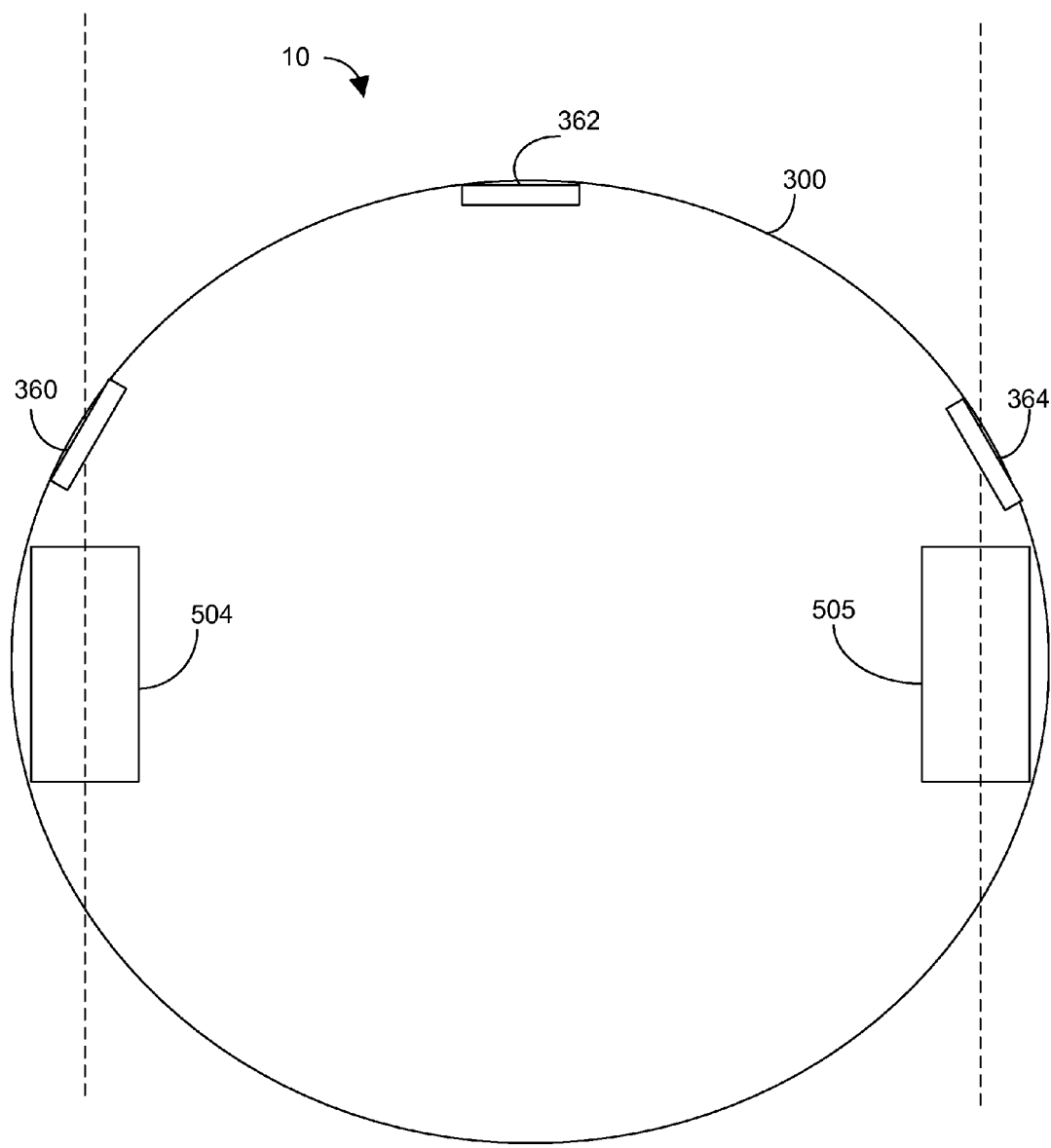
FIG. 28 is a schematic representation of a bumper in alignment with wheels of an autonomous cleaning robot.

Referring to FIG. 28, left and right cliff sensors 360, 364 are arranged near respective right and left ends of the bumper 300 and positioned substantially forward of and substantially aligned with wheels 504 and 505, respectively. Such positioning of the right and left cliff sensors 360, 364 can allow the robot 10 to travel at high rates of forward speed (e.g., about 200 mm/s to about 400 mm/s) while allowing the robot 10 sufficient time to detect a cliff event and successfully respond to the detected cliff event (e.g., overcoming the forces of forward momentum to stop before one or more wheels goes over the cliff). For example, upon detecting a cliff event at cliff sensor 360, wheel 504 can remain in contact with the surface and can provide traction and rearward thrust during an escape procedure. In implementations in which the robot weighs less than 2 kg fully loaded with cleaning liquid and travels at a maximum forward rate of about 200 mm/s to about 400 mm/s (e.g., about 300 mm/s), cliff sensors 360, 364 are positioned between about 50 mm to about 100 mm substantially forward of respective wheels 504, 505.

Figure 29:
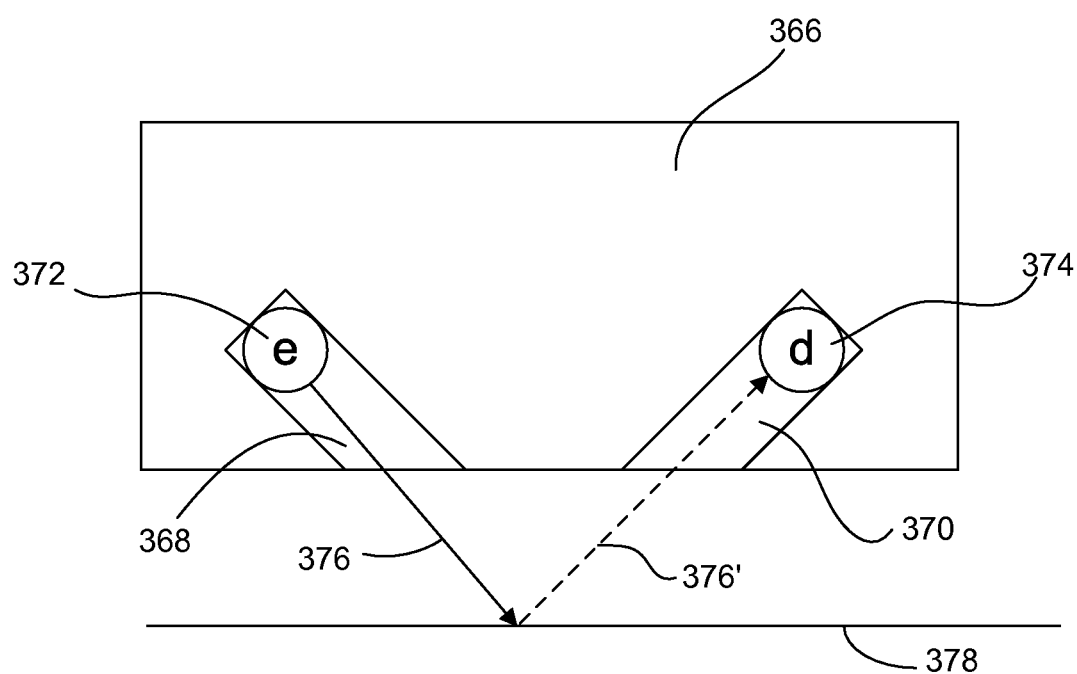
FIG. 29 is a schematic representation of a cliff sensor of an autonomous cleaning robot.

Referring to FIG. 29, the cliff sensors 360, 362, 364 each include a housing 366 defining an emitter collimator tube 368 and a detector collimator tube 370, each angled substantially toward one another. An optical emitter 372 is arranged substantially within the emitter collimator tube 368, and a photon detector 374 is arranged substantially within the detector collimator tube 370. Optical emitter 372 generates a signal 376 toward the surface 378. The signal 376' reflects off of the surface 378 back toward the detector collimator tube 370 and is detected by the photon detector 374.

Figure 30:
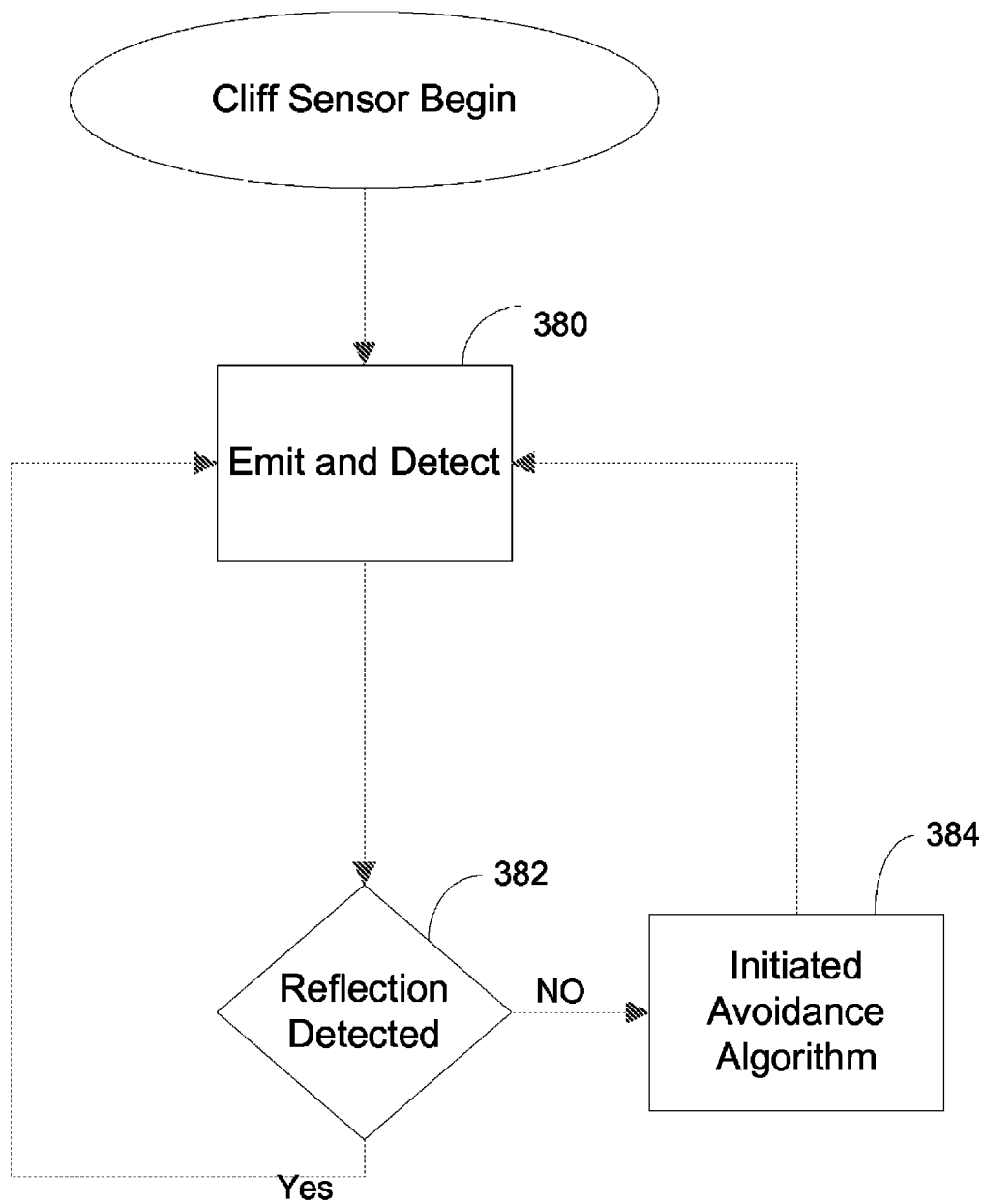
FIG. 30 is a flow chart depicting steps associated with the logic of an autonomous cleaning robot including a cliff detector.

Referring to FIG. 30, each cliff sensor 360, 362, 364 modulates the emitter at a frequency of several kilohertz and detects 380 any signal from the detector, which is tuned to that frequency. When a signal is not output by the detector, 382, the expected surface is not present and no overlap is detected. In response, an avoidance algorithm is initiated 384 to cause the robot to avoid the cliff. When a reflected signal is detected, processing continues 380.

In some implementations, cliff sensors 360, 362, 364 can be used to detect stasis of the robot 10. The wetting element 204 of the robot is a passive element and, therefore, does not substantially interfere with the signal processing of the cliff sensors 360, 362, 364. Thus, for example, the controller 1000 can move the robot 10 back and forth in a wiggle motion as the robot 10 moves along the surface. Without substantial interference from other components of the robot 10, each cliff sensor 360, 362, 364 can detect small variations in the reflected signal 376', the variations corresponding to variations in the surface as the robot 10 moves across the surface (e.g., in a straight line motion, in a turning motion, in a wiggle motion). Absence of variations in the reflected signal 376' is an indication that the robot 10 is in a stuck condition.

Stasis Sensor

A stasis sensor can be used to detect whether or not the robot is in fact moving. For example, a stasis sensor can be used to detect if the robot is jammed against an obstacle or if the drive wheels are disengaged from the floor, as when the robot is tilted or becomes stranded on an object. In a wet cleaning application, a stasis sensor can detect whether the wheels are slipping on a cleaning liquid applied to the surface. In such circumstances, the drive wheels may spin when the mobile robot applies power to them, but the robot is not moving.

Figure 31:
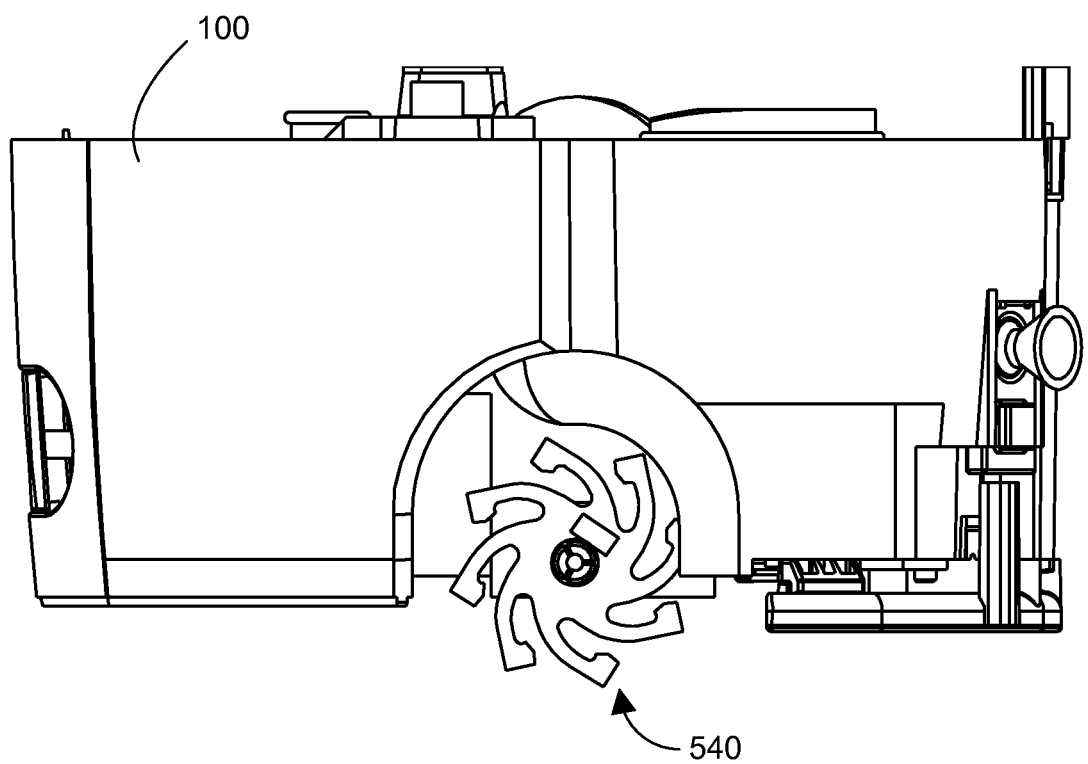
FIG. 31 is a side view of the chassis of the autonomous cleaning robot of FIG. 1 with a stasis sensor mounted to the chassis.

Referring to FIGS. 3, 31, a stasis sensor 540 is carried by the chassis 100, inward of the right wheel module 500. The stasis sensor 540 is substantially aligned the transverse axis 500 and is in non-load bearing contact with the surface. FIG. 31 shows the stasis sensor 540 carried on the chassis 100 with the wheel module 500 removed. The stasis sensor 540 rotates about the transverse axis 23 as the robot 10 moves.

Figure 32:
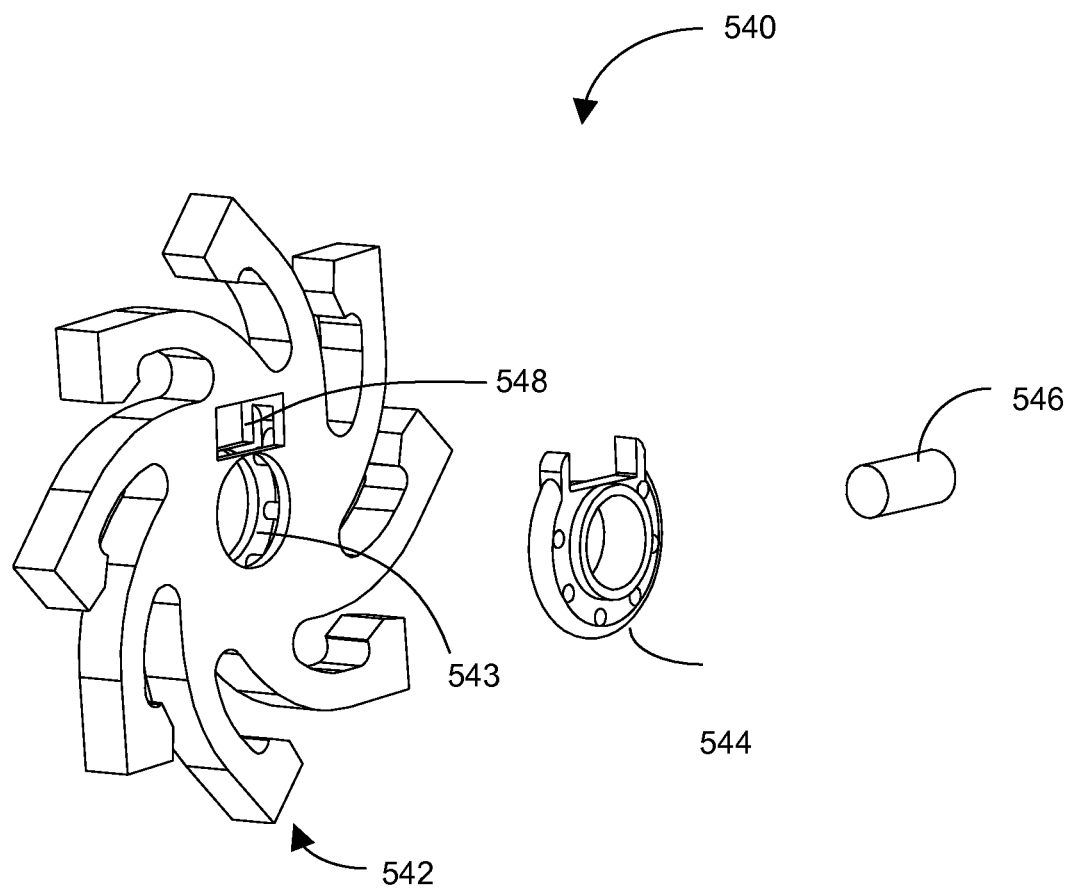
FIG. 32 is an exploded perspective view of a stasis sensor of the autonomous cleaning robot of FIG. 1.

Referring to FIG. 32, the stasis sensor 540 includes a stasis wheel 542 defining a center bore 543 and defining a magnet recess 548 offset from the center bore 543. A hub 544 is substantially aligned with the center bore 543 and configured to secure the stasis wheel 542 rotatably to a wheel housing and allow the stasis wheel 542 to spin freely in response to frictional contact with the surface or floor during robot movement. A magnet 546 is arranged (e.g., press fit) into the magnet recess 548.

In use, the stasis sensor 540 rotates and the magnet 546 activates a reed switch in the robot. The activation of the reed switch creates a signal detectable, for example, by the controller 1000. In this configuration, the stasis sensor 540 produces one signal pulse per rotation of the stasis wheel. The signal produced by the stasis sensor 540 can be used for stasis detection and/or odometry. In some implementations, each drive wheel includes a stasis sensor. In such configurations, the controller 1000 can determine motion of the robot based on differences in the outputs from each senor. For example, the controller 1000 can determine whether and in which direction the robot is turning.

While the stasis sensor has been described as including a magnet that activates a reed switch, other implementations are possible. In some implementations, the stasis sensor can include a breakbeam arrangement in which an optical emitter and photo detector pair are positioned substantially across the stasis sensor. As the stasis sensor rotates the emitter/detector pair can detect breaks in the beam caused by the rotating stasis wheel.

In some implementations, the stasis wheel can include alternating light sections and dark sections. An optical sensor can be positioned near the stasis wheel to detect transitions from the light section to the dark section (and vice versa) as the bi-colored wheel spins. By monitoring the contrast between the detection of the light and dark sections of the bi-colored wheel, the optical sensor can output a signal to the controller indicating that the bi-colored wheel has become too dirty or obscured to be useful in motion, speed, or stasis detection, for example. In response, the controller can transition to another stasis detection system.

In certain implementations, a stasis sensor includes a drive motor current sensor which monitors the current (hereinafter the "drive current") drawn by a drive motor that turns one or more of the drive wheels for propelling the robot. The drive motor current sensor and the drive motor can both be carried by a drive wheel module. When the drive current is higher than a threshold value, the stasis sensor determines that the robot is in a stasis condition. When the drive current is lower than a threshold value, the stasis sensor determines that the load on the wheels is too low (e.g., the wheels are slipping).

Figure 33:
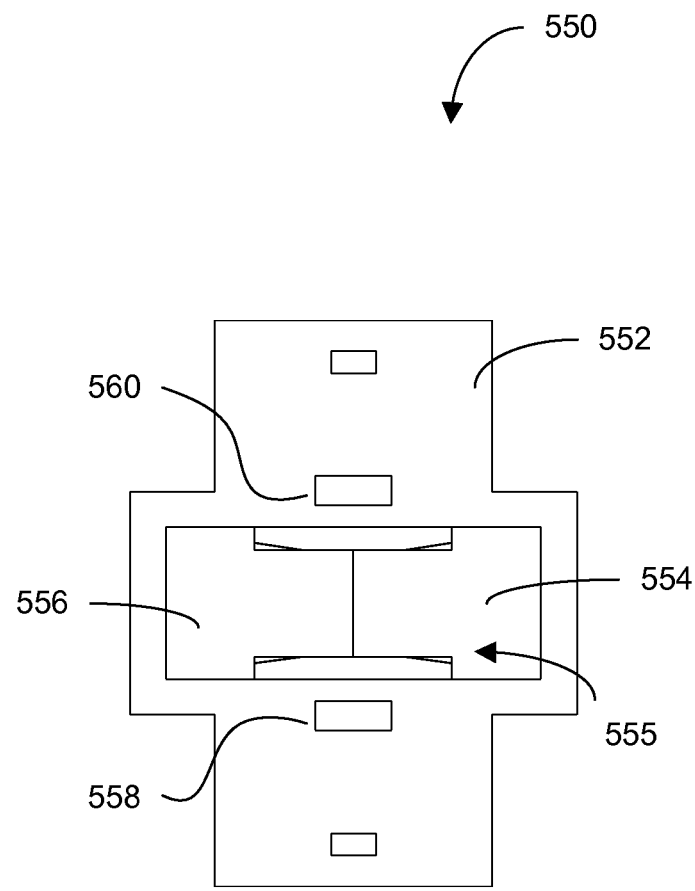
FIG. 33 is a top view of a wiggle sensor of an autonomous cleaning robot.

Referring to FIG. 33, in certain implementations, stasis can be detected using a wiggle sensor 550. The wiggle sensor 550 includes a housing 552 having two surfaces 556, 554 sloped toward each other and define a substantially v-shaped cavity 555 in the housing 552. The housing 552 includes an optical emitter 558 and a photo detector 560 arranged on either side of the v-shaped cavity. The optical emitter 558 is configured to send a signal toward the photo detector 560, and the photo detector 560 is configured to sense the signal. When the controller 1000 moves the robot 10 in a wiggle motion, a ball (not shown) moves up and down the v-shaped cavity in response to the wiggle motion. The movement of the ball in the v-shaped cavity is detected as an interruption of the signal passing between the optical emitter 558 and the photo detector 560. Such an interruption is indication that the robot 10 is moving in response to the wiggle motion. If the signal passing between the optical emitter 558 and the photo detector 560 remains uninterrupted during a wiggle motion, the controller 1000 interprets the uninterrupted signal as a stasis condition.

The controller 1000 can use an algorithm to transition from a first stasis detection system to a second stasis detection system. The transition can be unitary (switching entirely and immediately), or it can be gradual in degree and/or time (e.g., by applying a confidence coefficient for the first stasis detection system and/or the second stasis detection system). The controller 1000 can evaluate inputs from both stasis detection systems simultaneously, integrating the evaluated inputs according to an integration equation in accordance with the nature of the first and second stasis detection systems.

Power Module/Interface Module

The power module 1200 delivers electrical power to all of the major robot subsystems. The power module 1200 includes a self-contained power source releasably attached to the chassis 100, e.g., a rechargeable battery, such as a nickel metal hydride battery, or the like. In addition, the power source is configured to be recharged by any of various different recharging elements and/or recharging modes. In some implementations, the battery can be replaced by a user when the battery becomes discharged or unusable. The controller 1000 can also interface with the power module 1200 to control the distribution of power, to monitor power use and to initiate power conservation modes as required.

The robot 10 can include one or more interface modules 1700. Each interface module 1700 is attached to the chassis 100 and can provide an interconnecting element or port for interconnecting with one or more external devices. Interconnecting elements are ports can be accessible on an external surface of the robot 10. The controller 1000 can also interface with the interface modules 1700 to control the interaction of the robot 10 with an external device. In particular, one interface module element can be provide for charging the rechargeable battery via an external power supply or power source such as a conventional AC or DC power outlet. The interface module for charging the rechargeable battery can include a short-circuit loop that will prevent the rechargeable battery from taking charge if there is water in the charge port of the robot 10. In some implementations, the rechargeable battery includes a fuse that will trip if there is water in the battery recharging path.

Another interface module element can be configured for one or two way communications over a wireless network and further interface module elements can be configured to interface with one or more mechanical devices to exchange liquids and loose particles therewith, e.g., for filling a cleaning fluid reservoir.

Active external devices for interfacing with the robot 10 can include, but are not limited to, a floor standing docking station, a hand held remote control device, a local or remote computer, a modem, a portable memory device for exchanging code and/or date with the robot 10 and a network interface for interfacing the robot 10 with any device connected to the network. In addition, the interface modules 1700 can include passive elements such as hooks or latching mechanisms for attaching the robot 100 to a wall for storage or for attaching the robot to a carrying case or the like.

In some implementations, an active external device can confine the robot 10 in a cleaning space such as a room by emitting a signal in a virtual wall pattern. The robot 10 can be configured to detect the virtual wall pattern (e.g., using an omni-directional receiver as described above) and is programmed to treat the virtual wall pattern as a room wall so that the robot does not pass through the virtual wall pattern. Such a configuration is described in U.S. Pat. No. 6,690,134 by Jones et al., entitled Method and System for Robot Localization and Confinement, the entire disclosure of which is herein incorporated in its entirety.

In some implementations, an active external device includes a base station used to interface with the robot 10. The base station can include a fixed unit connected with a household power supply, e.g., an AC power wall outlet and/or other household facilities such as a water supply pipe, a waste drain pipe and a network interface. The robot 10 and the base station can each be configured for autonomous docking and the base station can be further configured to charge the robot power module 1200 and to service the robot in other ways. A base station and autonomous robot configured for autonomous docking and for recharging the robot power module are described in U.S. patent application Ser. No. 10/762,219, by Cohen, et al., filed on Jan. 21, 2004, entitled Autonomous Robot Auto-Docking and Energy Management Systems and Methods, the entire disclosure of which is herein incorporated by reference in its entirety.

Other robot details and features combinable with those described herein may be found in the following U.S. patent application filed May 9, 2008, entitled "COMPACT AUTONOMOUS COVERAGE ROBOT" having assigned Ser. No. 12/118,117, the entire contents which is hereby incorporated by reference.

What is claimed is:

1. A surface treatment robot comprising:
a chassis having forward and rear ends;
a drive system carried by the chassis and configured to maneuver the robot over a cleaning surface, the drive system comprising right and left driven wheels;
a vacuum assembly carried by the chassis, the vacuum assembly comprising a collection region engaging the cleaning surface, a suction region in fluid communication with the collection region, the suction region configured to suction waste from the cleaning surface through the collection region, a squeegee attached to the chassis and formed with a longitudinal ridge disposed proximate to the cleaning surface and extending across a cleaning width for providing a liquid collection volume at a forward edge of the ridge, and a vacuum chamber partially formed by the squeegee disposed proximate to the longitudinal ridge and extending across the cleaning width, the vacuum chamber in fluid communication with the liquid collection volume by a plurality of suction ports defined by the squeegee, above the longitudinal ridge;
a collection volume carried by the chassis and in fluid communication with the vacuum assembly for collecting waste removed by the vacuum assembly;
a supply volume carried by the chassis and configured to hold a cleaning liquid;
an applicator carried by the chassis and in fluid communication with the supply volume, the applicator configured to dispense the cleaning liquid onto the cleaning surface substantially near the forward end of the chassis; and
a wetting element carried by the chassis and engaging the cleaning surface to distribute the cleaning liquid along at least a portion of the cleaning surface when the robot is driven in a forward direction, the wetting element arranged substantially forward of a transverse axis defined by the right and left driven wheels, and the wetting element slidably supporting at least about ten percent of the mass of the robot above the cleaning surface.

2. The surface treatment robot of claim 1, wherein the collection region of the vacuum assembly is arranged substantially rearward of the transverse axis defined by the right and left drive wheels, the vacuum assembly slidably supporting at least about twenty percent of the mass of the robot above the cleaning surface.

3. The surface treatment robot of claim 1, wherein a forward portion of the collection region of the vacuum assembly is configured to pass a point on the cleaning surface about 0.25 s to about 0.6 s after a forward portion of the applicator has passed the point on the cleaning surface when the robot is driven at a maximum speed in the forward direction.

4. The surface treatment robot of claim 1, further comprising a navigation system in communication with the drive system and configured to navigate the robot, wherein the vacuum assembly is configured to collect a portion of the cleaning liquid dispensed onto the cleaning surface and the navigation system is configured to navigate the robot to return to collect the cleaning liquid remaining on the surface.

5. The surface cleaning robot of claim 4, wherein the navigation system is configured to navigate the robot along a pseudo-random path to return to collect the cleaning liquid remaining on the surface.

6. The surface treatment robot of claim 1, wherein the drive system is configured to maneuver the robot within a volume of less than about 3 L.

7. The surface treatment robot of claim 6, wherein the supply volume is configured to hold about 600 mL or greater of cleaning liquid.

8. The surface treatment robot of claim 1, wherein the drive system is configured to provide between about 100 grams-force and about 700 grams-force at each wheel to propel the robot at a maximum forward rate of between about 200 mm/s and about 400 mm/s.

9. The surface treatment robot of claim 1, wherein the center of gravity of the robot is substantially along a transverse axis defined by the right and left wheels.

10. The surface treatment robot of claim 1, further comprising an extension element carried by the chassis, the extension element extending transversely from the chassis and configured to guide debris toward the chassis.

11. The surface treatment robot of claim 10, wherein the extension element includes a spring detent configured to allow the extension element to flex upon contact with an obstacle and to return to a substantially original position upon disengagement from the obstacle.

12. The surface treatment robot of claim 11, wherein the extension element is in fluid communication with the vacuum assembly and configured to suction debris toward the vacuum assembly.

* * * * *

UNITED STATES PATENT AND TRADEMARK OFFICE
CERTIFICATE OF CORRECTION

PATENT NO.         : 8,726,454 B2
APPLICATION NO.    : 12/118219
DATED              : May 20, 2014
INVENTOR(S)        : Duane L. Gilbert, Jr. et al.

It is certified that error appears in the above-identified patent and that said Letters Patent is hereby corrected as shown below:

On the Title Page, item (56) in Other Publications:

Page 10, column 1, line 33, delete "Procesing" and insert -- Processing --, therefor.

Page 10, column 1, line 37, delete "Cybermetics" and insert -- Cybernetics --, therefor.

Page 10, column 2, line 39, delete "Dorfmiiller" and insert -- Dorfmüller --, therefor.

Page 11, column 1, line 19, delete "Biomimetric" and insert -- Biomimetic --, therefor.

Page 11, column 2, line 23, delete "Cybermetics" and insert -- Cybernetics --, therefor.

Page 12, column 2, line 60, delete "Localiztion" and insert -- Localization --, therefor.

Page 13, column 1, line 8, delete "Departmetn" and insert -- Department --, therefor.

Page 13, column 1, line 38, delete "Cofnerence" and insert -- Conference --, therefor.

Page 13, column 1, line 55, delete "Internat:" and insert -- Internet: --, therefor.

Page 13, column 2, line 36, delete "Lacation" and insert -- Location --, therefor.

Page 13, column 2, line 67, delete "Ttransactions" and insert -- transactions --, therefor.

Page 14, column 2, line 5, delete "IEE" and insert -- IEEE --, therefor.

In the Claims:

Column 50, line 14, Claim 5, delete "surface cleaning robot" and insert -- surface treatment robot --, therefor.

Signed and Sealed this
Sixth Day of January, 2015

Michelle K. Lee
*Deputy Director of the United States Patent and Trademark Office*